US008936135B2

(12) United States Patent
Conley et al.

(10) Patent No.: US 8,936,135 B2
(45) Date of Patent: Jan. 20, 2015

(54) PUMP HAVING HEATED RESERVOIR

(75) Inventors: Paul G. Conley, St. Charles, MO (US); Christopher D. Holland, Wood River, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 526 days.

(21) Appl. No.: 13/271,832

(22) Filed: Oct. 12, 2011

(65) Prior Publication Data

US 2012/0132304 A1    May 31, 2012

Related U.S. Application Data

(60) Provisional application No. 61/417,606, filed on Nov. 29, 2010, provisional application No. 61/533,530, filed on Sep. 12, 2011.

(51) Int. Cl.
*B01D 47/00* (2006.01)
*F16N 7/14* (2006.01)
*F16N 7/38* (2006.01)
*F16N 13/02* (2006.01)

(52) U.S. Cl.
CPC .. *F16N 7/14* (2013.01); *F16N 7/38* (2013.01); *F16N 13/02* (2013.01)
USPC .......................................................... 184/26

(58) Field of Classification Search
CPC ..................................... F16N 7/14; F16N 7/38
USPC ........................................ 184/26, 104.1, 6.21
See application file for complete search history.

(56) References Cited

U.S. PATENT DOCUMENTS

| | | |
|---|---|---|
| 910,802 A | 1/1909 | Enos et al. |
| 1,384,353 A | 7/1921 | Shavers |
| 1,673,134 A | 6/1928 | Barks |
| 1,773,660 A | 8/1930 | Barks |
| 1,801,414 A | 4/1931 | Davis |
| 1,933,403 A | 10/1933 | Wilson |
| 1,977,831 A | 10/1934 | Marshall et al. |
| 2,103,063 A | 12/1937 | Clark |
| 2,340,932 A | 2/1944 | Chalupa |
| 2,440,680 A | 5/1948 | Gerin |
| 2,560,795 A | 7/1951 | Harris |
| 2,569,110 A | 9/1951 | McGillis et al. |
| 2,627,320 A | 2/1953 | Rotter |

(Continued)

FOREIGN PATENT DOCUMENTS

| | | |
|---|---|---|
| DE | 9412699 U1 | 12/1995 |
| DE | 19623537 A1 | 12/1997 |

(Continued)

OTHER PUBLICATIONS

International Search Report regarding corresponding PCT/US2013/030464, dated Sep. 27, 2013, 4 pages.

(Continued)

*Primary Examiner* — William E Dondero
*Assistant Examiner* — Mark K Buse
(74) *Attorney, Agent, or Firm* — Senniger Powers LLP

(57) ABSTRACT

Apparatus and method for supplying lubricant to a plurality of lubrication sites. Embodiments include a pump with venting and non-venting piston return, a pump with stirrer and direct feed mechanism, a pump with CAN system and self-diagnostics, a pump with heated housing and reservoir and a pump with stepper motor and overdrive control.

17 Claims, 67 Drawing Sheets

(56) References Cited

U.S. PATENT DOCUMENTS

| | | | |
|---|---|---|---|
| 2,867,481 A | 1/1959 | Hornbostel | |
| 2,894,102 A * | 7/1959 | Morris | 184/104.1 |
| 3,025,559 A | 3/1962 | Basinger | |
| 3,113,282 A | 12/1963 | Coleman | |
| 3,286,791 A | 11/1966 | Cofer et al. | |
| 3,409,165 A | 11/1968 | Creith | |
| 3,437,771 A | 4/1969 | Nusbaum | |
| 3,507,359 A | 4/1970 | Warnock | |
| 3,515,312 A | 6/1970 | Heier | |
| 3,659,675 A | 5/1972 | Edelstein et al. | |
| 3,722,967 A | 3/1973 | Lewis | |
| 3,951,480 A | 4/1976 | Nicholson | |
| 3,958,725 A | 5/1976 | Reeve | |
| 3,972,387 A | 8/1976 | Braun | |
| 4,069,835 A | 1/1978 | Stadler | |
| 4,243,151 A | 1/1981 | Bruening | |
| 4,326,603 A | 4/1982 | Darrow et al. | |
| 4,718,824 A | 1/1988 | Cholet et al. | |
| 4,755,657 A * | 7/1988 | Crim et al. | 219/536 |
| 4,759,427 A | 7/1988 | Onose | |
| 4,904,846 A | 2/1990 | Oscadal | |
| 5,022,556 A | 6/1991 | Dency et al. | |
| 5,025,827 A | 6/1991 | Weng | |
| 5,038,892 A | 8/1991 | Maloney | |
| 5,038,893 A | 8/1991 | Willner et al. | |
| 5,125,480 A | 6/1992 | Gregory et al. | |
| 5,126,722 A | 6/1992 | Kamis | |
| 5,178,405 A | 1/1993 | Brandstadter | |
| 5,293,959 A | 3/1994 | Kimberlin | |
| 5,327,998 A | 7/1994 | Rosado et al. | |
| 5,433,105 A | 7/1995 | Takahashi et al. | |
| 5,510,023 A | 4/1996 | Taylor | |
| 5,620,060 A | 4/1997 | Bialke | |
| 5,626,467 A | 5/1997 | Cantley | |
| 5,685,331 A | 11/1997 | Westermeyer | |
| 5,707,515 A | 1/1998 | DePaul | |
| 5,850,849 A | 12/1998 | Wood | |
| 5,961,299 A | 10/1999 | Gruett et al. | |
| 5,996,739 A | 12/1999 | Hoffmann | |
| 6,012,551 A | 1/2000 | Raab | |
| 6,083,406 A | 7/2000 | DePaul et al. | |
| 6,161,723 A | 12/2000 | Cline et al. | |
| 6,216,822 B1 | 4/2001 | May et al. | |
| 6,244,387 B1 | 6/2001 | Paluncic et al. | |
| 6,305,404 B1 | 10/2001 | Steiger | |
| 6,322,336 B1 | 11/2001 | Huss | |
| 6,405,810 B1 | 6/2002 | Grach et al. | |
| 6,491,068 B1 * | 12/2002 | Markward et al. | 139/1 R |
| 6,669,057 B2 | 12/2003 | Saidman et al. | |
| 6,705,432 B2 | 3/2004 | Conley et al. | |
| 6,793,042 B2 | 9/2004 | Brouillet | |
| 6,886,589 B2 | 5/2005 | Oretti | |
| 7,059,450 B2 * | 6/2006 | O'Toole et al. | 184/105.1 |
| 7,296,707 B2 | 11/2007 | Raines et al. | |
| 7,740,457 B2 | 6/2010 | Lehmann | |
| 7,900,800 B2 | 3/2011 | Hassler, Jr. et al. | |
| 2002/0144865 A1 | 10/2002 | Clancy et al. | |
| 2002/0157901 A1 | 10/2002 | Kast et al. | |
| 2003/0039561 A1 | 2/2003 | Batten et al. | |
| 2004/0069570 A1 | 4/2004 | Baumann | |
| 2004/0129499 A1 | 7/2004 | Okpokowuruk | |
| 2005/0180870 A1 | 8/2005 | Stanley et al. | |
| 2006/0263501 A1 * | 11/2006 | Oghafua et al. | 426/523 |
| 2007/0137936 A1 | 6/2007 | Akechi et al. | |
| 2007/0177835 A1 | 8/2007 | Verhaegen | |
| 2007/0289994 A1 | 12/2007 | Kotyk | |
| 2008/0095650 A1 * | 4/2008 | Divisi | 417/521 |
| 2008/0142304 A1 | 6/2008 | Schutz et al. | |
| 2008/0240944 A1 | 10/2008 | Arens | |
| 2011/0174577 A1 | 7/2011 | Kreutzkamper et al. | |
| 2012/0134847 A1 | 5/2012 | Conley et al. | |
| 2013/0092284 A1 | 4/2013 | Holland et al. | |

FOREIGN PATENT DOCUMENTS

| | | |
|---|---|---|
| GB | 2205905 A | 12/1988 |
| JP | 02080815 | 3/1990 |
| JP | 02195020 | 8/1990 |
| JP | 2005067819 A | 3/2005 |
| JP | 2005195166 A | 7/2005 |
| KR | 10-2008-0102267 A | 11/2008 |
| TW | 223824 | 5/1994 |
| TW | 233795 | 11/1994 |
| TW | 200401876 A | 2/2004 |
| TW | 200532099 A | 10/2005 |
| TW | 20100789 A | 1/2010 |
| WO | 9641136 A1 | 12/1996 |

OTHER PUBLICATIONS

Written Opinion of the International Searching Authority, PCT/2013/030464, dated Sep. 27, 2013, 7 pages.

Preliminary Examination Report from related Taiwan Application 100140671, dated Oct. 29, 2013, 7 pages.

Search Report in related Taiwan Application 100140671, dated Oct. 29, 2013, 2 pages.

* cited by examiner

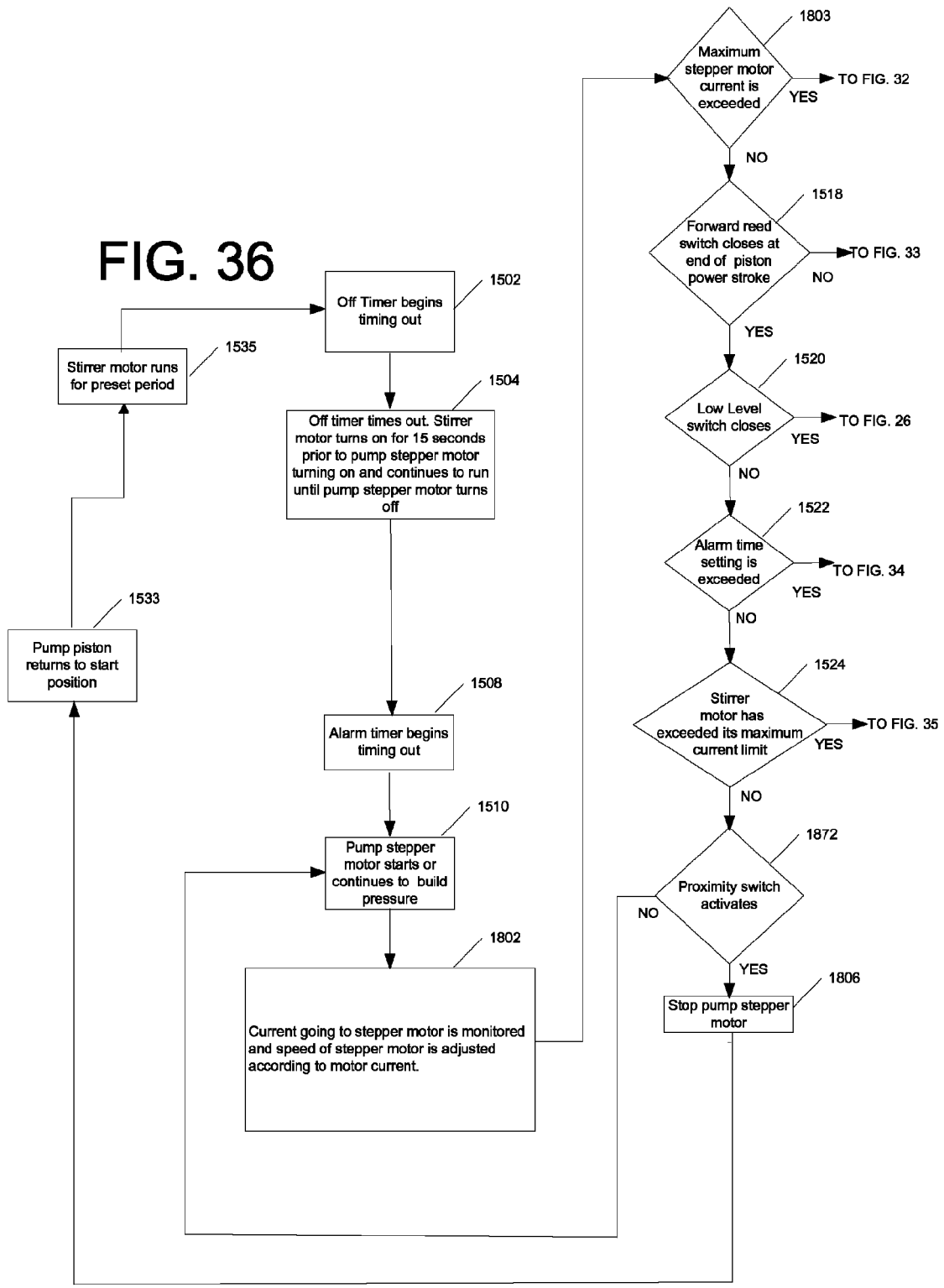

PUMP HAVING HEATED RESERVOIR

CROSS REFERENCE TO RELATED APPLICATION

The present application claims priority to and benefit of U.S. Provisional Patent Application 61/417,606, filed Nov. 29, 2010, entitled, "Application and Method for Supplying Lubricant", and U.S. Provisional Patent Application 61/533,530, filed Sep. 12, 2011, entitled, "Application and Method for Pumping Lubricant", both of which are incorporated by reference in their entireties.

FIELD OF THE INVENTION

The present invention generally relates to apparatus for supplying lubricant, and more particularly to an automatic lubrication system for automatically pumping lubricant to a plurality of lubrication sites.

BACKGROUND OF THE INVENTION

This invention has particular application to automatic lubrication systems for supplying lubricant to multiple points of lubrication at predetermined intervals and/or in predetermined amounts. Lincoln Industrial sells such automated systems under the Quicklub®, Centro-Matic® and Helios® trademarks. The Quicklub® system includes a reservoir for holding a supply of lubricant, a stirrer for stirring the lubricant, and an electric or pneumatic pump for pumping lubricant from the reservoir to one or more progressive metering (divider) valves each of which operates to dispense lubricant to multiple points of lubrication. Reference may be made to U.S. Pat. No. 6,244,387, incorporated herein by reference, for further details regarding an exemplary Quicklub® system. The Centro-Matic® system is similar to a Quicklub® system except that lubricant from the pump is delivered through a single supply line to injectors each operating to dispense a metered amount of lubricant to a single lubrication point. Reference may be made to U.S. Pat. No. 6,705,432, incorporated herein by reference, for further details regarding an exemplary Centro-Matic® system. The Helios® system is a dual line system.

Although these systems have been proven to be reliable and commercially successful, there is a need for an improved pump unit which can be used with a wide variety of lubricant distribution systems and which is of simplified design.

SUMMARY OF THE INVENTION

In one aspect the present invention is directed to an apparatus for supplying lubricant. The apparatus includes a reservoir having an interior for holding lubricant. The apparatus also includes a pump for pumping lubricant from the reservoir to a lubricant distribution system. The pump includes a cylinder having a cylinder bore. The pump also includes a cylinder inlet in communication with the interior of the reservoir for flow of lubricant from the reservoir into the cylinder bore. The pump further includes a cylinder outlet. The pump also includes a piston movable in the cylinder bore. The pump further includes a check valve in the cylinder bore between the piston and the cylinder outlet for blocking backflow through the outlet. The pump also includes a vent passage communicating with the cylinder bore at a location upstream from the check valve for venting the lubricant distribution system. The pump further includes a linear position drive mechanism for moving the piston in a forward direction in the cylinder bore through a pumping stroke for pumping lubricant through the cylinder outlet to the lubricant distribution system, in a rearward direction through a non-venting return stroke in which the vent passage does not communicate with the interior of the reservoir, and in a rearward direction through a venting return stroke in which the vent passage communicates with the interior of the reservoir. The apparatus further includes a controller for calibrating and controlling the operation of the linear position drive mechanism.

In another aspect, the present invention includes a method of supplying lubricant to a vented lubricant distribution system and to a non-vented lubricant distribution system that includes operating a linear position drive mechanism to move a piston in a cylinder bore through a pumping stroke to pump lubricant through an outlet of the cylinder bore to the vented lubricant distribution system and/or to the non-vented lubricant distribution system. The method also includes operating the linear position drive mechanism to move the piston through a non-venting return stroke having a first length during which the non-vented lubricant distribution system is not vented. The method further includes calibrating the linear position drive mechanism and operating the calibrated linear position drive mechanism to move the piston through a venting return stroke having a second length different from the first length during which the vented lubricant distribution system is vented.

In one aspect the present invention is directed to an apparatus for pumping lubricant that includes a reservoir having an interior for holding lubricant. The apparatus also includes a stirrer rotatable in the reservoir. One advantage of the stirrer includes maintaining the lubricant at a viscosity sufficiently low that the lubricant more easily flows. In colder environmental conditions, the lubricant may become stiff or thick. The stirrer fluidizes the lubricant which allows the lubricant pump to operate more efficiently. The apparatus further includes a force-feed mechanism on the stirrer operable on rotation of the stirrer to exert a pushing force pushing lubricant from the reservoir along a defined flow path. The apparatus also includes a pump below the reservoir for pumping lubricant from the reservoir to the lubricant distribution system. The pump includes a cylinder having a cylinder bore and a piston movable in the cylinder bore through a pumping stroke and a return stroke. The cylinder bore communicates with the interior of the reservoir via said defined flow path whereby rotation of the stirrer causes the force-feed mechanism on the stirrer to exert the pushing force pushing lubricant along the defined flow path, and such that movement of the piston through said return stroke generates a reduced pressure in the cylinder bore to exert a pulling force pulling lubricant along the defined flow path, the pushing and pulling forces combining to move lubricant along the defined flow path from the reservoir into the cylinder bore.

In another aspect, the present invention includes a method of pumping lubricant from a reservoir which includes rotating a stirrer in the reservoir to cause a force-feed mechanism on the stirrer to exert a pushing force pushing lubricant along a defined flow path from the reservoir to a cylinder bore. The method also includes moving a piston in the cylinder bore through a pumping stroke. The method further includes moving the piston through a return stroke to generate a reduced pressure in the cylinder bore. The reduced pressure exerts a pulling force pulling lubricant along the defined flow path. The pushing and pulling forces combine to move lubricant along the defined flow path into the cylinder bore.

In one aspect the present invention is directed to a system for supplying lubricant which includes a reservoir for holding lubricant. The reservoir has a reservoir outlet. The system also includes a pump comprising a cylinder defining a cylinder bore, a cylinder inlet in communication with the reservoir outlet for flow of lubricant from the reservoir into the cylinder bore, a cylinder outlet, and a piston movable in the cylinder bore. The system further includes a lubricant delivery system in communication with the cylinder outlet for delivering lubricant. The system further includes a drive mechanism comprising a stepper motor for reciprocating the piston in the cylinder bore. The system also includes a sensor for sensing a condition of the system and providing a condition signal. The system also includes an alarm. The system further includes a controller for controlling the operation of the motor by selectively energizing the motor to reciprocate the piston. The controller is responsive to the condition signal to modify system operation such as by selectively energizing the alarm when the condition signal is outside a preset range.

In another aspect, the present invention includes a system for supplying lubricant which includes a reservoir for holding lubricant. The reservoir has a reservoir outlet. The system also comprises a pump including a cylinder defining a cylinder bore, a cylinder inlet in communication with the reservoir outlet for flow of lubricant from the reservoir into the cylinder bore, a cylinder outlet, and a piston movable in the cylinder bore. The system also includes a lubricant delivery system in communication with the cylinder outlet for delivering lubricant. The system further includes a drive mechanism including a motor for reciprocating the piston in the cylinder bore. The system also includes a sensor for sensing a condition of the system and providing a condition signal. The system further includes an alarm. The system also includes a controller for controlling the operation of the motor by selectively energizing the motor to reciprocate the piston. The controller is responsive to the condition signal to modify system operation such as by selectively energizing the alarm when the condition signal is outside a preset range. The sensor comprises at least one or more of the following: a pressure sensor monitoring a lubricant pressure of the lubricant delivery system, wherein the condition signal is a pressure signal and wherein the controller is responsive to the pressure signal to energize the alarm when the pressure signal indicates that the lubricant pressure is less than a minimum pressure; a pressure sensor monitoring a lubricant pressure at the pump, wherein the condition signal is a pressure signal and wherein the controller is responsive to the pressure signal to energize the alarm when the pressure signal indicates that the lubricant pressure at the pump is greater than a maximum pressure; a motion sensor monitoring a movement of the piston, wherein the condition signal is a motion signal and wherein the controller is responsive to the motion signal to energize the alarm when the motion signal indicates that the piston movement is less than a minimum movement; a level sensor monitoring a lubricant level of the reservoir, wherein the condition signal is a level signal and wherein the controller is responsive to the level signal to energize the alarm when the level signal indicates that the lubricant level is less than a minimum level; and a pressure sensor monitoring a lubricant pressure of the lubricant delivery system, wherein the condition signal is a pressure signal and wherein the controller is responsive to the pressure signal to energize the alarm when the pressure signal indicates that the lubricant pressure is less than a minimum pressure after a given period of time of motor pump operation has elapsed.

In yet another aspect, the present invention includes a system for supplying lubricant which includes a reservoir for holding lubricant. The reservoir has a reservoir outlet. The system also includes a pump including a cylinder defining a cylinder bore, a cylinder inlet in communication with the reservoir outlet for flow of lubricant from the reservoir into the cylinder bore, a cylinder outlet, and a piston movable in the cylinder bore. The system further includes a lubricant delivery system that is in communication with the cylinder outlet and has a plurality of valves, each for delivering lubricant. The system also includes a drive mechanism including a motor for reciprocating the piston in the cylinder bore. The system also includes a controller for controlling the operation of the motor by selectively energizing the motor to reciprocate the piston. The system also includes a controller area network (CAN) bus connected to the controller. The system also includes a power supply. The system further includes a power bus connected to the power supply. The system also includes a plurality of actuators, each associated with one of the valves for opening and closing its associated valve. The system further includes a plurality of CAN relays, each connected to the power bus and connected to one or more actuators for selectively energizing its connected actuators to open and close the valves associated with the actuators in order to deliver lubricant. The system also includes a plurality of CAN modules, each associated with and controlling one or more of the CAN relays. Each CAN module is connected between the CAN bus and its CAN relay for controlling its relay in response to instructions provided by the controller via the CAN bus.

In one aspect the present invention is directed to apparatus for supplying lubricant. The apparatus comprises a reservoir including a tank for holding lubricant. The reservoir includes an outlet for releasing lubricant from the reservoir. The apparatus also comprises a pump assembly including a housing having a thermally conductive top wall on which the reservoir mounts. The top wall includes an upper face facing the reservoir and a lower face opposite the upper face. The pump assembly also includes a lubricant pump mounted in the housing for pumping lubricant from the tank through the reservoir outlet and to a lubrication site. The pump includes an inlet in fluid communication with the reservoir outlet. The assembly also includes a heater mounted inside the housing in direct thermal contact with the top wall of the housing for heating lubricant held in the tank of the reservoir before passing through the reservoir outlet.

In one aspect the present invention is directed to an apparatus for supplying lubricant which includes a reservoir for holding lubricant. The reservoir has a reservoir outlet. The apparatus also includes a pump that includes a cylinder defining a cylinder bore, a cylinder inlet in communication with said reservoir outlet for flow of lubricant from the reservoir into the cylinder bore, a cylinder outlet, and a piston movable in the cylinder bore. The apparatus also includes a drive mechanism including a motor for driving the pump, such as a stepper motor for reciprocating the piston in the cylinder bore. The stepper motor has a continuous duty operating range. The apparatus further includes a controller for controlling the operation of the stepper motor by selectively applying pulse width modulated (PWM) pulses to the stepper motor to control a speed and a torque of the motor. The apparatus also includes a pressure sensor for sensing the pressure of the supplied lubricant and providing a pressure signal indicative of the pressure at the outlet. The controller is responsive to the pressure signal to selectively apply the PWM pulses to the stepper motor to vary the speed and the torque of the stepper motor as a function of the pressure signal by applying PWM pulses having a power within the continuous duty operating range of the stepper motor. The controller is also responsive to the pressure signal to selectively apply the PWM pulses to the stepper motor to vary the speed and torque of the stepper motor as a function of the pressure signal by applying overdrive PWM pulses for a period of time. The overdrive PWM pulses have an overdrive power greater than the continuous duty operating range of the stepper motor.

In another aspect, the present invention includes an apparatus for supplying lubricant which includes a reservoir for holding lubricant. The reservoir has a reservoir outlet. The apparatus also includes a pump including a cylinder defining a cylinder bore, a cylinder inlet in communication with said reservoir outlet for flow of lubricant from the reservoir into the cylinder bore, a cylinder outlet, and a piston movable in the cylinder bore. The apparatus also includes a drive mechanism including a stepper motor for reciprocating the piston in the cylinder bore. The apparatus further includes a controller for controlling the operation of the stepper motor by selectively applying PWM pulses to the stepper motor to control a speed and a torque of the motor The controller includes a memory storing a speed vs. pressure profile of the stepper motor. The apparatus also includes a pressure sensor for sensing the pressure at the outlet of the cylinder bore and providing a pressure signal indicative of the pressure at the outlet. The controller is responsive to the pressure signal to selectively apply the PWM pulses to the stepper motor to vary the speed and the torque of the stepper motor as a function of the pressure signal and as a function of the profile by applying PWM pulses having a power within the continuous duty operating range of the stepper motor.

The above summary is provided to introduce a selection of concepts in simplified form that are further described below in the Detailed Description. The summary is not intended to identify key features or essential features of the claimed subject matter, nor is it intended to be used as an aid in determining the scope of the claimed subject matter. Other objects and features will be in part apparent and in part pointed out hereinafter.

BRIEF DESCRIPTION OF THE DRAWINGS

FIG. 36 is a flow diagram of one embodiment of the invention of instructions for execution by a processor to provide self-diagnostics for a lubrication system having an open loop, non-injector system without an internal pressure transducer;

Corresponding parts are indicated by corresponding reference numbers throughout the drawings.

DETAILED DESCRIPTION

Figure 1:
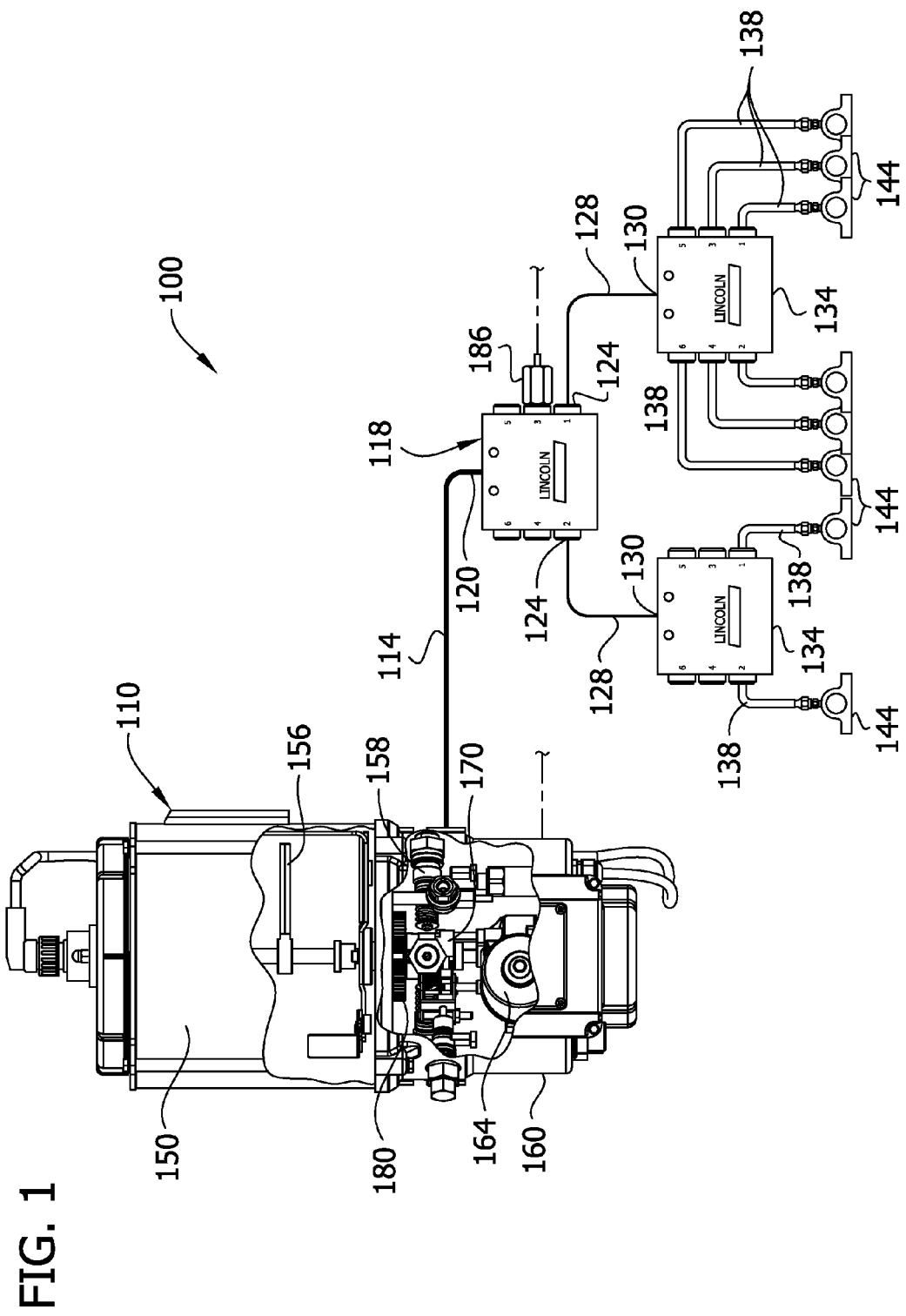
FIG. 1 is a diagrammatic view of a conventional automated lubrication system including divider valves for directing lubricant to points of lubrication.

FIG. 1 illustrates a conventional Quicklub® system, generally designated 100, comprising a pump unit 110 that operates to pump lubricant through a lube supply line 114 to a master divider valve, generally designated by 118, having an inlet 120 and multiple outlets 124 connected via lines 128 to the inlets 130 of additional (slave) divider valves, generally designated by 134. The divider valves 134 are connected via lines 138 to bearings 144 or other points of lubrication. The number of divider valves 134 used will vary depending on the number of lubrication points to be serviced.

The pump unit 110 includes a reservoir 150 for holding a lubricant (e.g., grease), a stirrer 156 for stirring the lubricant in the reservoir, and an expansible chamber pump 158 in a pump housing 160 below the reservoir. A motor 164 in the pump housing rotates the stirrer 156 to stir lubricant in the reservoir. The motor also 164 rotates an eccentric mechanism 170 to move a spring-biased piston through a series of pumping strokes to pump lubricant through the supply line 114 to the divider valve(s) 118, 134. The mechanism for driving the stirrer 156 and the eccentric mechanism 170 includes a relatively bulky drive train 180 comprising several gears. The pump unit 110 includes a programmable controller for controlling operation of the motor 164 and for receiving signals from a proximity switch 186 monitoring the operation of the master divider valve 118.

Figure 2:
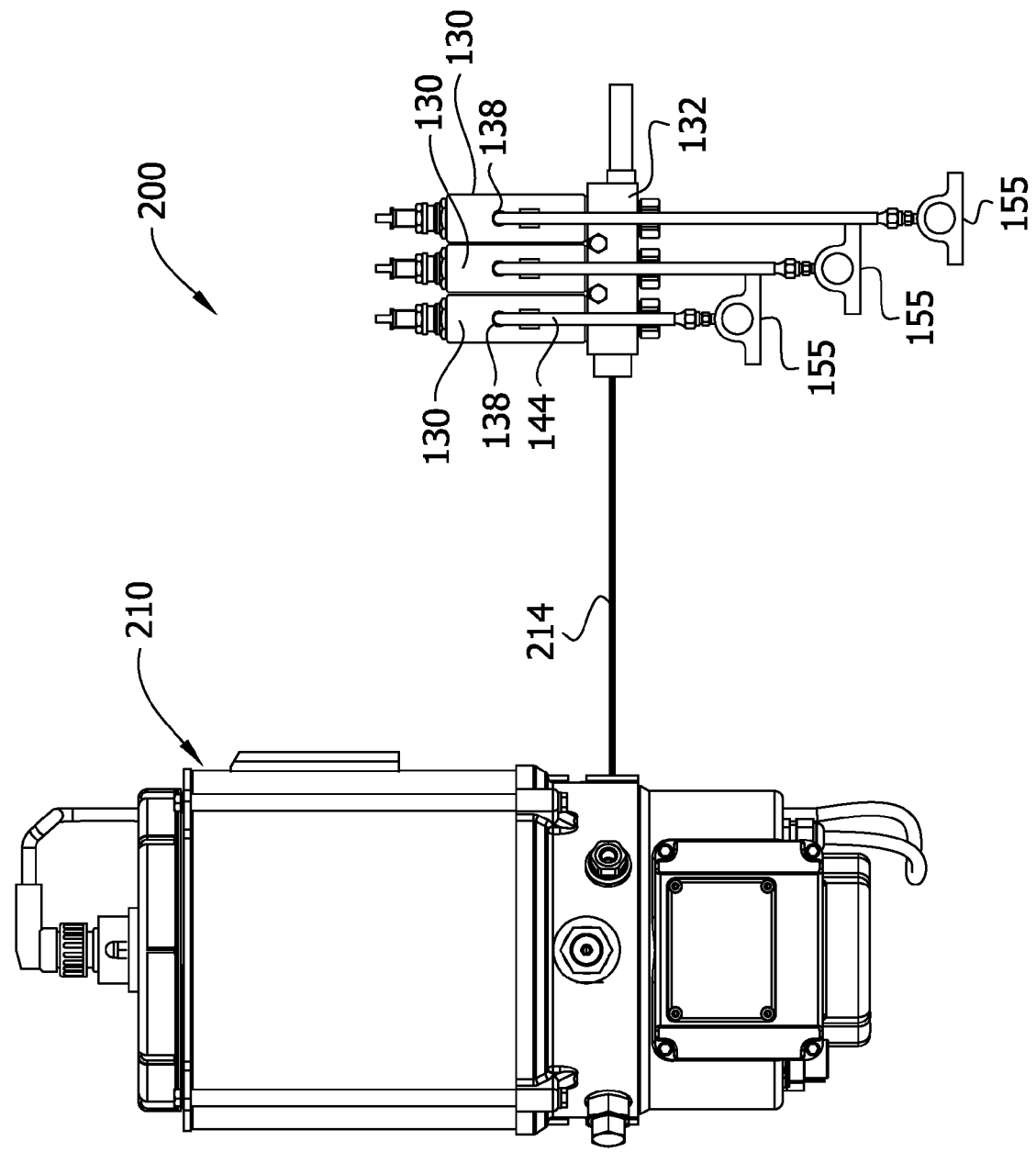
FIG. 2 is a diagrammatic view of a conventional automated lubrication system including injectors for directing lubricant to points of lubrication.

FIG. 2 illustrates a conventional Centro-Matic® system, generally designated 200, comprising a pump unit 210 that operates to pump lubricant through a lube supply line 214 to a plurality of injectors 130, each of which has an inlet communicating with the lube supply line 214 via passages in a manifold 132 and an outlet 138 connected via a line 144 to a bearing 155 or other point of lubrication. The pump unit 210 is similar to the pump unit 110 described above.

FIGS. 3-9 illustrate apparatus of the present invention comprising a pump unit 300 for supplying lubricant to different types of lubricant distribution systems (e.g., progressive systems, injector systems, CAN bus systems, dual line systems and combinations thereof). In general, the pump unit 300 comprises a reservoir, generally designated by 304, for holding a supply of lubricant (e.g., grease) and a pump housing 306 below the reservoir for housing various pump components of the unit, as will be described. The pump housing 306 includes a pair of mounting flanges 308 (FIG. 3) for mounting the pumping unit in an upright position on a suitable structure.

Figure 3:
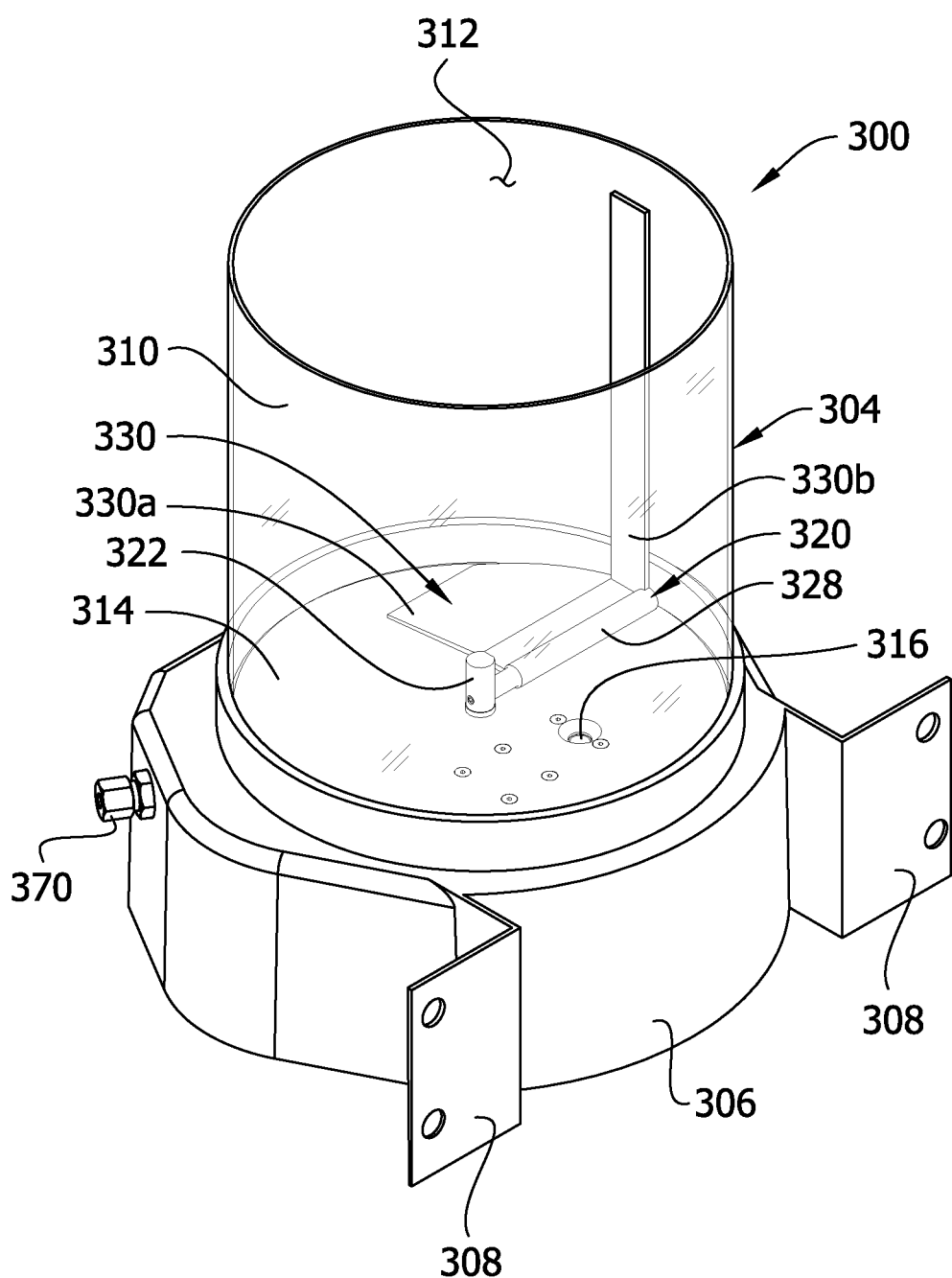
FIG. 3 is a perspective of a first embodiment of a pump unit of this invention.

In the embodiment of FIG. 3, the reservoir 304 comprises a cylindrical side wall 310, an open top 312 for loading lubricant into the reservoir, a bottom wall 314, and an outlet 316 in the bottom wall for discharging lubricant from the reservoir. A stirrer, generally designated by 320, is provided for stirring lubricant in the reservoir. The stirrer 320 comprises a rotary hub 322 rotatable about a vertical axis by a first drive mechanism 326 (FIG. 4) in the pump housing 306, an arm 328 extending laterally outward from the hub across the bottom wall 314, and a wiper 330 on the arm. The wiper 330 has a lower blade portion 330a angling down toward the bottom wall 314 and an upper portion 330b extending up alongside the side wall 310 of the reservoir. Rotation of the stirrer fluidizes lubricant in the reservoir. The lower blade portion 330a of the wiper 330 also forces lubricant down through the outlet 316 of the reservoir.

Figure 4:
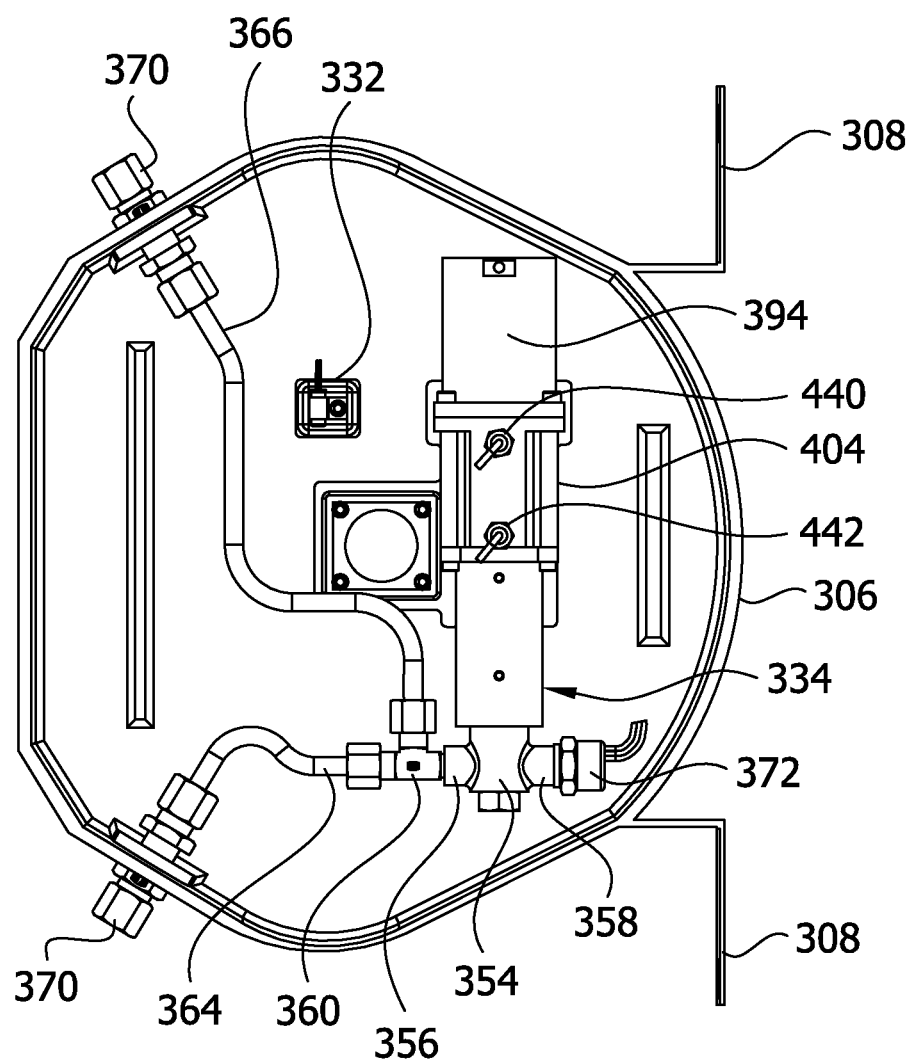
FIG. 4 is a bottom plan of the pump unit of FIG. 3.

Referring to FIG. 4, a temperature sensor 332 is mounted inside the pump housing 306 immediately adjacent the bottom wall 314 of the reservoir 304 for sensing the temperature bottom wall and thus the temperature of the lubricant in the reservoir.

Figure 5:
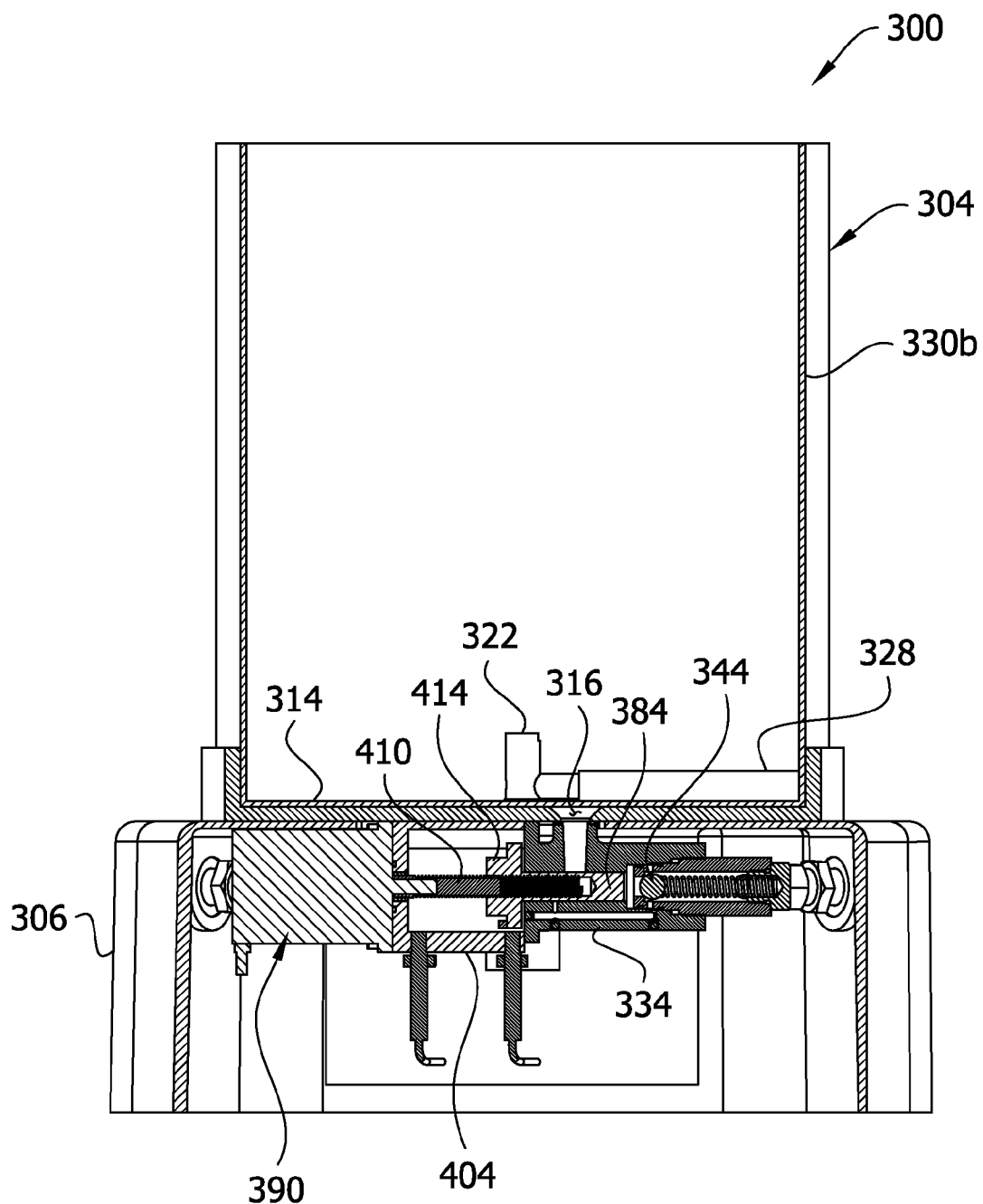
FIG. 5 is a vertical section of the pump unit of FIG. 3.
Figure 6:
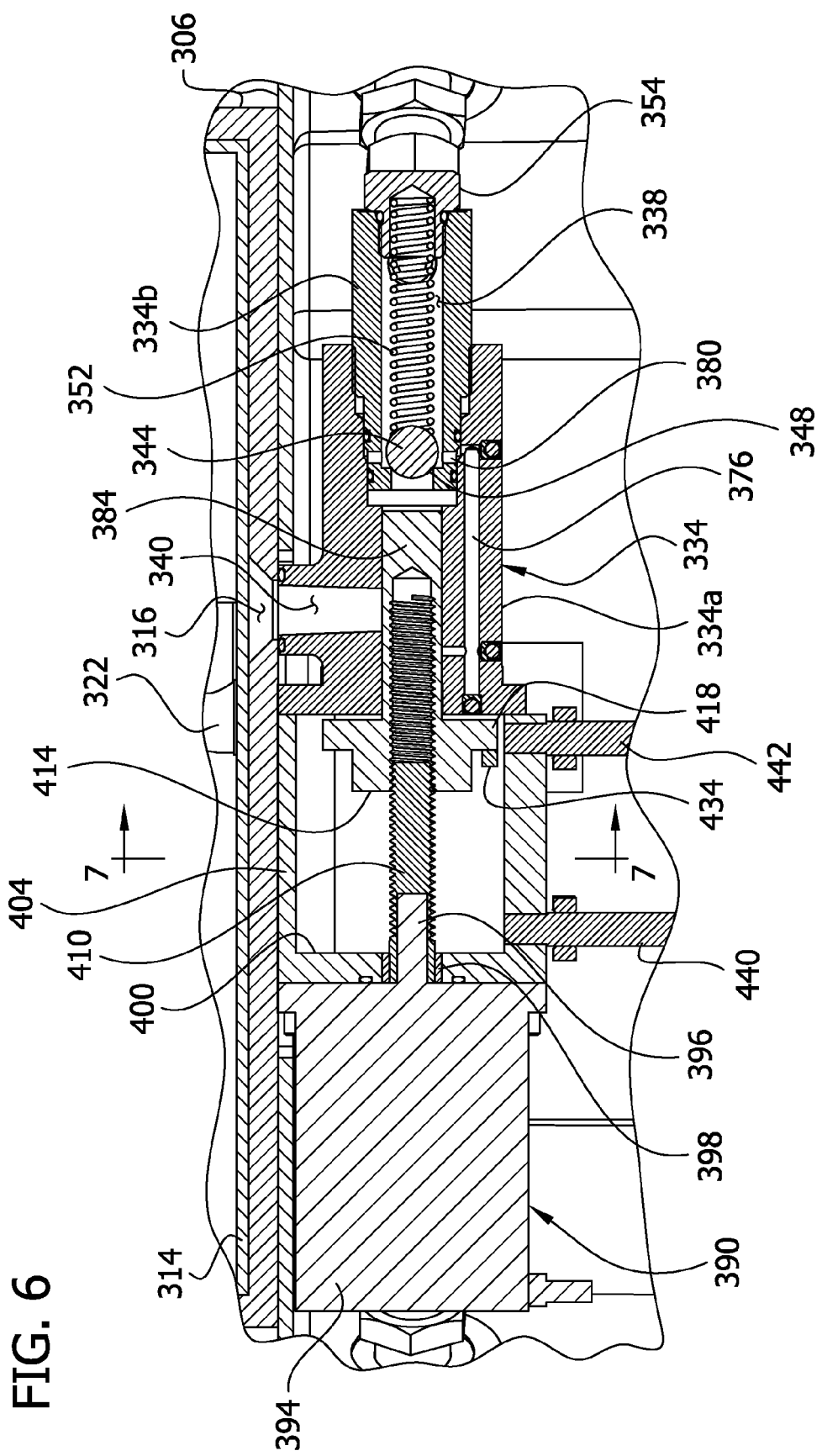
FIG. 6 is an enlarged portion of FIG. 5 illustrating a linear drive mechanism of the pump unit.

Referring to FIGS. 5 and 6, a pump cylinder, generally designated by 334, is mounted in the pump housing immediately adjacent the bottom wall 314 of the reservoir 304. In the illustrated embodiment, the pump cylinder 334 is of two-part construction, comprising a first inlet part 334a and a second outlet part 334b in threaded engagement with the inlet part. The two parts have longitudinal bores that combine to define a central longitudinal cylinder bore 338. The inlet cylinder part 334a has a radial bore 340 defining a cylinder inlet in communication with the reservoir outlet 316 for flow of lubricant from the reservoir 304 directly (i.e., along a defined flow path) into the longitudinal cylinder bore 338. A ball check valve 344 is mounted in the outlet cylinder part 334b for movement between a closed position in which it engages a valve seat 348 on the outlet cylinder part to block flow through the longitudinal cylinder bore 338 and an open position in which it allows flow through the bore. A coil compression spring 352 reacting at one end against the ball valve urges the ball valve toward its closed position. The opposite end of the spring reacts against an outlet fitting 354 threaded into the outlet end of the cylinder bore 338. The outlet fitting has a lube outlet port 356 defining a cylinder outlet and a pressure sensor port 358.

As shown in FIG. 4, a T-fitting 360 is connected to the lube outlet port 356 of the outlet fitting 354 for flow of fluid to a first feed line 364 attached to the pump housing 306 at one location and to a second feed line 366 attached to the pump housing at a second location spaced around the housing from the first location. The outlet end of each feed line 364, 366 is equipped with a quick connect/disconnect connector 370 to facilitate connection of the feed line to a lube supply line supplying lubricant to a distribution system of one kind or another. In general, only one of the two feed lines 364, 366 is used for any given distribution system, the feed line selected for use being the most suitable configuration for conditions in the field.

A pressure sensor 372 is attached to the pressure sensor port 358 of the outlet fitting 354. The pressure sensor senses the pressure at the outlet end of the cylinder bore 338 (FIG. 6).

As further illustrated in FIG. 6, a vent passage 376 in the pump cylinder 334 provides fluid communication between a first location in the longitudinal cylinder bore 338 upstream from the check valve seat 348 and a second location in the longitudinal cylinder bore downstream from the check valve seat. The downstream end of the vent passage 376 communicates with the second location via a radial bore 380 in the outlet cylinder part 334a. The purpose of this vent passage 376 will become apparent hereinafter.

Figure 7:
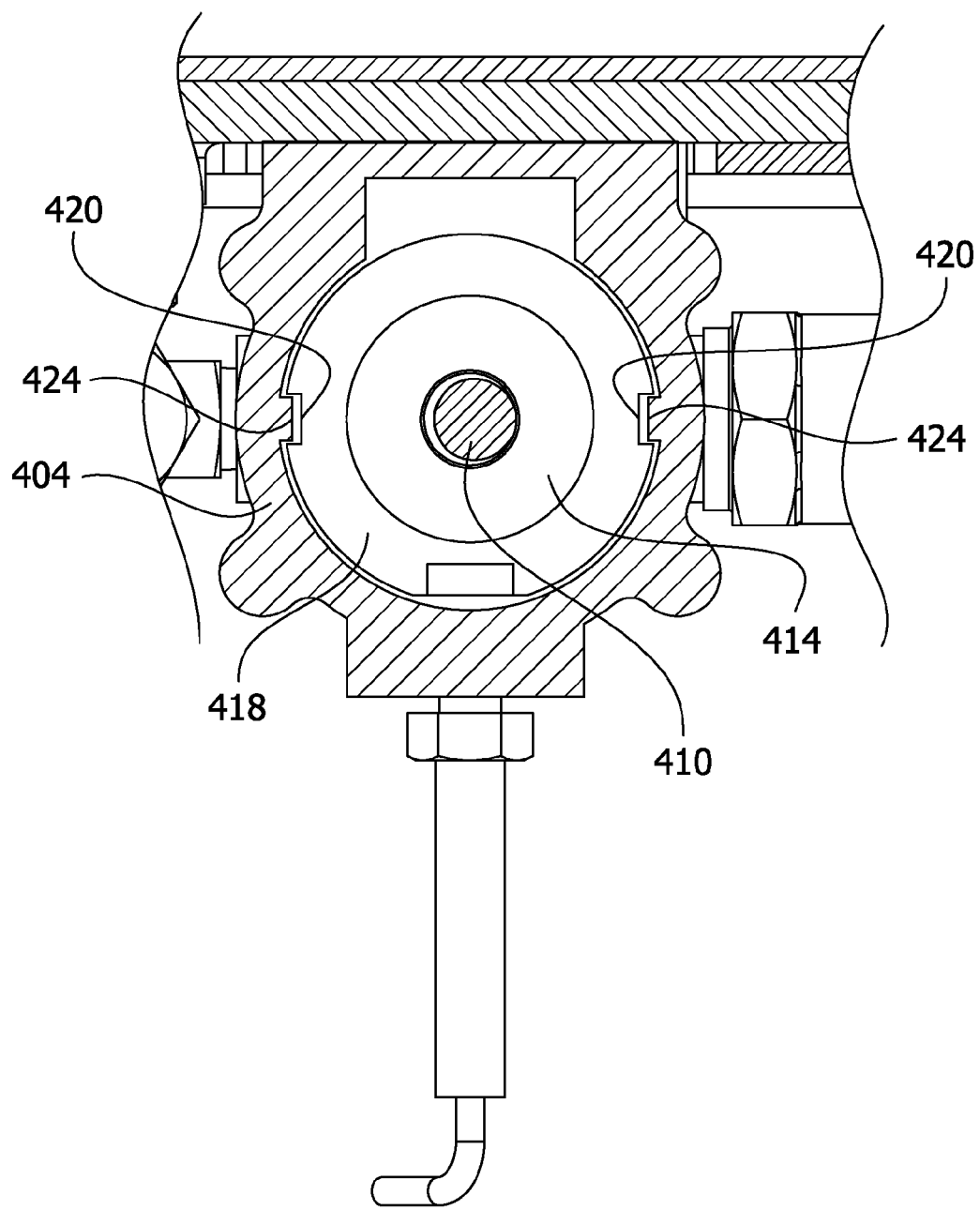
FIG. 7 is a vertical section of the linear drive mechanism of taken in the plane of 7-7 of FIG. 6.

The pump unit 300 further comprises a piston 384 movable in a reciprocating manner in the cylinder bore 338 by a second drive mechanism, generally designated 390. In the embodiment of FIGS. 3-9, the drive mechanism 390 is a linear position drive mechanism comprising a stepper motor 394 having an output shaft 396 rotatable in a bushing 398 in an end wall 400 of a follower housing 404 secured to the bottom wall of the reservoir. The shaft 396 is in driving engagement with a lead screw 410, and the lead screw is in threaded engagement with a follower 414 in the follower housing 404. The follower 414 and piston 384 are attached in a non-rotatable manner. Desirably, the follower and piston are integrally formed as one piece, but they may be formed as separate pieces non-rotatably affixed to one another. As illustrated in FIG. 7, the follower 414 has a radial collar 418 with notches 420 for receiving stationary linear guides 424 on the inside of the follower housing 404. The guides 424 extend in a direction generally parallel to the longitudinal cylinder bore 338 and hold the follower 414 (and piston 384) against rotation as the lead screw 410 is rotated by the stepper motor 394. As a result, rotation of the motor output shaft 396 in one direction causes the piston 384 to move in the cylinder bore 338 through a pumping (power) stroke and rotation of the shaft 396 in the opposite direction causes the piston to move in the cylinder bore through a return stroke. The lengths of the strokes are controlled by operation of the stepper motor.

Figure 8:
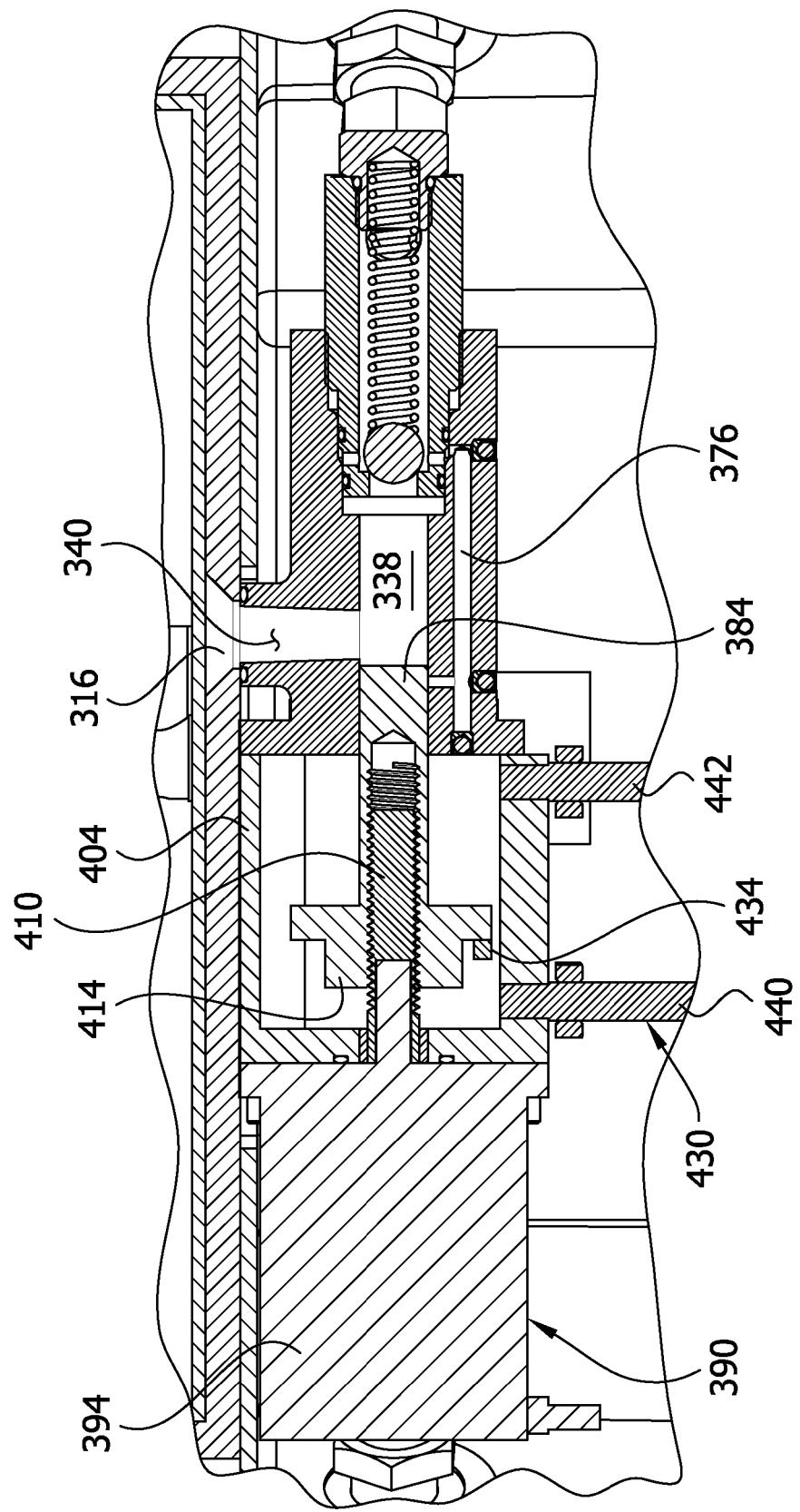
FIG. 8 is an enlarged section of the linear drive mechanism showing a calibration mechanism.

A calibration mechanism, generally designated 430 in FIG. 8 is provided for calibrating operation of the stepper motor 394 relative to the position of the piston 384 in the cylinder bore 338. In the illustrated embodiment, this mechanism 430 comprises a magnet 434 on the follower 414 movable with the piston and follower, and at least one and desirably two magnetic field sensors 440, 442 mounted on the follower housing 404 at spaced-apart locations with respect to the direction of piston movement. By way of example only, the sensors 440, 442 may be Reed switches which are in proximity to the magnet 434.

In some embodiments, one motor may be used to drive the pump and drive the stirrer. In other embodiments, the stirrer motor 326 and the stepper motor 394 are separate, distinct, independently energized motors rather than one motor for both the stirrer and the pump. One advantage of using two motors is as follows. In colder environments, the lubricant may become stiff resulting in an increased resistance to rotation of the stirrer. This increased resistance slows down rotation of the motor driving the stirrer. If the motor driving the stirrer is also driving the pump, the slower rotation reduces the rate of operation of the pump and the rate at which lubricant is pumped. In contrast, when two independently energized motors are used, if the lubricant is stiff and slows down the rotation of the stirrer motor, the pump motor can continue to operate independently to pump lubricant at a speed independent of the speed of the stirrer motor.

Figure 10:
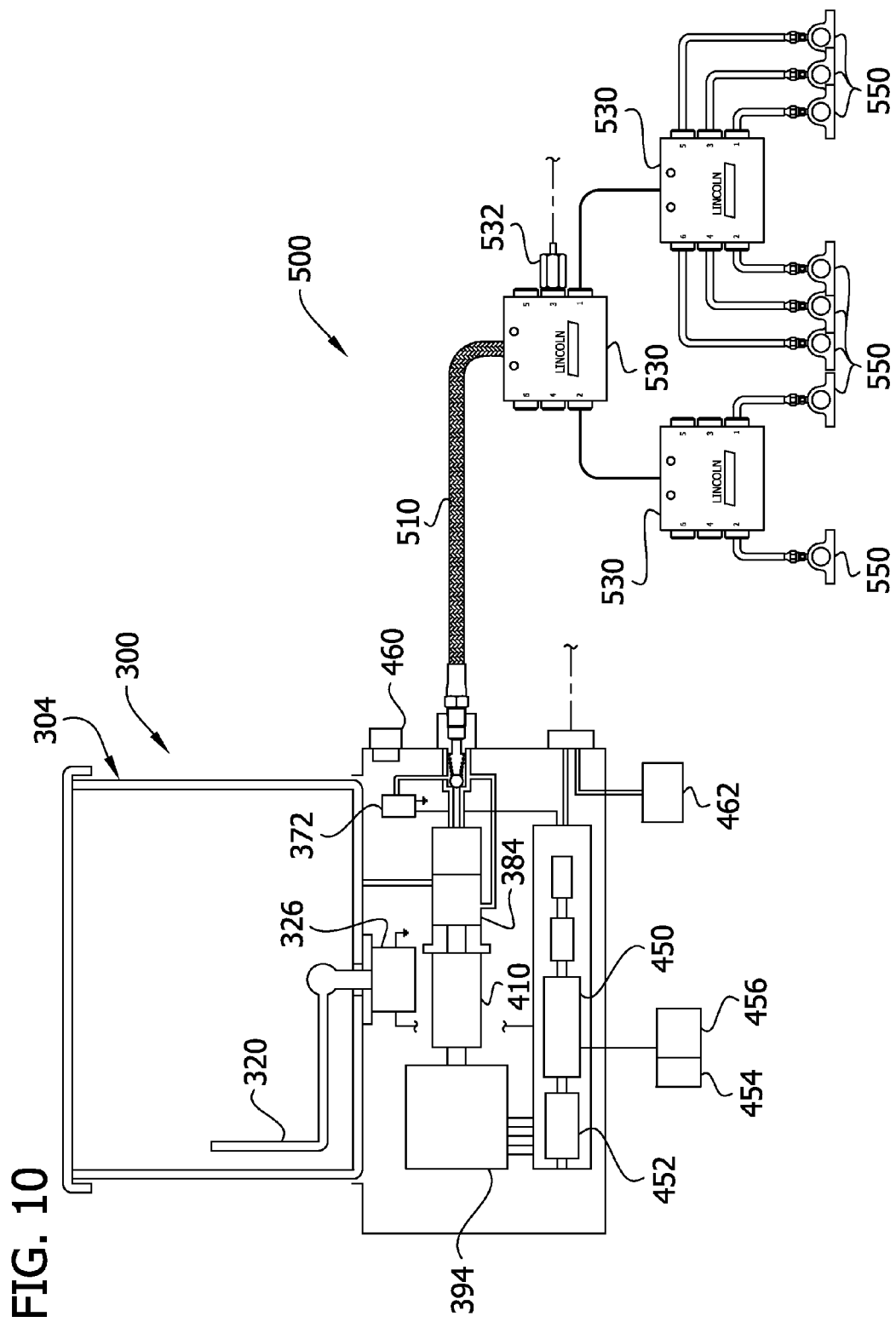
FIG. 10 is a diagrammatic view of a lubrication system of the present invention including a divider valve distribution system.
Figure 11:
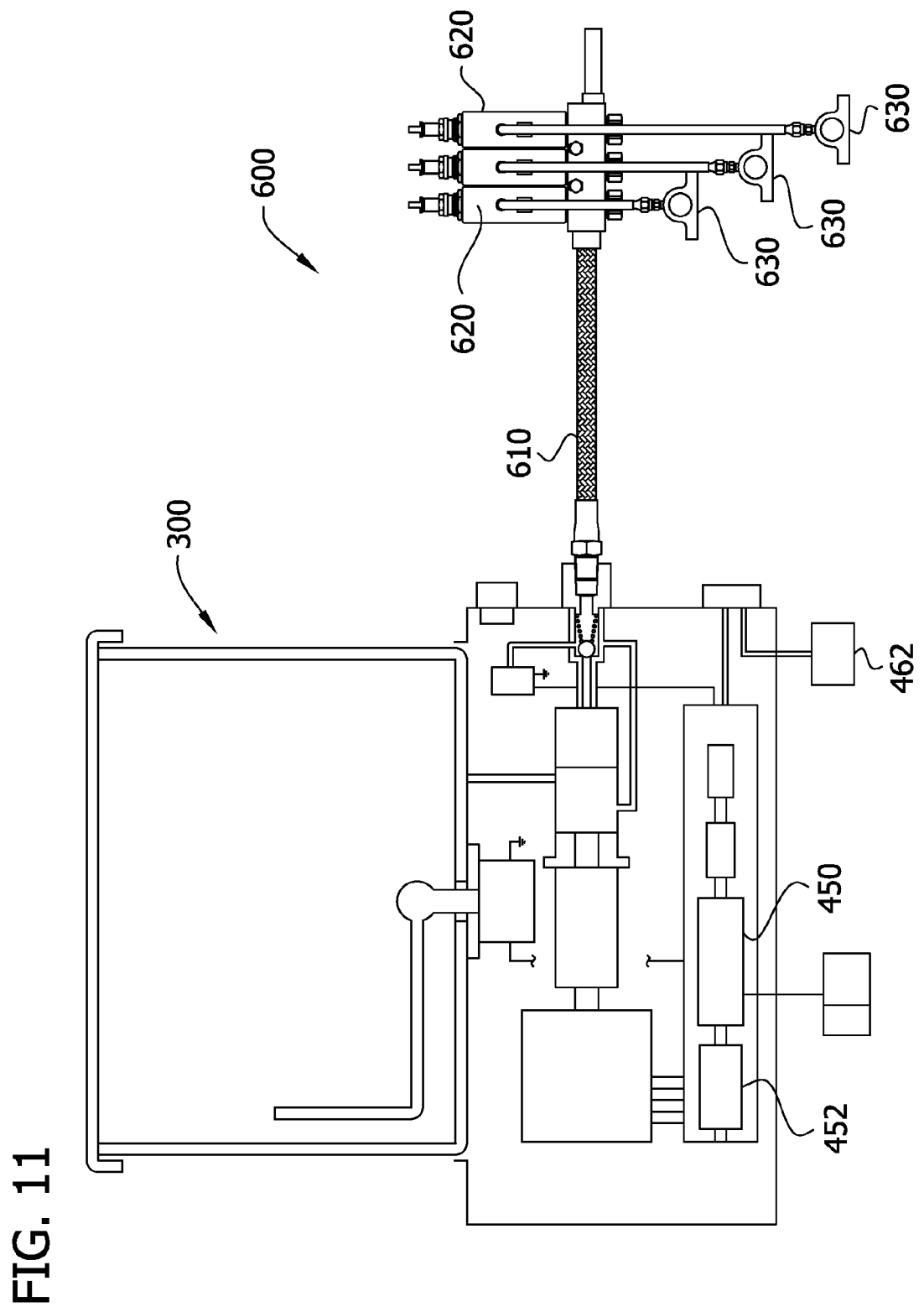
FIG. 11 is a diagrammatic view of a lubrication system of the present invention including an injector distribution system.
Figure 12:
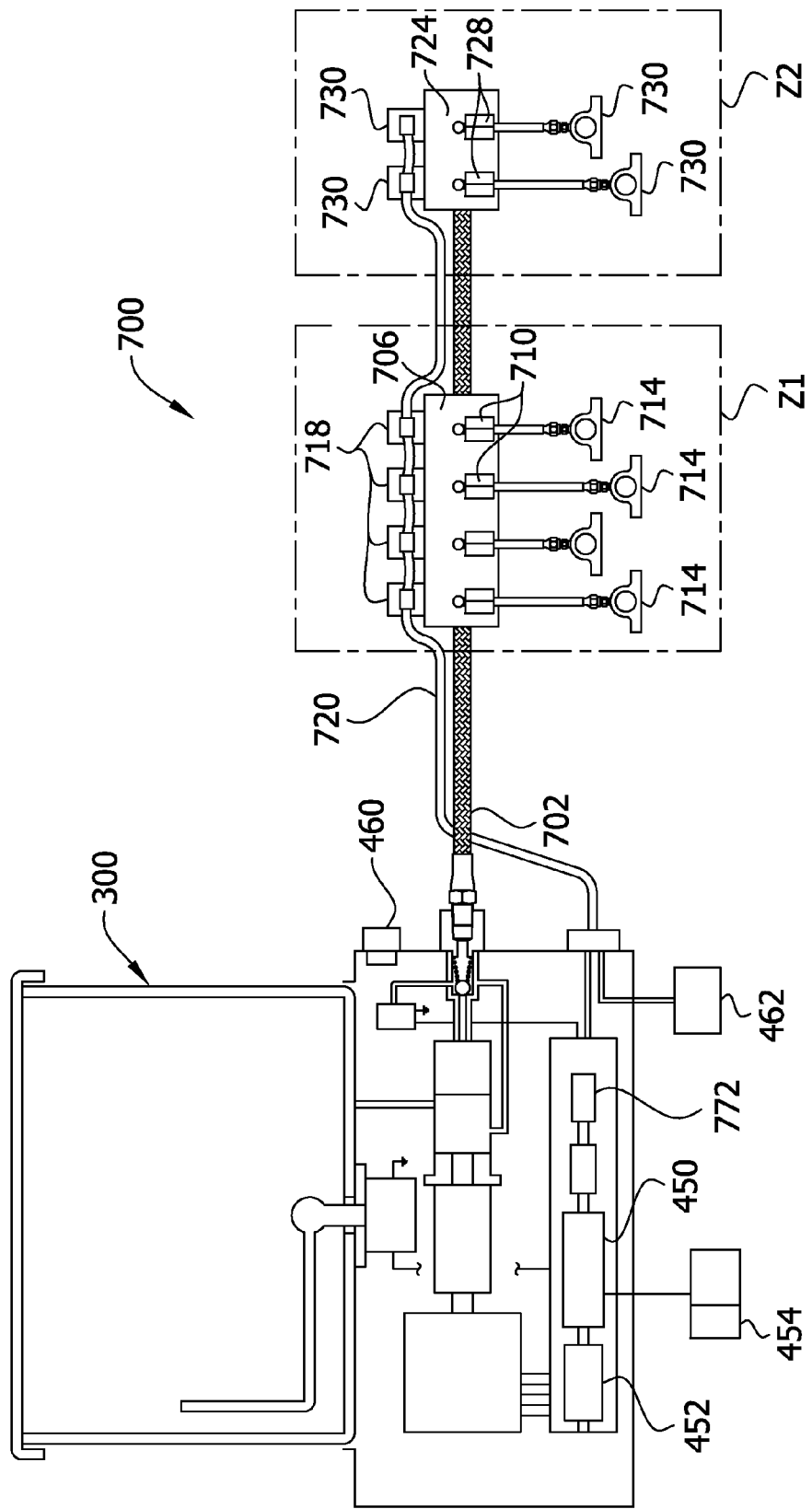
FIG. 12 is a diagrammatic view of a lubrication system of the present invention including a zoned CAN bus distribution system.

Referring to FIGS. 10-12, the pump unit 300 includes a controller 450 for calibrating and controlling the operation of the linear position drive mechanism 390. The controller 450 receives signals from the pressure sensor 372 and the calibration mechanism 430 (e.g., magnetic field sensors 440, 442). The controller 450 includes a programmable microprocessor that processes information and controls operation of the stirrer motor 326 and the stepper motor 394. An operator input 454 with a display 456 is provided for inputting information to the controller and for use by the controller to present information to an operator. This information may include the type of lubrication distribution system to be used with the pumping unit, the volume of lubricant to be delivered to each point of lubrication (e.g., bearing), and the frequency of lubrication events. Information can also be uploaded and downloaded to and from the controller via a USB port 460 on the pump housing of the pump unit.

Power is supplied to the pump unit 300 via a power supply 462 which is typically the power supply of the equipment being lubricated.

As noted previously, the pump unit 300 of this invention can be used with different distribution systems. By way of example but not limitation, the pump unit may be used with a progressive (divider) valve distribution system 500 as shown FIG. 10, an injector distribution system 600 as shown in FIG. 11, a CAN bus distribution system 700 as shown in FIG. 12, dual-line systems as shown in FIGS. 19A-19C, zoned distribution systems as shown in FIGS. 16-19, and combinations of these systems. Examples of these systems are described below.

In the progressive distribution system 500 of FIG. 10, the pump unit 300 pumps the desired amount of lubricant through a lube supply line 510 to a series of conventional divider valves 530 at desired intervals of time. The divider valves operate to deliver metered amounts of lubricant to respective points of lubrication 550 (e.g., bearings). Each divider valve has a proximity switch 532 connected to the controller 450 for monitoring proper operation of the divider valve. The controller 450 is suitably programmed (e.g., via the operator input 454 and/or USB port 460) to operate the pump unit 300 as follows.

Desirably, the controller 450 initiates operation of the stirrer motor 326 before the stepper motor 394 is operated to reciprocate the piston 384. This sequence allows the stirrer 320 to fluidize the lubricant and prime the pump cylinder 334 with lubricant before the actual pumping of lubricant begins, which can be especially advantageous if the lubricant is in a viscous condition, as in cold-temperature environments. After a suitable delay of predetermined length (e.g., eight-twelve seconds), the stepper motor 394 is energized to move the piston 384 through a succession of pumping (power) strokes and return strokes to pump the desired amount of lubricant through the feed line (364 or 366) connected to the distribution lube supply line 510. When the pump unit is operated in this mode, the downstream end of the piston 384 remains downstream from the location at which the vent passage 376 communicates with the cylinder bore 338 (see FIG. 8 showing the piston at the limit of its return stroke). As a result, there is no venting of the lube supply line 510 of the distribution system 500 to the reservoir 304 of the pump unit during the return strokes of the piston 384. Such venting is unnecessary in a progressive (divider) valve distribution application. A piston return stroke in which venting does not occur is hereinafter referred to as a "non-venting" return stroke.

Figure 9:
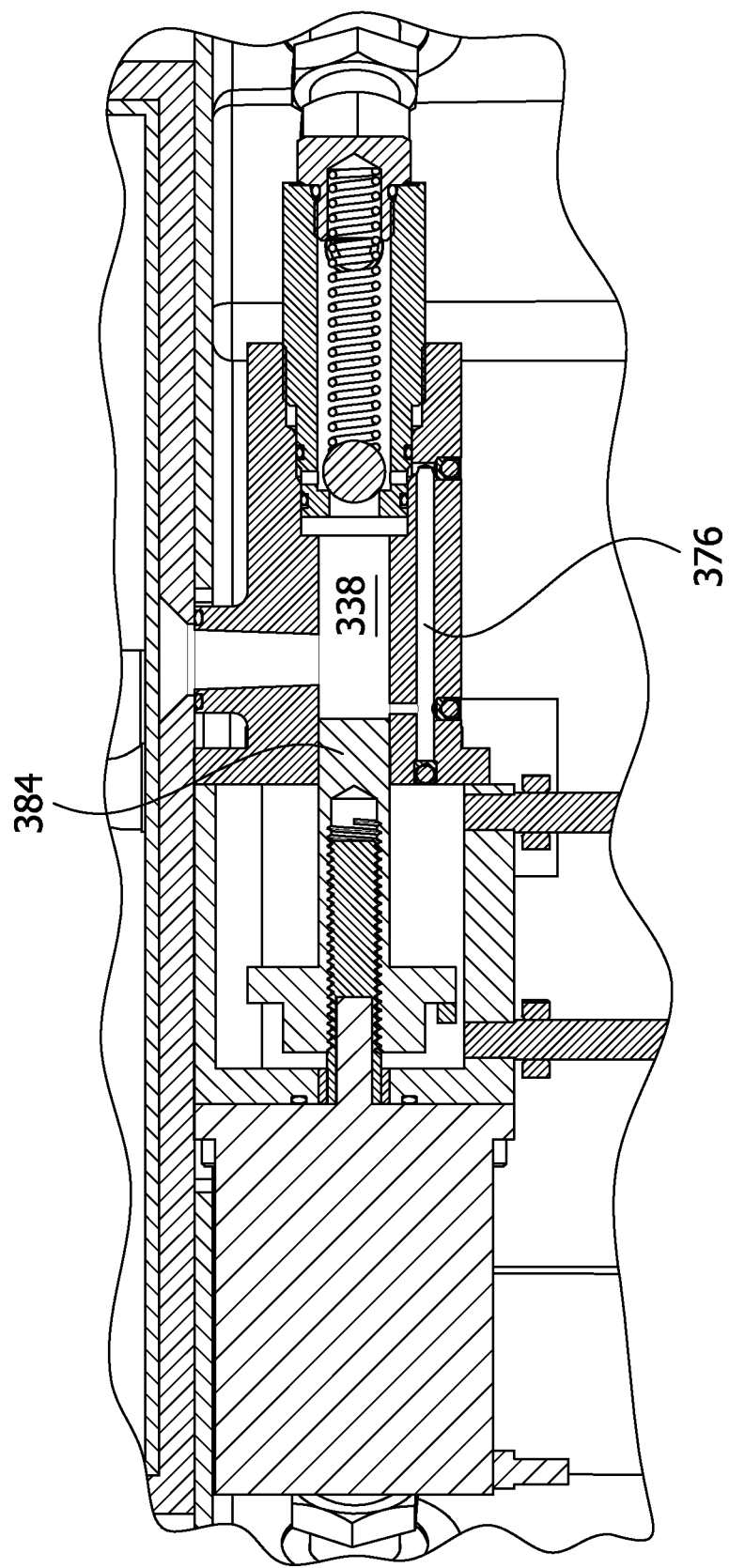
FIG. 9 is a FIG. 8 is an enlarged section of the linear drive mechanism showing a piston at a limit of a return stroke.

In the injector distribution system 600 of FIG. 11, the controller 450 of the pump unit 300 is programmed to operate the unit to pump the desired amount of lubricant through a lube supply line 610 to a plurality of injectors 620 at desired intervals of time. The injectors operate to deliver metered amounts of lubricant to respective points of lubrication 630 (e.g., bearings). In this mode, the pump unit 300 operates as described above except that during its return stroke the piston 384 moves to a vent position upstream from the location at which the vent passage 376 communicates with the cylinder bore 338 (see FIG. 9 showing the piston at the limit of its return stroke). As a result, lubricant is vented to the reservoir 304 during the return strokes of the piston to allow the injectors 620 to reset for successive cycles of operation. A piston return stroke in which venting occurs is hereinafter referred to as a "venting" return stroke.

In the CAN bus and divider valve distribution system 700 of FIG. 12, the controller 450 of the pump unit 300 is programmed to operate the unit to pump the desired amount of lubricant through a lube supply line 702 to a first valve body comprising a manifold 706 having outlets 710 connected to respective points of lubrication 714 (e.g., bearings) in a first zone Z1. The flow of fluid through the bores is controlled by respective electronically controlled valves 718 receiving control signals from the controller 450 and receiving power to energize the valves via a power field bus 720. In the embodiment of FIG. 12, lubricant is also delivered by the lube supply line 710 to a second valve body comprising a manifold 724 fluidly connected in series with the first manifold 706. The manifold 724 has outlets 728 connected to respective points of lubrication 730 (e.g., bearings) in a second zone Z2. The flow of fluid through the manifold to the outlets 728 is controlled by respective electronically controlled valves 730 receiving control signals from the controller 450 and receiving power to energize the valves via the power field bus 720.

Figure 13:
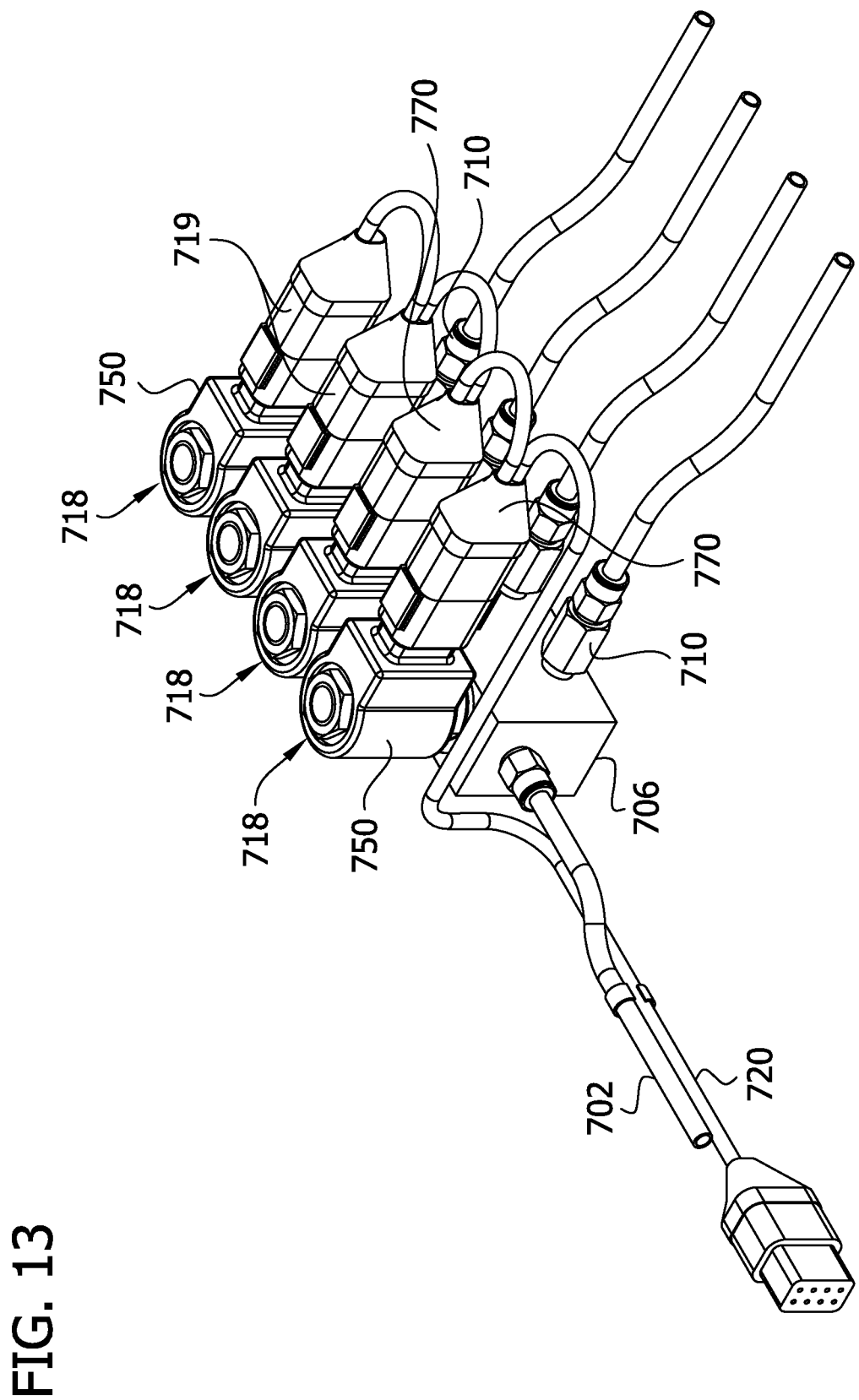
FIG. 13 is a perspective of a valve body and a plurality of electronically controlled valves used in the CAN bus lubrication distribution system of FIG. 12.
Figure 14:
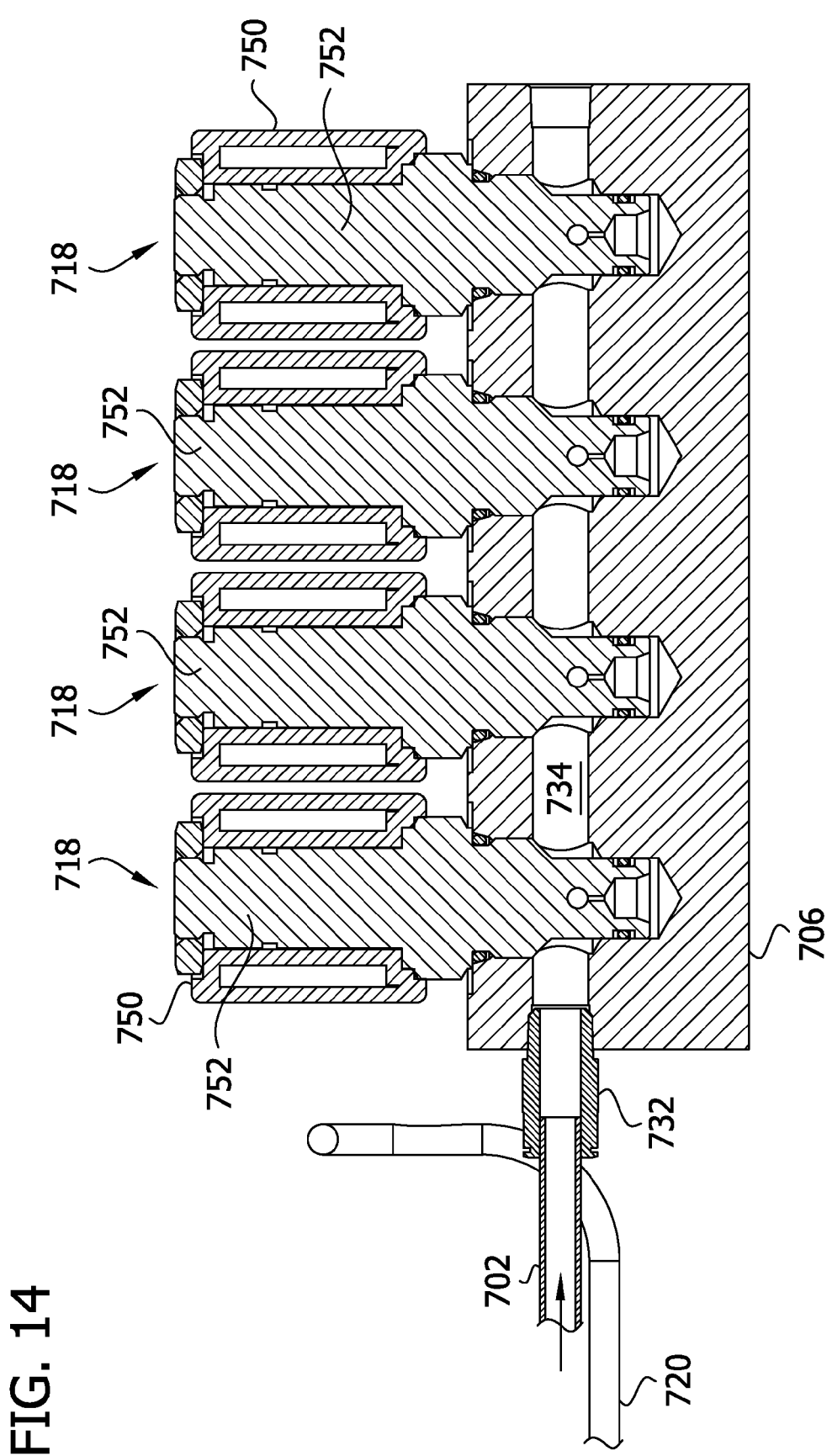
FIG. 14 is a vertical section of the valve body and electronically controlled valves of FIG. 13.
Figure 15:
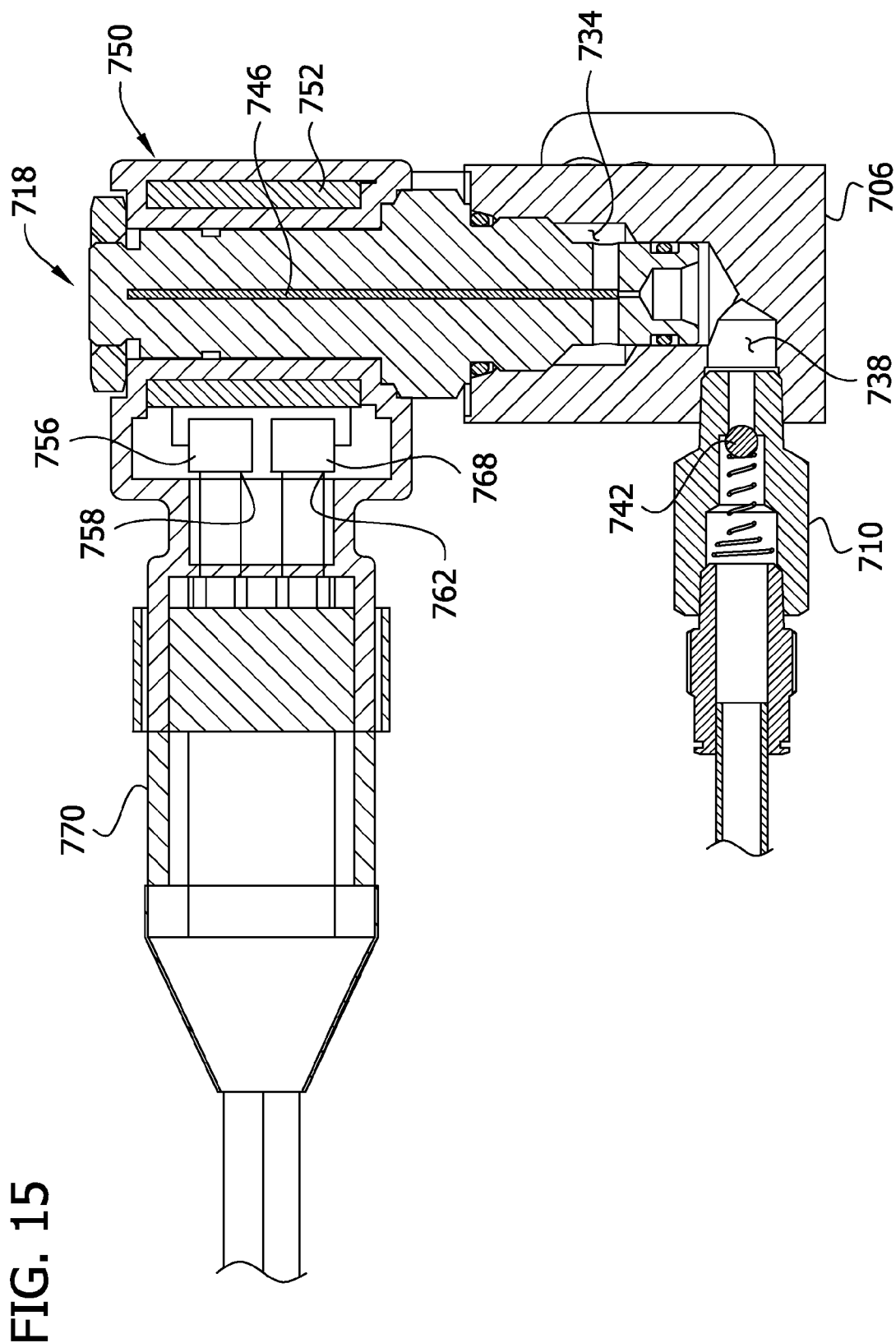
FIG. 15 is a vertical section similar to FIG. 14 but rotated 90 degrees.

FIGS. 13-15 illustrate an exemplary valve body (manifold 706) and a plurality of exemplary electronically controlled valves (valves 718) used in the CAN bus lubrication distribution system of FIG. 12. The manifold 706 is equipped with four such valves, but this number may vary from one to two or more. The manifold 706 comprises a block having an inlet 732 connected to the lube supply line 702, a supply passage 734 extending from the inlet through the manifold, and a plurality of outlet passages 738 connecting the supply passage and respective outlets 710 of the manifold. Ball check valves 742 in the outlets 710 are biased toward their closed positions by springs to prevent backflow.

Each valve 718 comprises a valve member 746 (e.g., a movable plunger as shown in FIG. 15) associated with a respective outlet 710 of the manifold 706 for controlling fluid flow through the outlet. The valve member is moved between its open and closed positions by an electronically controlled actuator 750, which in this embodiment includes a solenoid 752. The actuator 750 also includes an electronic control circuit (ECC) 756 (e.g., a microcontroller circuit) for controlling the operation of the actuator. Each ECC is part of the CAN network connected to the controller 450 of the pump unit 300 and responds to CAN messages from the controller that are addressed to the particular ECC 756. The ECC has a control port 758 adapted to receive the CAN messages for operating the actuator 750 to move the valve member 746 between its open and closed positions. The actuator 750 has a power port 762 for receiving power for selectively energizing the solenoid 752. In one embodiment, the actuator 750 includes a switch 768 (FIG. 15) controlled by the ECC and connected to the power wires. The switch 768 is selectively closed by the ECC 756 to connect the external power supply via the power wires to the solenoid 752 (or other device) which moves the valve member 746 to permit fluid flow.

As shown in FIG. 13, the power field bus 720 is daisy-chained from one valve 718 to another valve 718 via suitable electrical connectors 770. If the ECC requires power, it may be connected to the external power supply via the switch 768 and the power wires.

In one embodiment, the power field bus 720 comprises a four-wire bus with two wires carrying CAN messages from the communications port (COM 772) of the controller 450 of the pumping unit 300 to the electronically controlled circuit (ECC 756) for controlling the operation of the electronically-operated valves 718, and two wires supplying power from an external power supply (e.g., supplying 24 volts) to a respective electronically controlled actuator 750 for energizing a respective solenoid. The power wires may be connected to a power supply of the apparatus being lubricated, or the power wires may be connected to a separate power supply. The controller 450 is programmable by an operator, such as by the input device 454 (e.g., keypad, touch screen) and/or the USB port 460 to control the mode of operation. In the CAN bus mode, the operator may program the controller 450 to control the sequence of operation of the valves 740, the frequency of valve operation, and the amount of lubricant to be delivered.

The construction and operation of the second manifold 724 and its associated electronically controlled valves 730 (FIG. 12) is substantially identical to the construction and operation of the first manifold 706 and associated valves 718 described above. The flow of fluid through the passages in the second manifold 724 is controlled by respective electronically-operated valves receiving control signals from the controller and power to energize the solenoids 752 via the power field bus 720.

In general, the solenoid valves 718, 730 of the two manifolds 706, 724 are operated by the controller 450 of the pump unit 300 in a desired sequence, preferably one at a time, for delivering a metered amount of fluid (determined by the stroke of the piston) to respective points of lubrication in the two different zones Z1, Z2. The piston 384 of the pump unit 300 is operated to move through non-venting return strokes, as described above regarding the progressive distribution system 500.

Figure 16:
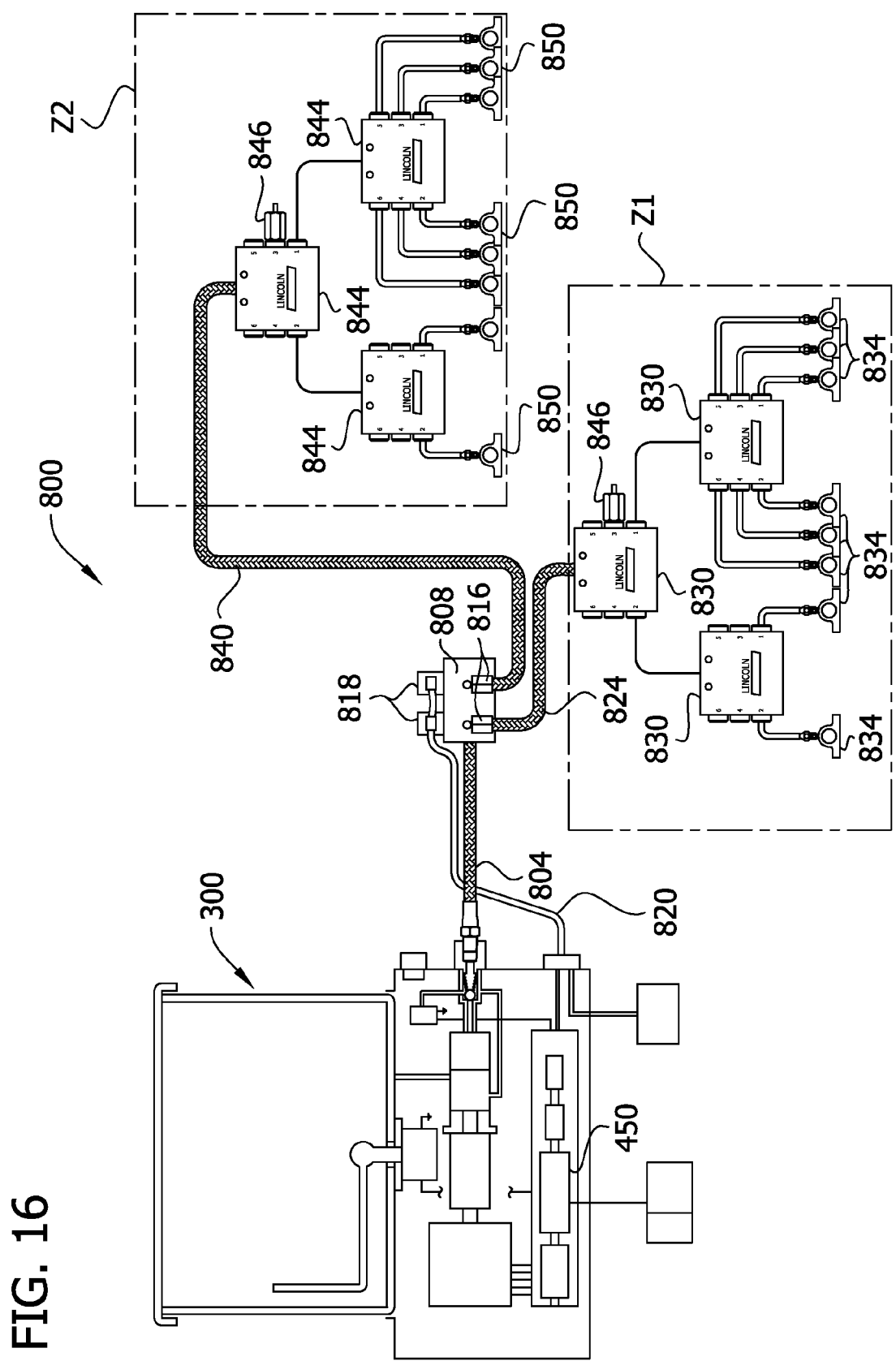
FIG. 16 is a diagrammatic view of a zoned lubrication system of the present invention, each zone including a divider valve distribution system.

In the distribution system 800 of FIG. 16, the controller is programmed to operate the pump unit 300 to pump the desired amount of lubricant through a lube supply line 804 to a manifold 808 having passages in fluid communication with two outlets 816. The flow of fluid through the passages to respective outlets is controlled by respective electronically-operated valves 818 receiving control signals from the controller 450 of the pump unit 300 via a power field bus 820. One of the two outlets 816 is connected by a lube supply line 824 to a first series of one or more divider valves 830 for delivering metered amounts of lubricant to points of lubrication 834 (e.g., bearings) in a first zone Z1. The other outlet 816 is connected by a lube supply line 840 to a second series of one or more divider valves 844 for delivering metered amounts of lubricant to points of lubrication 850 (e.g., bearings) in a second zone Z2. The master divider valve of each series of master valves 830, 844 has a proximity switch 846 connected to the controller 450 for monitoring proper operation of the divider valve. Flow of lubricant to the zones Z1, Z2 is controlled by selective activation of the electronically-operated valves 818, as described in the previous embodiment (FIGS. 12-15). When used with this type of lubrication distribution system, the piston 384 of the pump unit 300 moves through non-venting return strokes, as described above regarding the progressive distribution system 500.

In the embodiment of FIG. 16, the manifold 808 is constructed essentially the same as described above regarding FIGS. 13-15.

Figure 17:
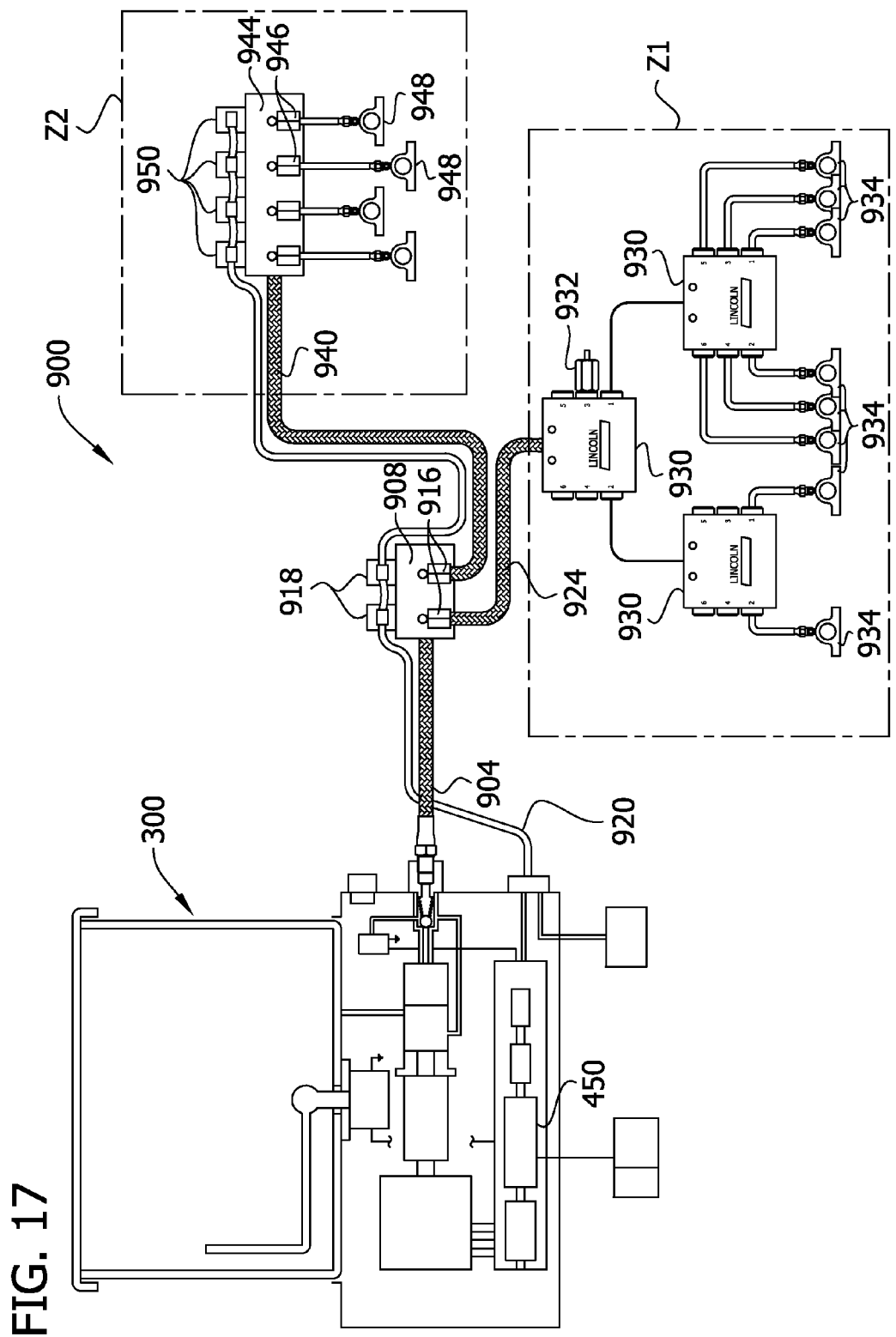
FIG. 17 is a diagrammatic view of a zoned lubrication system of the present invention, one zone including a CAN bus lubrication distribution system and another zone including a divider valve distribution system.

In the distribution system 900 of FIG. 17, the controller 450 is programmed to operate the pump unit 300 to pump the desired amount of lubricant through a lube supply line 904 to a manifold 908 having passages in fluid communication with two outlets 916. The flow of fluid through the passages to respective outlets 916 is controlled by respective solenoid-operated valves 918 receiving control signals from the controller 450 via a power field bus 920. One of the two outlets 816 is connected by a lube supply line 924 to a first series of one or more divider valves 930 for delivering metered amounts of lubricant to points of lubrication 934 (e.g., bearings) in a first zone Z1. The master divider valve of the series of divider valves 930 has a proximity switch 932 connected to the controller 450 for monitoring proper operation of the divider valve. The other outlet 916 is connected by a lube supply line 940 to a second manifold 944 having passages in fluid communication with outlets 946 connected to respective points of lubrication 948 (e.g., bearings) in a second zone Z2. The flow of fluid through the outlets 946 in the second manifold 944 is controlled by respective electronically-operated valves 950 receiving control signals from the controller via the power field bus 920. Flow of lubricant to the first and second zones Z1, Z2 is controlled by selective activation of the electronically-operated valves 918, 950, as described in the embodiment of FIGS. 12-15. When used with this type of lubrication distribution system, the piston 384 of the pump unit 300 moves through non-venting return strokes, as described above regarding the progressive distribution system 500.

In the embodiment of FIG. 17, the manifold 808 is constructed essentially the same as described above regarding FIGS. 13-15.

Figure 18:
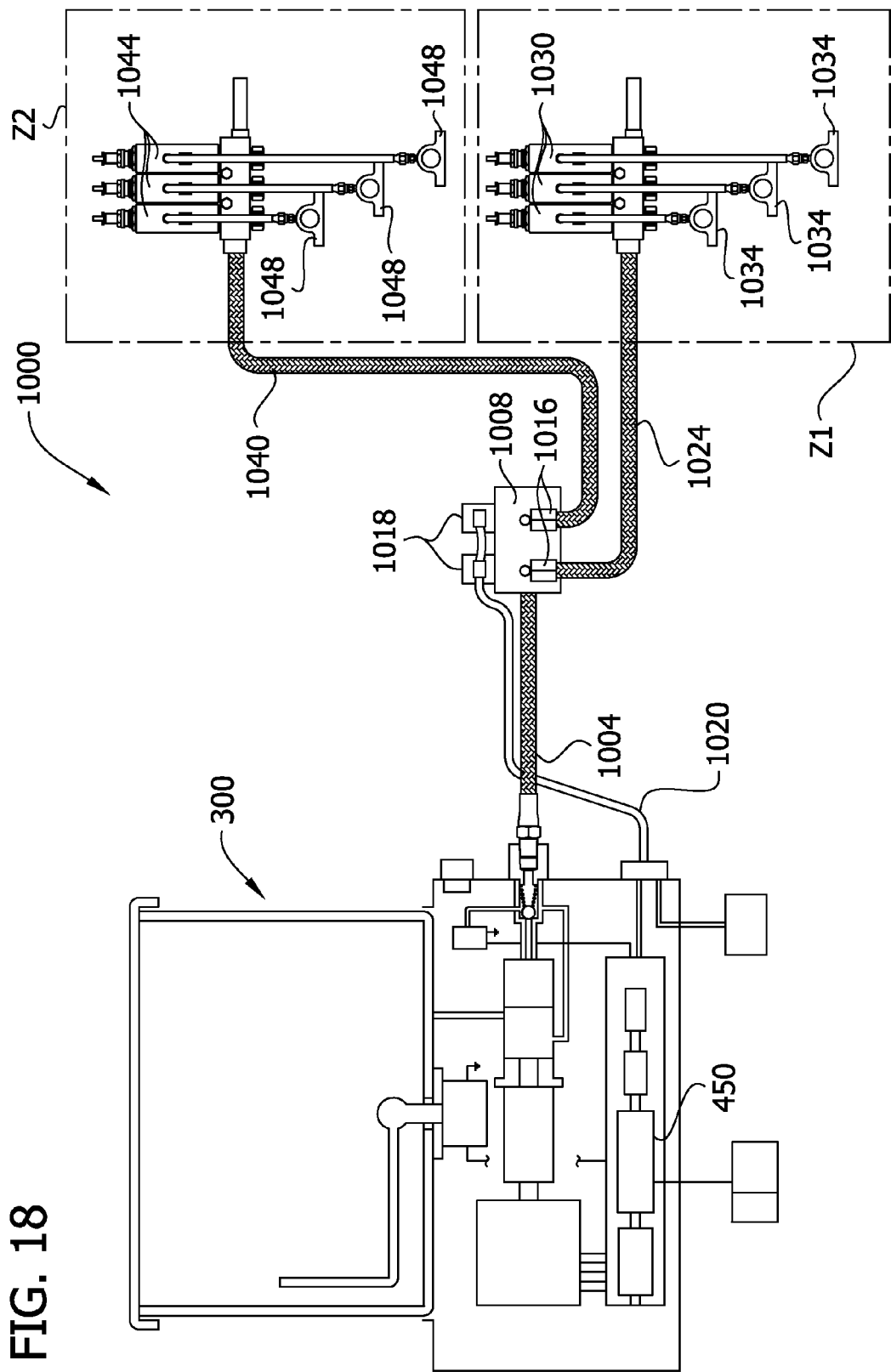
FIG. 18 is a diagrammatic view of a zoned lubrication system of the present invention, each zone including an injector distribution system.

In the distribution system 1000 of FIG. 18, the controller 450 of the pump unit 300 is programmed to operate the unit to pump the desired amount of lubricant through a lube supply line 1004 to a manifold 1008 having passages in fluid communication with two outlets 1016. The flow of fluid through the passages to respective outlets 1016 is controlled by respective electronically-operated valves 1018 receiving control signals from the controller 450 via a power field bus 1020. One of the two outlets 1016 is connected by a lube supply line 1024 to a first series of one or more injectors 1030 that deliver metered amounts of lubricant to points of lubrication 1034 (e.g., bearings) in a first zone Z1. The other outlet 1016 is connected by a lube supply line 1040 to a second series of one or more injectors 1044 that deliver metered amounts of lubricant to points of lubrication 1048 (e.g., bearings) in a second zone Z2. Flow of lubricant to the first and second zones is controlled by selective activation of the electronically-operated valves 1018, as described in the embodiment of FIGS. 12-15. When used with this type of lubrication distribution system, the piston 384 of the pump unit 300 moves through venting return strokes, as described above regarding the injector distribution system 600.

In the embodiment of FIG. 18, the manifold 1008 is constructed the same as described above regarding FIGS. 13-15, except that the check valves 742 in the outlets 1016 are eliminated to allow the injectors 1030, 1044 to reset during the return venting strokes of the piston 384.

Figure 19:
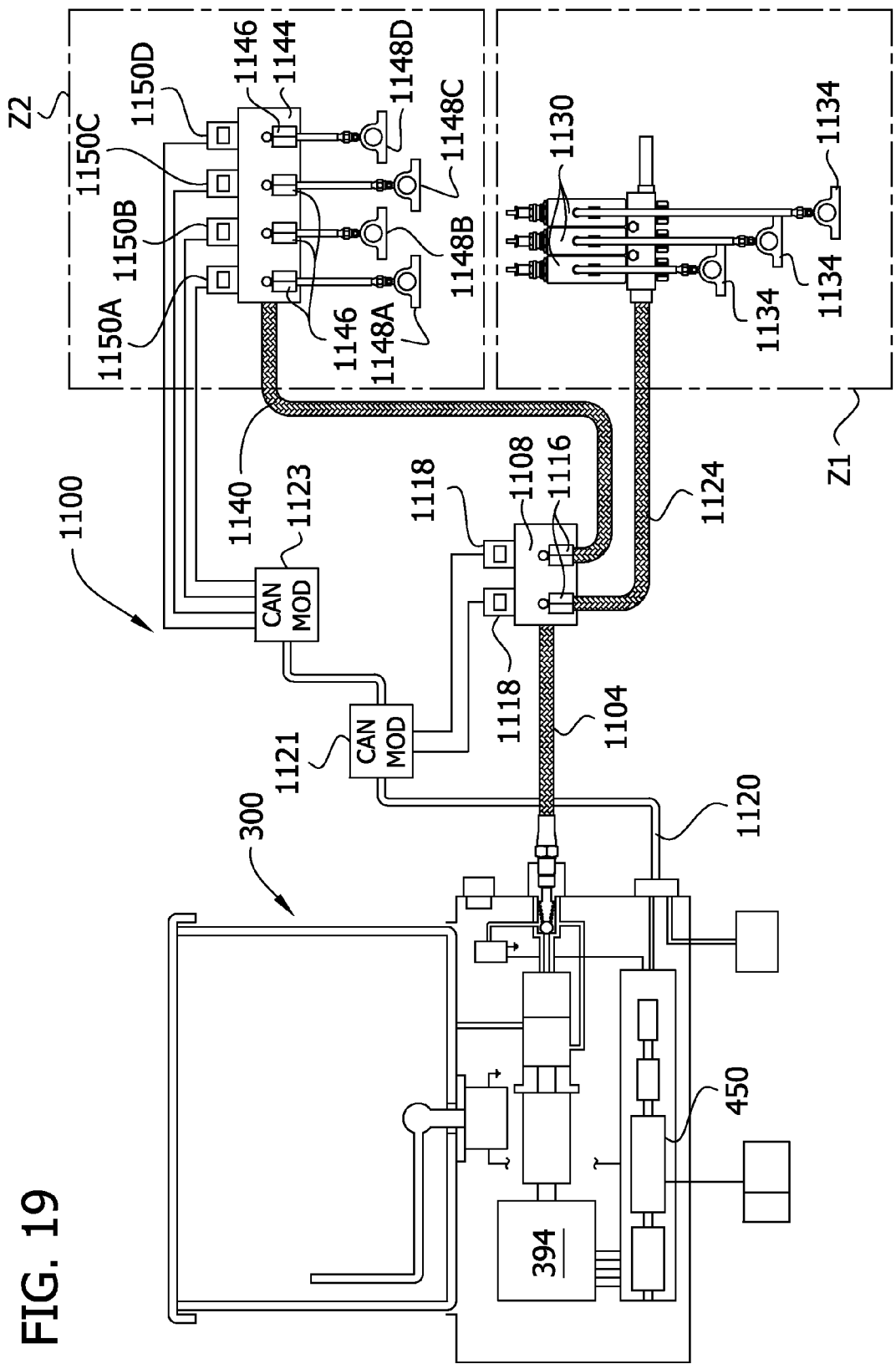
FIG. 19 is a diagrammatic view of a zoned lubrication system of the present invention, one zone including a CAN bus lubrication distribution system and another zone including an injector distribution system.
Figure 19A:
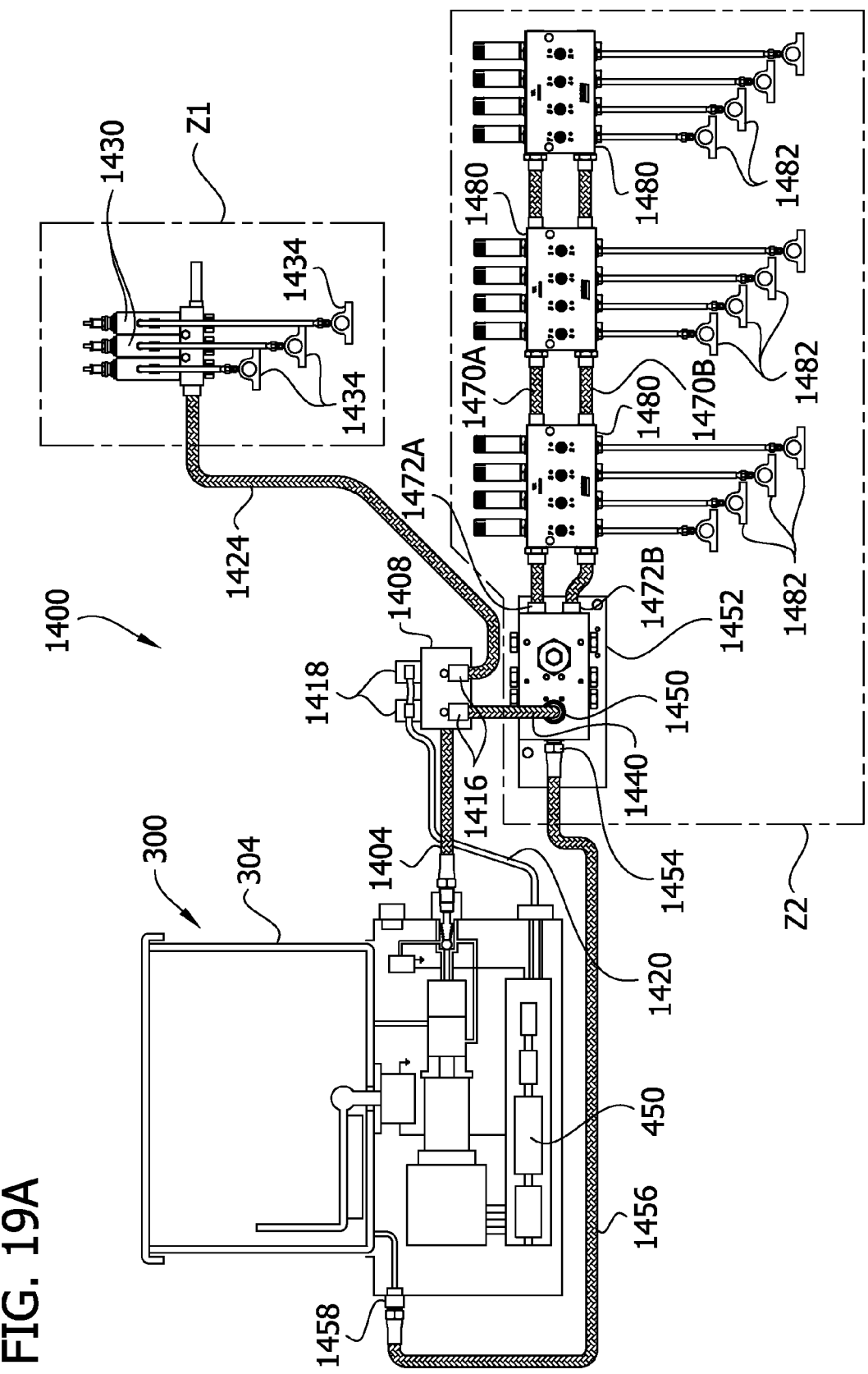
FIG. 19A is a diagrammatic view of a multiple zone lubrication system of the present invention, one zone including a single line, injector distribution system and another zone including a dual-line injector distribution system.
Figure 19B:
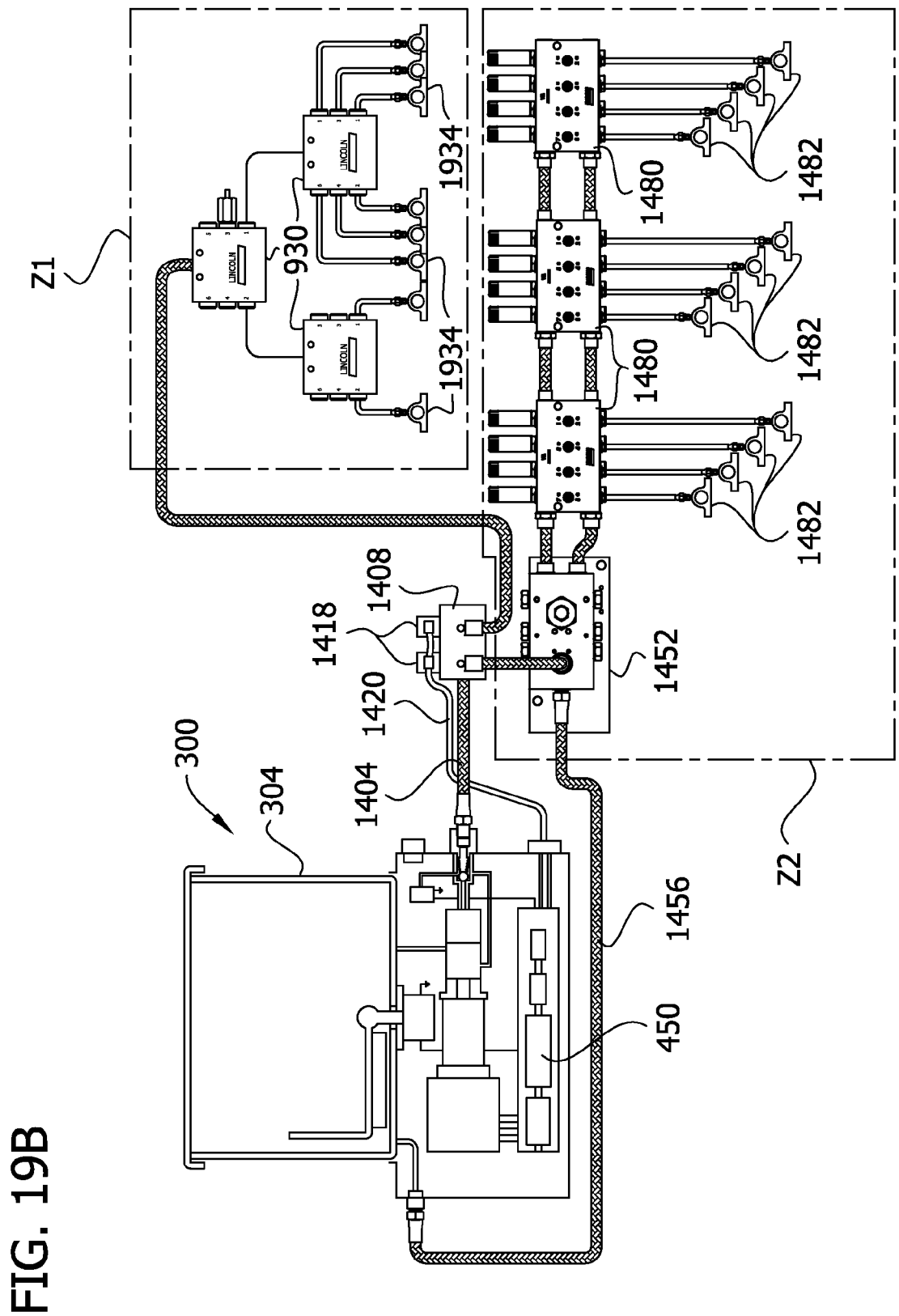
FIG. 19B is a diagrammatic view of a multiple zone lubrication system of the present invention, one zone including a single line, divider valve distribution system and another zone including a dual-line injector distribution system.
Figure 19C:
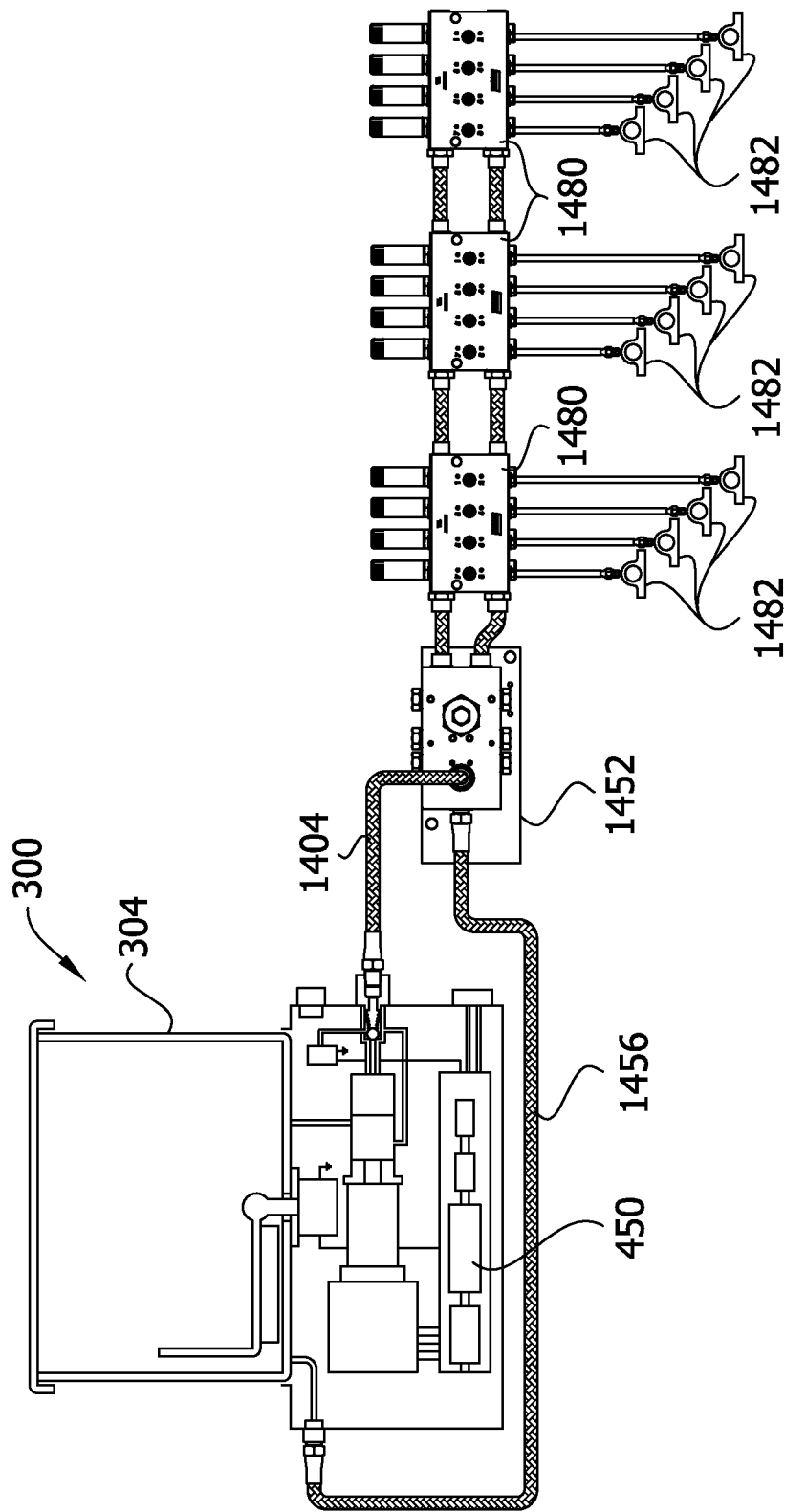
FIG. 19C is a diagrammatic view of a single zone lubrication system of the present invention, including a dual-line injector distribution system.

In the distribution system 1100 of FIG. 19, the controller 450 of the pump unit 300 is programmed to operate the unit to pump the desired amount of lubricant through a lube supply line 1104 to a manifold 1108 having passages in fluid communication with two outlets 1116. The flow of fluid through the passages to respective outlets 1116 is controlled by respective electronically-operated valves 1118 receiving control signals from the controller 450 via a power field bus 1120.

In one embodiment, the power field bus 1120 includes a dual cable. A first cable of the bus 1120 is a data cable transmitting between the controller and the CAN modules. It carries CAN messages to control each of the CAN modules 1121, 1123 and is connected to each of the modules, such as by a daisy-chain. The first cable also carries CAN messages from the CAN modules to the controller (such as sensor signals). A second cable of the bus 1120 carries power to each of the CAN modules for use in energizing the valves associated with each CAN module. The power cable is connected to relays of each CAN module which energize valves, such as by a daisy-chain. As illustrated in FIG. 19, CAN module 1121 has two separate sets of power lines. Each set selectively energizes each of the valves 1118 and is connected between the module and its respective valves 1118. CAN module 1123 has four separate sets of power lines. Each set selectively energizes each of its respective valves 1150A-1150D. As used herein, a relay includes any electrically or mechanically operated switch and/or any device to control a circuit by a low-power signal.

One of the two outlets 1116 is connected by a lube supply line 1124 to a series of injectors 1130 that deliver metered amounts of lubricant to points of lubrication 1134 (e.g., bearings) in a first zone Z1. The other outlet 1116 is connected by a lube supply line 1140 to a second manifold 1144 having passages in fluid communication with respective outlets 1146 connected to respective points of lubrication 1148A-1148D (e.g., bearings) in a second zone Z2. The flow of fluid through the passages in the second manifold 1144 is controlled by respective electronically-operated valves 1150A-1150D receiving control signals from the controller 450 via the first cable of the power field bus 1120. CAN module 1123 selectively sequentially connects the valves 1150A-1150D scheduled for lubrication to the second cable of the power field bus 1120 to energize the valves 1150A-1150D. (See FIG. 36A below for an example of the sequential actuation of the valves 1150A-1150D.) Flow of lubricant to the first and second zones Z1, Z2 is controlled by selective activation of the electronically-operated valves 1118, as described in the embodiment of FIGS. 12-15. CAN module 1121 selectively connects the valves 1118 to the second cable of the power field bus 1120 to energize the valves 1118. When used with this type of lubrication distribution system, the piston 384 of the pump unit 300 moves through venting return strokes when lubricant is directed to the injectors 1130 in the first zone Z1, and the piston moves through non-venting return strokes when lubricant is directed to the second manifold 1144 in the second zone Z2.

In the embodiment of FIG. 19, the manifold 1108 is constructed the same as described above regarding FIGS. 13-15, except that the check valve 742 in the outlet 1116 connected to the injectors 1130 is eliminated to allow the injectors 1130 to reset during the return venting strokes of the piston 384.

In the distribution system 1400 of FIG. 19A the controller 450 of the pump unit 300 is programmed to pump a desired amount of lubricant through a lube supply line 1404 to a manifold 1408 having passages in fluid communication with two outlets 1416. The flow of fluid through the passages to respective outlets 1416 is controlled by respective electronically-operated valves 1418 receiving control signals and power from the controller 450 via a power field bus 1420. One of the two outlets 1416 is connected by a lube supply line 1424 to a series of injectors 1430 that deliver metered amounts of lubricant to points of lubrication 1434 (e.g., bearings) in a first zone Z1. The other outlet 1416 is connected by a lubricant supply line 1440 to a pressure inlet 1450 of a reversing 4-way valve 1452. The reversing valve 1452 includes a relief port 1454 connected to a return line 1456 extending to a return port 1458 on the pump unit 300 in fluid communication with the reservoir 304. Two main lubrication lines, 1470A and 1470B, are connected to respective ports, 1472A and 1472B, of the reversing valve 1452. The main lubrication lines, 1470A and 1470B, deliver lubricant to dual-line metering valves 1480 that deliver metered amounts of lubricant to points of lubrication 1482 (e.g., bearings).

The reversing valve 1452 may be set in either of two positions. In the first position, lubricant entering the pressure inlet 1450 travels through the first port 1472A of the valve 1452 to the first main lubrication line 1470A. When the reversing valve 1452 is in this first position, lubricant entering the second port 1472B travels through the relief port 1454 to the return line 1456 and ultimately back to the reservoir 304. When the reversing valve 1452 is in the second position, lubricant entering the pressure inlet 1450 travels through the second port 1472B of the valve 1452 to the second main lubrication line 1470B. When the reversing valve 1452 is in the second position, lubricant entering the first port 1472A travels through the relief port 1454 to the return line 1456 and ultimately back to the reservoir 304. Thus, when the valve 1452 is in its first position, lubricant is dispensed under pressure to the first lubrication line 1470A and the second lubrication line 1470B is connected to the reservoir 304. When the valve 1452 is in its second position, lubricant is dispensed under pressure to the second lubrication line 1470B and the first lubrication line 1470A is connected to the reservoir 304. In operation, the reversing valve 1452 switches from the first position to the second position as will be described below.

When the reversing valve 1452 is in its first position, lubricant directed through the first lubrication line 1470A is dispensed under pressure from a first side of each metering valve 1480 to the respective points of lubrication 1482. When the lubricant is dispensed from the last metering valve 1480, the pump unit 300 continues to operate and the pressure in the first lubrication line 1470A increases until the lubricant in the line reaches a preselected pressure (e.g., 3000 psi). When lubricant in the line 1470A reaches the preselected pressure, the reversing 4-way valve 1452 moves to its second position so it directs lubricant through the second lubrication line 1470B and connects the first lubrication line 1470A to the reservoir 304 so pressure in the first line is relieved. Lubricant directed through the second lubrication line 1470B is dispensed under pressure from an opposite side of each metering valve 1480 to the respective points of lubrication 1482. When the lubricant is dispensed from the last metering valve 1480, the pressure in the second lubrication line 1470B builds until the lubricant in the line reaches a preselected pressure. When the lubricant reaches the preselected pressure, a signal from an end-of-line pressure switch (not shown) or a micro switch (not shown) on the reversing valve 1452 stops the pump unit 300.

In the embodiment of FIG. 19A, the manifold 1408 is constructed the same as described above regarding FIGS. 13-15, except that the check valve 742 in the outlet 1416 connected to the injectors 1430 is eliminated to allow the injectors 1430 to reset during the return venting strokes of the piston 384.

Dual-Line zones, such as zone Z2 of FIG. 19A, can be combined with other dual-line zones (not shown), combined with divider valve zones (such as zone Z1 shown in FIG. 19B), or used alone (as shown in FIG. 19C) without departing from the scope of the present invention. As will be appreciated by those skilled in the art, dual-line zones can be used effectively with long lines, at high pressures, and/or for hundreds of lubrication points. In addition to the dead-end system illustrated in FIGS. 19A-19C, the dual-line zone can be configured to have other dual-line system layouts, such as an end-of-the-line system or a loop system, depending on its particular application.

Desirably, each of the lube supply lines (e.g., 510, 610, 702, 804, 824, 840, 904, 924, 940, 1004, 1024, 1040, 1104, 1124, 1140) delivering lubricant from the pump unit 300 in the above systems comprises a hose which is substantially non-expansible when the pressure is below a predetermined limit (e.g., 1500 psi). To ensure that the proper amount of fluid is delivered by the pump unit to the points of lubrication, it is desirable that the lubricant in the supply lines remain below this limit. The pressure sensor 372 at the outlet end of the cylinder bore 338 is provided for this purpose. The controller 450 is responsive to signals from this sensor. If the pressure sensed by the sensor 372 remains below the stated limit, the controller operates the stepper motor 394 at a predetermined normal speed to pump lubricant at a predetermined rate. If the pressure sensed by the sensor 372 increases above the limit, the controller operates the stepper motor 394 at a slower speed to deliver the desired quantity of lubricant at a slower rate to avoid undesirable expansion of the hose and to avoid undesirable back pressure in the system including the lube supply lines. In one embodiment, the hose used for the lubricant supply lines has an inside diameter of about 0.250 inch and a length from the pump unit 300 to a point of lubrication of up to about eighty (80) ft. Desirably, the length of the lube supply line from the pump unit to the first manifold of the lubrication distribution unit is no more than about fifty (50) feet.

Desirably, a pump unit 300 of the distribution system 1100 is equipped with a self-diagnostic system for identifying the reason for a pump failure. In this regard, lubrication systems fail for several reasons. First, the pump components wear to a point where they are not capable of building adequate pressure to operate the lube system. This may be due to seal wear, piston wear, and/or cylinder wear. Second, the outlet check valve is unable to hold pressure by preventing back flow in the system. This may be due to the valve seat becoming pitted and corroded, or the ball becoming pitted and corroded, or because a contaminant lodges in the valve seat to prevent proper sealing. Third, as the ambient temperature decreases, greases may become stiff and difficult to pump. At some point, the pressure necessary to move the grease becomes prohibitive. A pump unit equipped with the self-diagnostic system described below can perform diagnostic tests to determine whether a system failure is due to any of the above reasons.

In the event the system 1100 fails to pump lubricant properly, the self-diagnostic system runs three diagnostic tests.

To test whether the pump is capable of producing adequate pressure, the controller 450 signals the electronically-operated valves 1118 of the manifold 1108 to close their respective bores. The stepper motor 394 is then operated by the controller 450 to advance the piston 384 a small distance in the cylinder bore 338. The pressure at the outlet of the pump cylinder is sensed by the pressure sensor 372. The processor of the controller 450 samples pressure readings from the sensor and compares these readings to a reference pressure or pressures to determine whether the pressure build-up is adequate.

To test whether the check valve 344 is capable of holding adequate pressure, the controller 450 operates the stepper motor 394 to reverse the pump piston 384 a small distance in the cylinder bore 338. The pressure at the outlet of the pump cylinder is sensed by the pressure sensor 372. The processor of the controller samples pressure readings from the sensor and compares these readings. If the pressure drops, the dropped pressure is indicative of a failure of the check valve 344. If the pressure holds, the check valve is working.

To test whether the grease is too stiff for proper operation, a user of the system would conduct what may be referred to as a ventmeter test, as described in U.S. Pat. No. 7,980,118, incorporated by reference herein. To perform this test, the controller 450 operates the stepper motor 394 to advance the piston 384 until the pressure as sensed by the pressure sensor 372 at the outlet of the cylinder bore 338 reaches a predetermined pressure (e.g., 1800 psi). The stepper motor is then operated to reverse the piston through a venting return stroke to its vent position, at which point grease in the lube supply line is vented back to the reservoir. After a delay of predetermined duration (e.g., 30 seconds), the pressure at the outlet of the cylinder bore 388 is recorded. The controller then uses the following equation to determine the yield stress (Y) of the grease:

$$Y=[p\pi r^2/2\pi rl]=pr/2l$$

where "p" is the recorded pressure at the cylinder bore outlet after 30 seconds; "r" is the radius of the lube supply line 1104; and "l" is the length of the lube supply line 1104 from the pump unit 300 to the first manifold 1108. The values of "r" and "l" are provided to the controller by user inputting this information via the operator input and/or USB port.

If the calculated yield stress (Y) of the grease is such that it exceeds a known value at which the grease is too stiff for the pump to operate properly (e.g., a value of 0.125), then the controller 450 will signal a warning to the user. The warning will signal the user to switch over to a grease of a lighter grade.

A pump unit 300 having the self-diagnostic feature described above can be used with any type of lubrication distribution system in which flow through the lube supply line from the pump unit to the points of lubrication can be blocked.

The self-diagnostic system described above can also include a test for determining the proper operation of the motor. To perform this test, the controller 450 opens an electronically-operated valve 1118 to allow at least limited flow through the lubrication distribution system. The controller then operates the stepper motor 394 to move the piston 384 through successive pumping and return strokes. Movement of the piston is sensed by magnetic field sensors 440, 442 mounted on the follower housing 404. Based on feedback from the sensors, the controller is able to determine whether the motor 394 is moving the piston back and forth through its complete range of travel. The test can also be used to determine the existence of any unwanted binding in the drive mechanism, e.g., due to misalignment of the drive components. This is accomplished by measuring the amount of electrical current drawn by the motor 394 as it works to move the piston 384. Excessive current draw (e.g., 1.0 amp or more) may indicate unwanted binding of the motor and/or lead screw mechanism. The controller advances the motor slowly, (e.g., 0.75 inches in 10 seconds) during this test to prevent excessive back pressure in the system.

The self-diagnostic tests described above can be run automatically in response to an error signal indicating a problem with the pump unit or the lubrication distribution system. In addition, the self-diagnostic grease stiffness test can be conducted if the temperature of the lubricant in the reservoir, as determined by the temperature sensor 332 (FIG. 4), drops below a predetermined temperature.

Additional features of a self-diagnostic system of this invention are described later in this specification.

It will be observed from the foregoing that a pump unit 300 of this invention has many advantages. For example, the controller 450 is programmed to operate the pump in the following modes:
  (i) in a divider valve mode in which lubricant from the pump is fed to one more divider valves for delivery to multiple lubrication points;
  (ii) an injector mode in which lubricant from the pump is fed to a plurality of lubricant injectors for delivery to multiple lubrication points;
  (iii) in a dual line system mode in which lubricant from the pump is fed to a plurality of lubricant injectors for delivery to multiple lubrication points and having reversing valves for venting lubricant to the reservoir; and
  (iv) a CAN-bus mode
    (a) in which lubricant from the pump is fed to a plurality of solenoid-operated valves for delivery to multiple lubrication points,
    (b) CAN messages which control the solenoids are provided via the field bus, and
    (c) power to energize the solenoids is provided via the field bus.

The fact that the stirrer 320 and pump piston 384 are driven by two separate drive mechanisms also allows the stirrer and piston to be driven independently of one another so that lubricant in the reservoir can be fluidized before the stepper motor is operated to reciprocate the piston to pump the lubricant. The movement of the stirrer also functions to prime the pump by forcing lubricant through the reservoir outlet directly (i.e., along a defined flow path) into the inlet of the pump cylinder.

The pump unit 300 is capable of pumping viscous lubricants at relatively low temperatures. This is due, at least in part, to the strong push/pull forces exerted on the lubricant to force lubricant from the reservoir 304 directly into the cylinder bore 338. As explained above, rotation of stirrer 320 causes the force-feed mechanism 330 to exert a strong downward force on lubricant in the interior of the reservoir 304 tending to push it along a defined flow path (e.g., as shown in FIG. 6) into the cylinder bore 338. Further, a return stroke of the piston 384 generates a force tending to pull this same lubricant along the same defined flow path. The combination of these pushing and pulling forces is effective for moving viscous lubricant into the cylinder bore 338 at lower temperatures.

Other advantages of this invention are apparent. The use of two separate drive mechanisms (one to drive the stirrer and one to drive the piston), and particularly the use of a linear position motor (e.g., a stepper motor), eliminates much of the complexity of conventional pumping units. The pump unit operates efficiently to pump lubricant over a wide range of temperatures. And the multiple feed lines of the pumping unit provide greater flexibility when installing the system in the field.

Further, the pump unit may include diagnostic software for performing diagnostic tests to determine one or more of the following:
  (i) an ability of the pump to generate a minimum pressure at the cylinder outlet;
  (ii) an ability of the check valve to block reverse flow through the outlet;
  (iii) whether the grease in the reservoir is too stiff to be pumped by the pump; and
  (iv) an amount of electrical current drawn by a motor of the drive mechanism as the piston moves in the cylinder bore.

Figure 20:
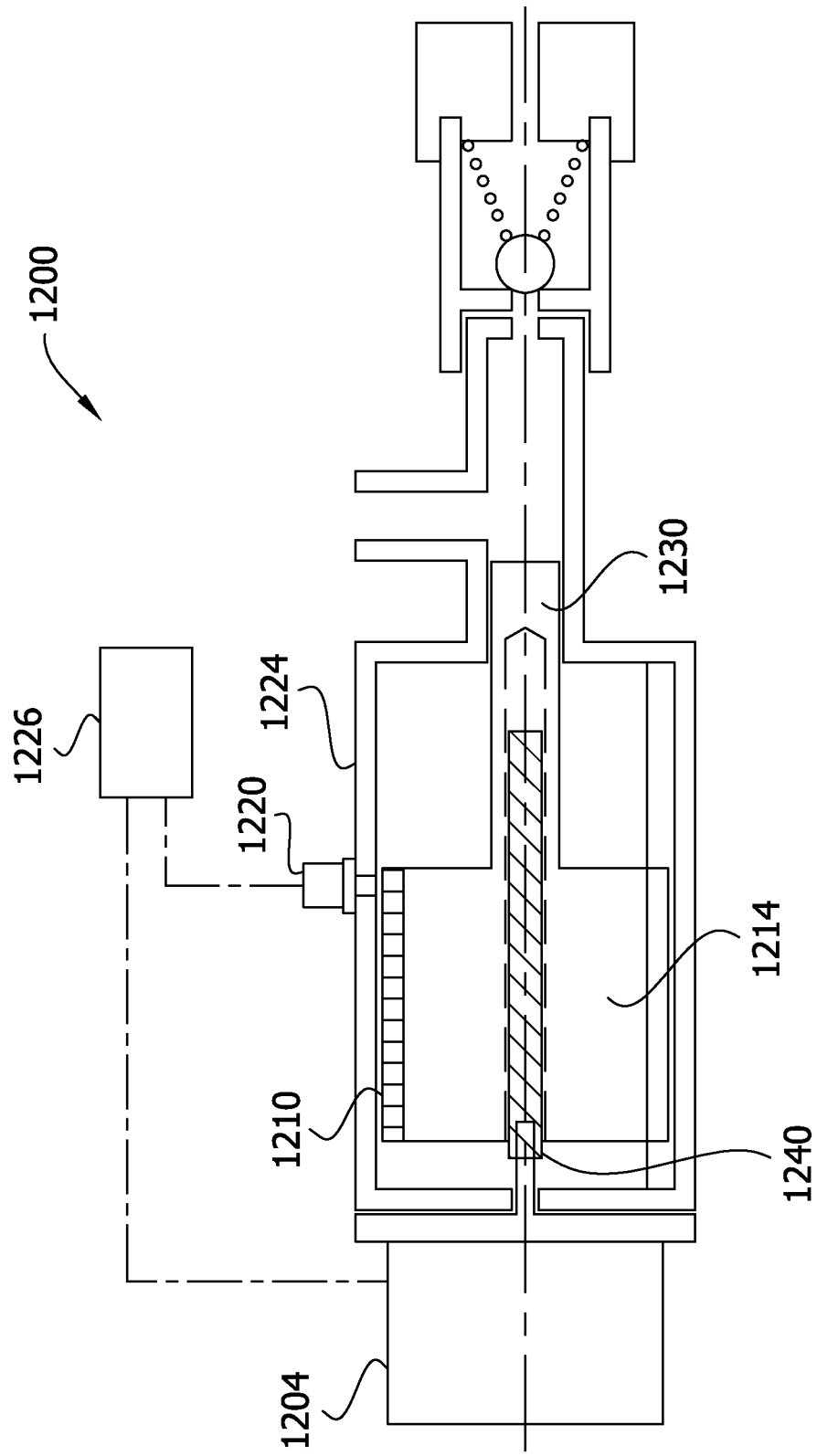
FIG. 20 is a schematic view of a first alternative drive mechanism for a pumping unit.

FIG. 20 illustrates an alternative linear position drive mechanism, generally designated 1200, for reciprocating the piston 384 of the pump unit 300. The drive mechanism of this embodiment is similar to the stepper motor drive mechanism of the previous embodiment. However, the drive mechanism comprises a reversible motor 1204 that is not a stepper motor. Position designators 1210 on the follower 1214 are readable by a position sensor 1220 on the follow housing 1224. The position sensor 1220 is connected to the controller 1226 of the pump unit for signaling the longitudinal position of the follower 1214 and the piston 1230 attached to the follower. The controller 1226 operates the reversible motor 1204 to rotate the lead screw 1240 in one direction to move the follower and piston a suitable distance (as determined by the position sensor) through a pumping stroke and in the opposite direction to move the follower and piston a suitable distance (as determined by the position sensor) through a return stroke.

By way of example, the position designators 1210 on the follower 1214 may be raised metal segments spaced along the follower at predetermined intervals, and the position sensor 1220 may be an inductive sensor which detects and counts the segments and signals the controller. The controller 1226 monitors the linear position of the follower and, based on this information, is able to move the piston a distance to necessary to dispense a desired amount of grease to the point of lubrication. Alternatively, the position designators 1210 on the follower may be segments of magnets spaced along the follower at predetermined intervals, and the position sensor 1220 may be a magnetic field sensor which detects and counts the segments and signals the controller. The controller monitors the linear position of the follower and, based on this information, is able to move the piston a distance to necessary to dispense a desired amount of grease to the point of lubrication.

The linear position designators 1210 and sensor 1220 can also be used to determine when the piston 1230 is at the extreme limits of its travel. This information can be used for calibration of the system. When the system is activated the first time, the system is calibrated so the controller knows the position of the piston at the limits of its movement.

Other linear position drive mechanisms may be used.

Figure 21:
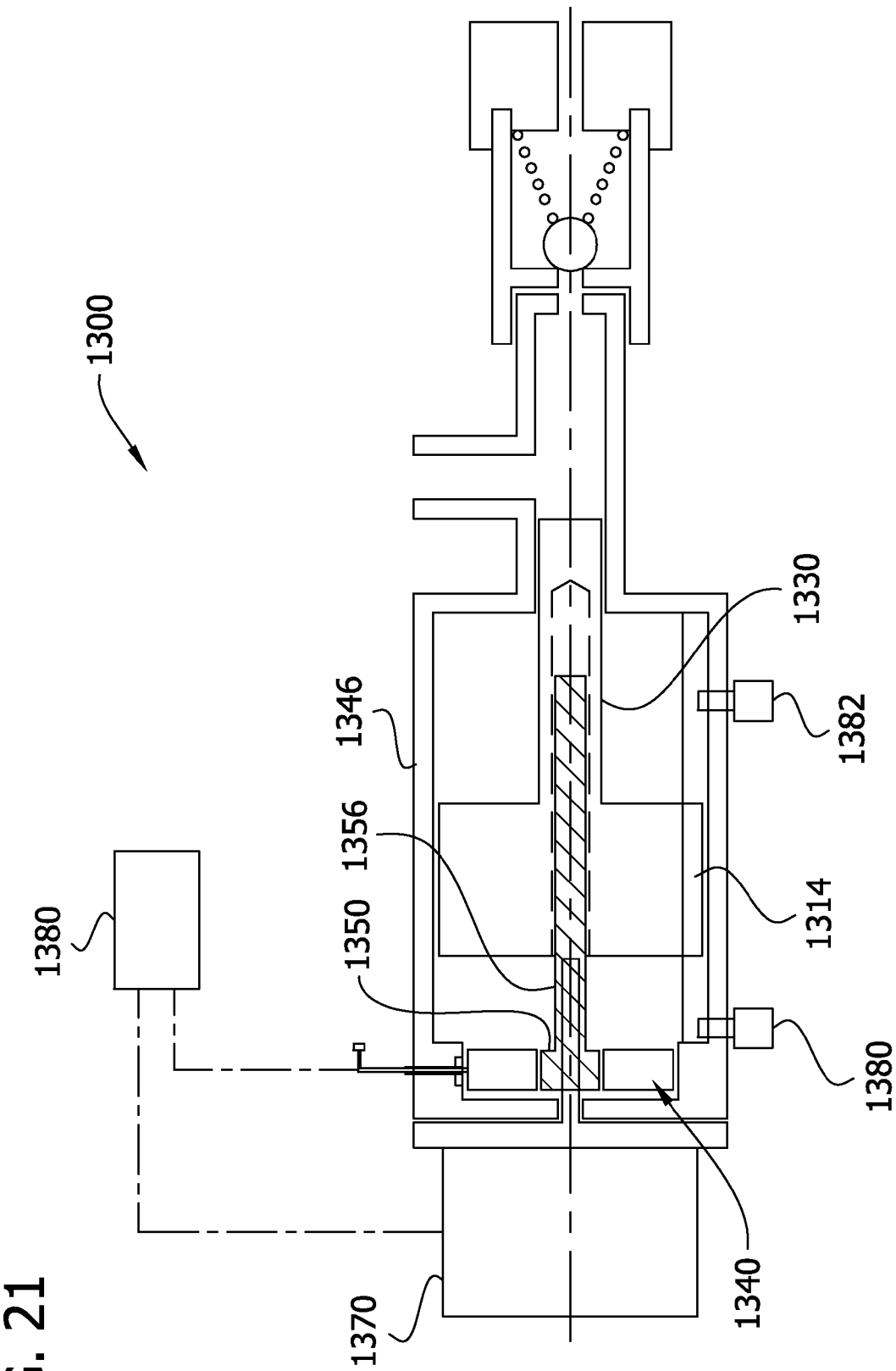
FIG. 21 is a schematic view of a second alternative drive mechanism for a pumping unit.

FIG. 21 illustrates another embodiment of a linear position drive mechanism, generally designated 1300, for reciprocating the piston of the pump unit 300. The drive mechanism of this embodiment is similar to the drive mechanism of the previous embodiment (FIG. 20) except that the position of the follower 1314 and piston 1330 is determined by an encoder device, generally designated 1340. The encoder device 1340 is mounted in the follower housing 1346 and comprises a rotatable cylinder 1350 affixed to (e.g., pressed on) a surface of the lead screw 1356 rotated by the motor 1370, which is a reversible motor but not a stepper motor. As the cylinder 1350 rotates, the encoder 1340 monitors the angular rotational movement of the cylinder and signals the extent of such movement to the controller 1380 of the pump unit. Based on this information, the controller can determine the linear position of the piston 1330, as will be understood by those skilled in the art. The controller 1380 also controls the operation of the motor 1370 to move the piston the appropriate distances during its pumping and return strokes. Position sensors 1380, 1382 are provided on the follower housing 1346 for calibrating the encoder 1340 with respect to the position of the follower 1314 (and thus the piston 1330). By way of example, these position sensors 1380, 1382 may be magnetic field sensors mounted on the follower housing 1346 for sensing a magnet (not shown) on the follower, as in the stepper motor embodiment described above.

Figure 36A:
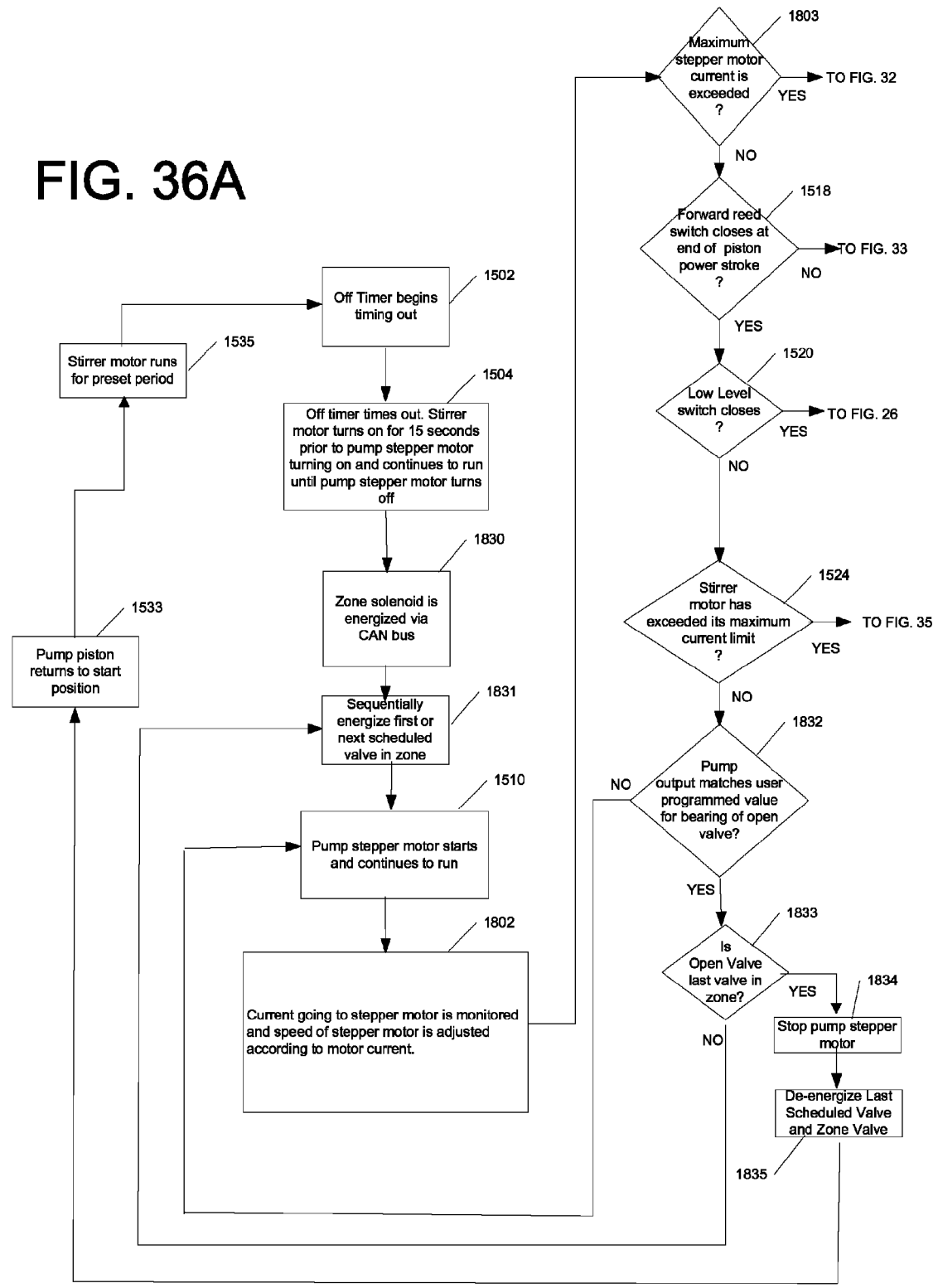
FIG. 36A is a flow diagram of one embodiment of the invention of instructions for execution by a processor to provide self-diagnostics for a CAN bus lubrication system having actuator valves without an internal pressure transducer such as illustrated in FIG. 19.
Figure 37:
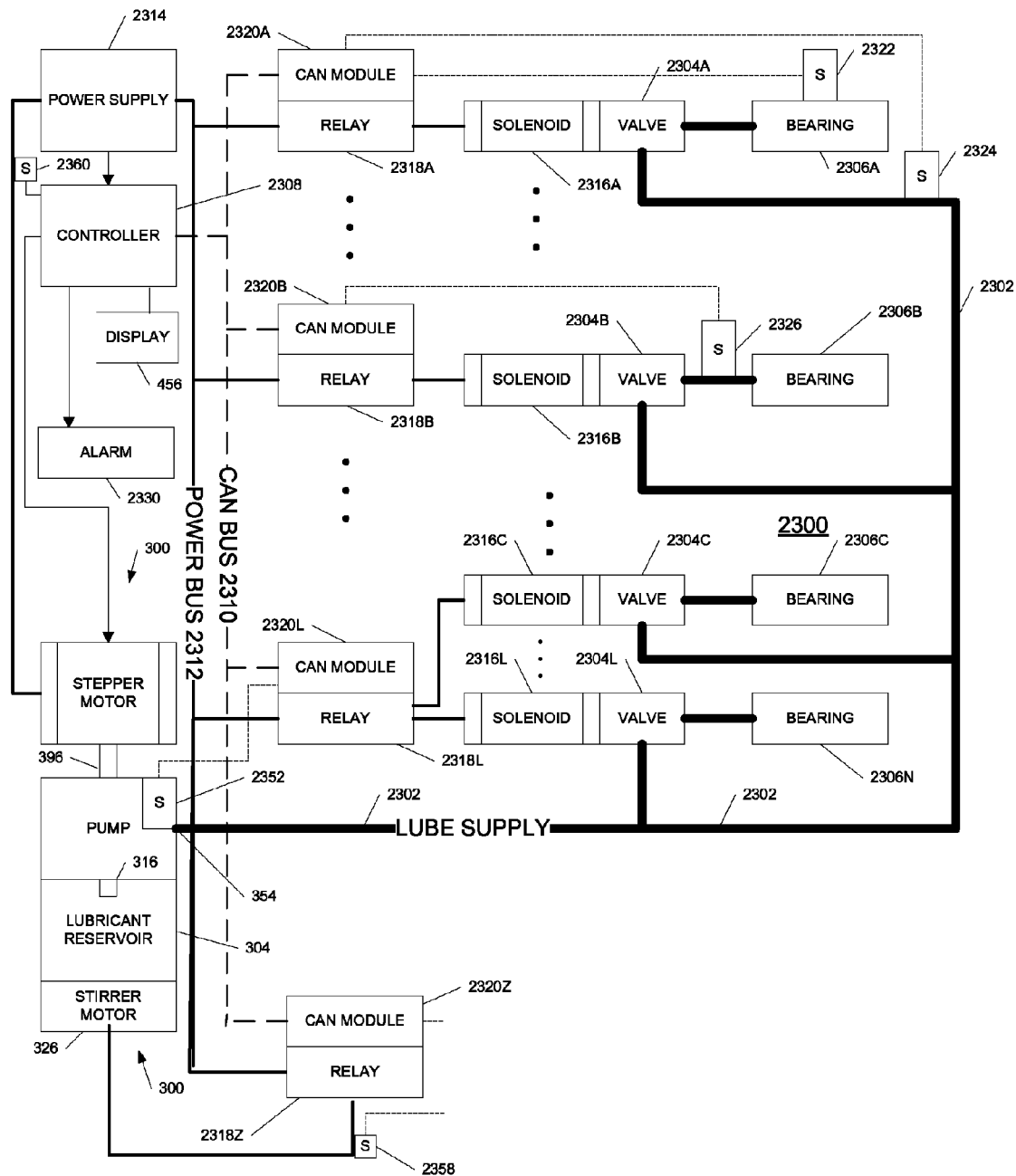
FIG. 37 is a block diagram of one embodiment of a CAN bus lubrication system 2300 of the invention for supplying lubricant including multiple zones of actuator valves.

Referring briefly to FIG. 37 (which is described in detail below), a system 2300 of the invention includes the pump unit 300 described above, an alarm 2330, and sensors 2322, 2324, 2326, 2358 for sensing conditions of the system and providing condition signals. A controller 2308 controls the operation of the pump motor 394 by selectively energizing the motor to reciprocate the piston 384. The controller is responsive to condition signals from the sensors 2322, 2324, 2326, 2358 to selectively energize the alarm when a condition signal is outside a preset range. In one embodiment, the controller is a processor including a tangible, computer readable non-transitory storage medium. The storage medium stores processor executable instructions for controlling the operation of the processor. In this embodiment, the processor is programmed by an operator to execute one or more self-diagnostic sets of instructions as illustrated in FIGS. 22-36.

As used herein, a line pressure transducer ("line PT" hereinafter) is any pressure sensor sensing pressure in a lube supply line 2302, e.g., sensors 2324, 2326, 2346, 2347, and 2348 in FIGS. 37 and 37A. An end-of-line pressure transducer is a lube supply line pressure transducer at a location immediately upstream from the last injector of a series of one or more injectors of an injector distribution system, e.g., sensor 2347 in FIG. 37A. An internal or pump pressure transducer ("internal PT" or "pump PT" hereinafter") is any pressure sensor sensing pressure at the cylinder outlet of the pump unit, e.g., sensor 372 in FIG. 4, sensor 2726 in FIG. 49, and sensor 2352 in FIGS. 37 and 37A.

FIGS. 22-28 illustrate flow diagrams of one embodiment of the invention of instructions for execution by a processor to provide self-diagnostics for a lubrication system having a closed loop, injector system with an internal (pump) PT.

FIGS. 24-29 illustrate flow diagrams of one embodiment of the invention of instructions for execution by a processor to provide self-diagnostics for a lubrication system having an open loop, non-injector system with an internal (pump) PT.

FIGS. 26, 30-35 illustrate flow diagrams of one embodiment of the invention of instructions for execution by a processor to provide self-diagnostics for a lubrication system having a closed loop, injector system without an internal (pump) PT. In this embodiment, stepper motor current is monitored as indicative of pressure.

FIGS. 26, 32-36 illustrate flow diagrams of one embodiment of the invention of instructions for execution by a processor to provide self-diagnostics for a lubrication system having an open loop, non-injector system without an internal (pump) PT. In this embodiment, stepper motor current is monitored as indicative of pressure.

FIGS. 22-28 illustrate an injector system with an internal (pump) PT. The user defined settings input by the user for this system include:

(1) an off-timer setting corresponding to the maximum time between the end of one lube event and the start of the next lube event (as used herein, "lube event" means a lubrication cycle for the injector(s) of an injector distribution system, or a lubrication cycle for the divider valve(s) of a divider valve distribution system, or a lubrication cycle for the valve(s) of a CAN bus distribution system);

(2) an alarm time setting corresponding to a maximum time from the start to the completion of a lube event, failing which an alarm is activated;

(3) a maximum pressure setting corresponding to a maximum pressure (e.g., 3000 psi) allowed at the cylinder outlet of the pump unit as sensed by the internal (pump) PT;

(4) an injector-activation pressure setting corresponding to a pressure (e.g., 2500 psi) sensed by an end-of-line PT needed to activate the injectors;

(5) a vent pressure setting (also referred to hereinafter as an injector-reset pressure setting) corresponding to a minimum pressure (e.g., 900 psi) needed to reset the injectors of the system;

(6) a length of the lube supply line; and (7) a diameter of the lube supply line.

Figure 29:
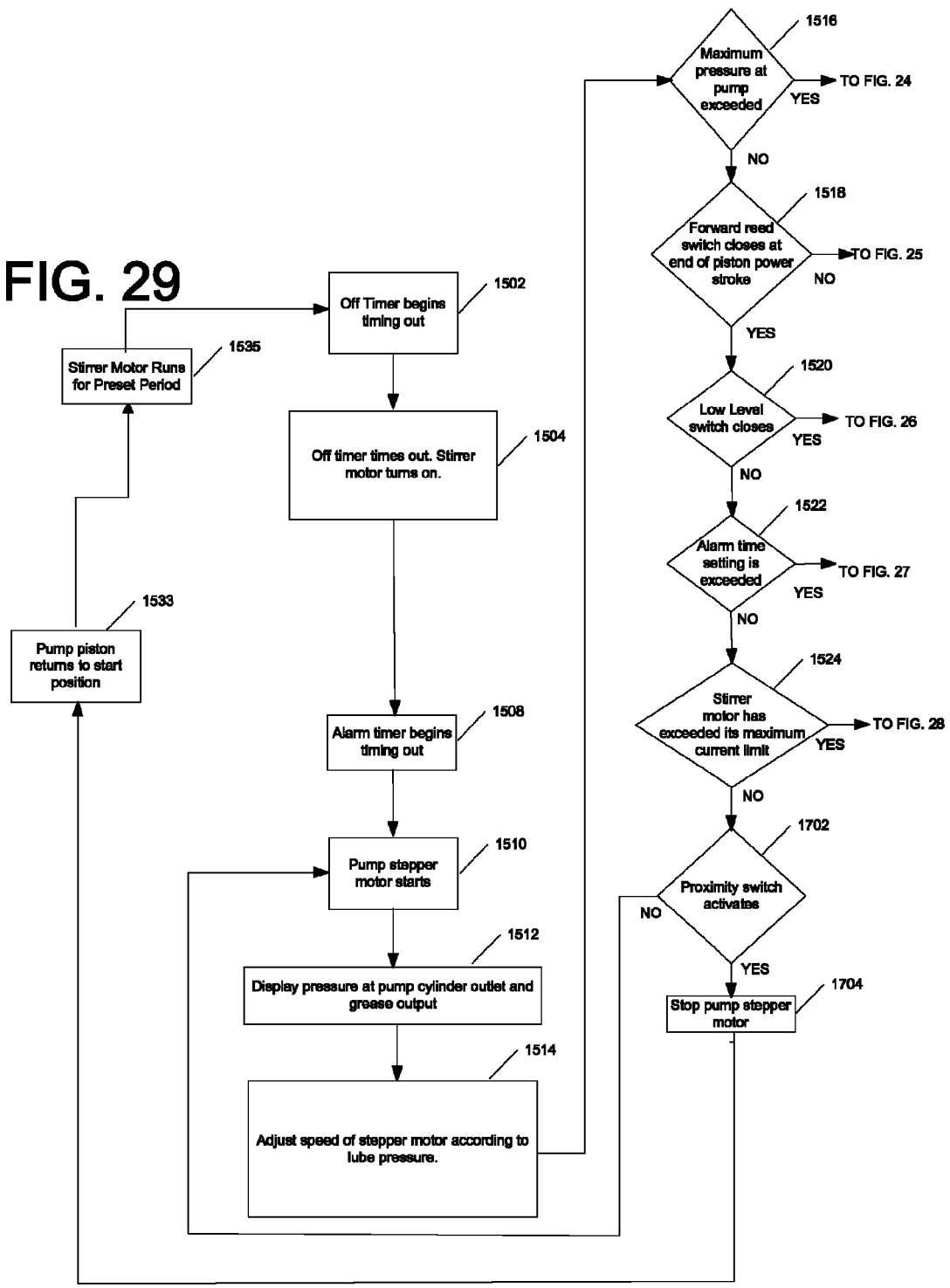
FIG. 29 is a flow diagram of one embodiment of the invention of instructions for execution by a processor to provide self-diagnostics for a lubrication system having an open loop, non-injector system with an internal pressure transducer.

FIG. 29 illustrates a divider valve system with an internal (pump) PT. The user defined settings for the system include an off-timer setting corresponding to the time between lube events (defined in the preceding paragraph); an alarm time setting (defined in the preceding paragraph); a maximum pressure setting (defined in the preceding paragraph); the length of the lube supply line; and the diameter of the lube supply line.

FIGS. 30-35 illustrate an injector system without an internal PT. The user defined settings include an off-timer setting (defined above); an alarm time setting (defined above); a maximum pressure setting corresponding to a maximum pressure (e.g., 3000 psi) allowed at the cylinder outlet of the pump unit as sensed by a stepper motor current sensor; an injector-activation pressure setting (defined above); and a vent pressure setting (defined above).

FIG. 36 illustrates a divider valve system without an internal PT. The user defined settings for the system include an off-timer setting (defined above); an alarm time setting (defined above); and a maximum pressure setting corresponding to a maximum pressure (e.g., 3000 psi) allowed at the cylinder outlet of the pump unit as sensed by a stepper motor current sensor.

Figure 22:
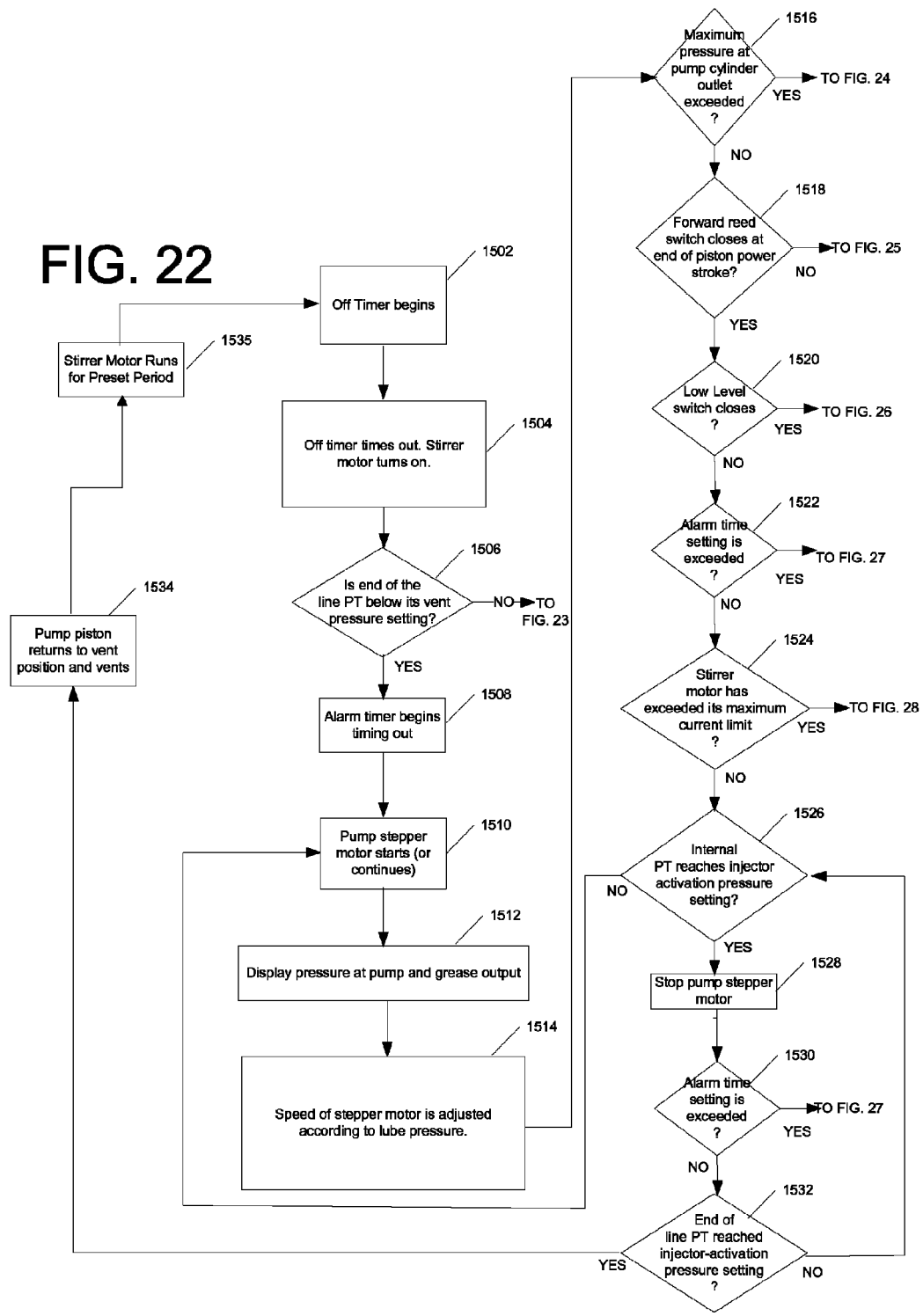
FIG. 22 is a flow diagram of one embodiment of the invention of instructions for execution by a processor to provide self-diagnostics for a lubrication system having a closed loop, injector system with an internal pressure transducer.

FIG. 22 is a flow diagram of one embodiment of the invention of instructions for execution by a processor to provide self-diagnostics for a lubrication system having a closed loop, injector system with an internal PT. At 1502, an off timer in the processor begins a time down to the next lube event. At 1504, the off timer times out and the processor energizes the stirrer motor 326 to drive the stirrer 320 of the pump unit 300 to stir lubricant in the reservoir 304. The stirrer motor 326 turns on for a preset time (e.g., 15 seconds) prior to the pump stepper motor 394 turning on to begin stirring the lubricant. The stirrer motor continues to run until the pump stepper motor 394 turns off. At 1506, the processor reads the end-of-line PT(s) to confirm that the line pressure is below the vent pressure setting to reset the injectors. If the pressure is at or above the vent pressure setting, the processor executes the instructions in FIG. 23. If the pressure is below the vent pressure setting, the processor begins timing an alarm at 1508 and the pump stepper motor 394 starts or continues to build pressure at 1510. At 1512, the processor indicates on display

456 the pressure at the cylinder outlet of the pump unit, as sensed by the internal (pump) PT.

At 1514 in FIG. 22 (a closed loop system), the internal (pump) PT is monitored by the processor and the speed of the stepper motor 394 is adjusted by the processor according to the lube pressure at the cylinder outlet of the pump unit. For example, a lookup table based on predetermined values adjusts the software commands to control speed and/or torque of the stepper motor (e.g., motor voltage, motor current, pulse duty cycle (pulse frequency), and/or pulse power). At higher pressure, the stepper motor rotates at slower speeds.

Figure 24:
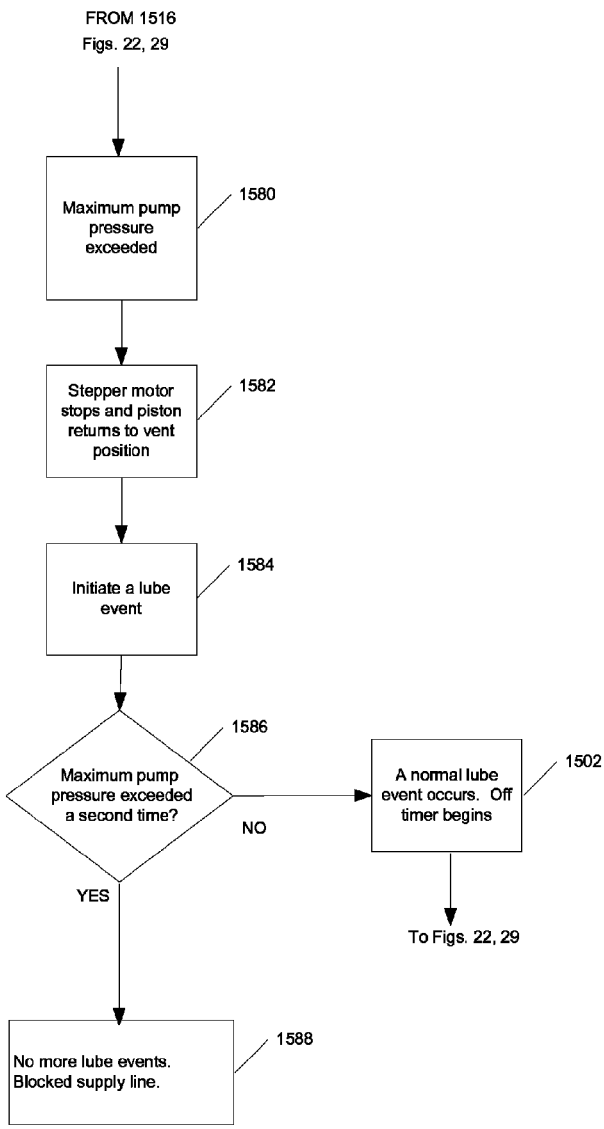
FIG. 24 is a flow diagram of one embodiment of the invention of instructions for execution by a processor to provide a maximum pressure test for a lubrication system having a closed loop, injector system with an internal pressure transducer or an open loop, non-injector system (e.g., a divider valve distribution system) with an internal pressure transducer.

At 1516, the processor proceeds to implement the steps in FIG. 24 if the cylinder outlet pressure has exceeded a maximum. At 1518, the processor proceeds to implement the steps in FIG. 25 if the magnetic field sensor 442 of the pump unit 300 has not indicated that the piston is at the end of its power stroke (indicating an incomplete stroke). At 1520, the processor proceeds to implement the steps in FIG. 26 if a low level switch of the reservoir 304 has closed (indicating that the level of lubricant in the reservoir is low). At 1522, the processor proceeds to implement the steps in FIG. 27 if the alarm time setting is exceeded (indicating that a lube event is taking longer to complete than a preset time period such as 15 minutes). At 1524, the processor proceeds to implement the steps in FIG. 28 if the stirrer motor current has exceeded a maximum current limit (indicating for example, that the lubricant in the reservoir 304 is excessively stiff).

At 1526 in FIG. 22, the processor checks the internal (pump) PT and returns to 1510 if the internal (pump) pressure has not reached the injector-activation pressure setting previously input by the user. If the internal pressure has reached or exceeded the injector-activation pressure setting, the pump stepper motor 394 is stopped by the processor at 1528. The processor determines at 1530 whether the alarm time setting has been exceeded. If it has been exceeded, the processor implements the steps in FIG. 27. If it has not been exceeded, the processor determines at 1532 whether the end-of-line pressure sensed by the end-of-line PT(s) has reached the injector-activation pressure setting, e.g., 2500 psi. If the end-of-line pressure has reached the injector-activation pressure setting, the processor controls the stepper motor to return the pump piston to its vent position at 1534 (see FIG. 9). The stirrer motor 326 runs for a preset period (e.g., 15 seconds) at 1535 and then the off timer begins again at 1502. If the end-of-line pressure has not reached the injector-activation pressure setting, the processor returns to 1526 to check the internal (pump) PT. If the pressure sensed by the internal PT is below the injector-activation pressure setting, pumping (i.e., operation of the stepper motor) continues at 1510. If the pressure sensed by the internal PT has reached the injector-activation pressure setting at 1526, pumping (i.e., operation of the stepper motor) stops at 1528 and the processor proceeds as noted above. The stirrer motor 326 runs at 1535 to operate after a lube event is over to fluidize the lubricant and prepare the lubricant in the reservoir for the next lube event by priming the pump cylinder (if needed) with lubricant for the next lube event.

In FIG. 22, for a system with a stirrer, a lube event is the time between the end of one lube event at 1535 with the end of the preset period of the operation of the stirrer motor and the start of the next lube event at 1504 with the start of the stirrer motor. It is also contemplated that a system may not have a stirrer and operate in a manner similar to FIG. 22. In FIG. 22, for a system without a stirrer, a lube event is the time between the end of one lube event at 1534 with the pump piston returning to its vent position and the start of the next lube event at 1510 with the start of the stepper motor.

Figure 23:
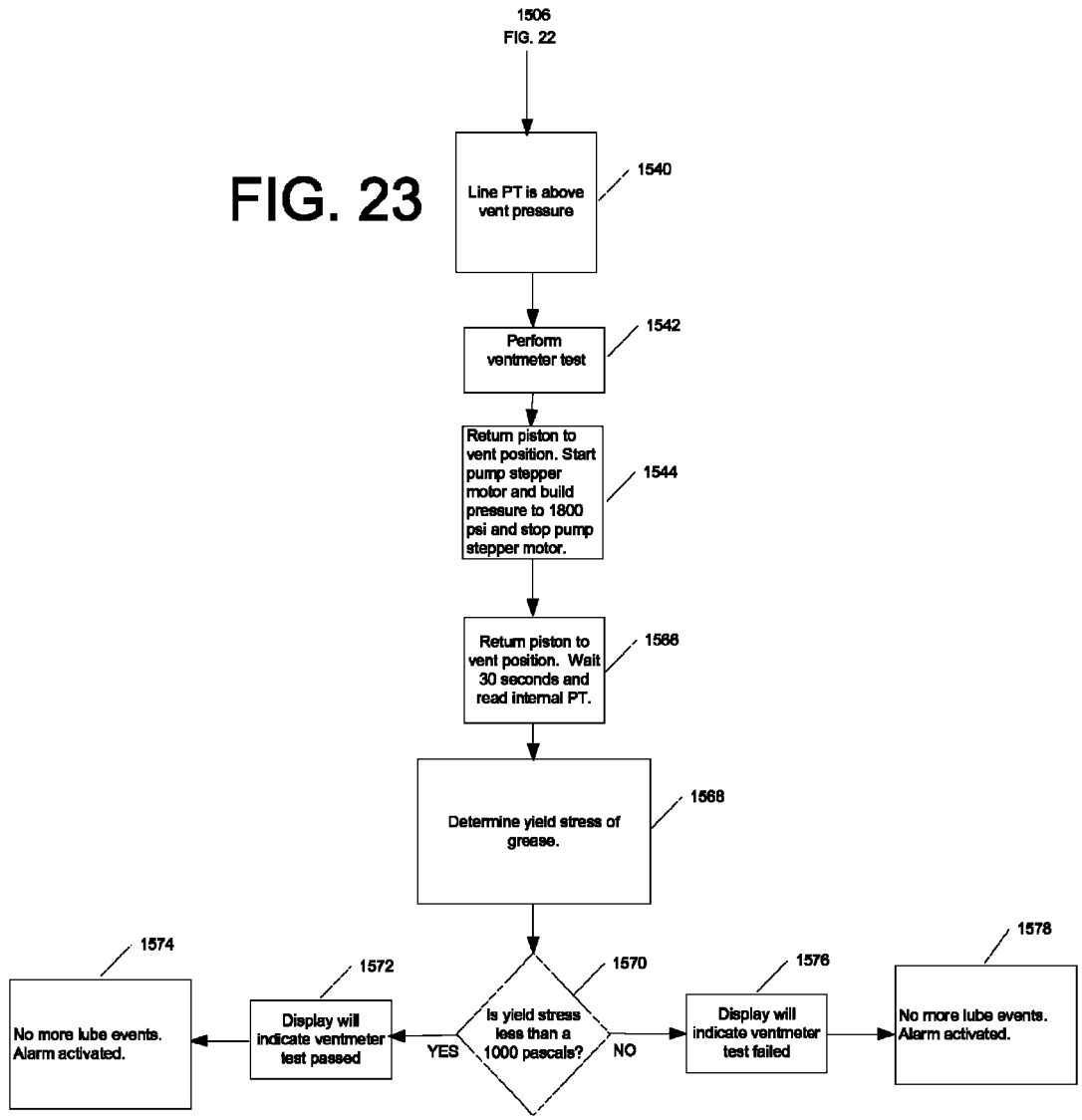
FIG. 23 is a flow diagram of one embodiment of the invention of instructions for execution by a processor to provide a ventmeter test for a lubrication system having a closed loop, injector system with an internal pressure transducer.

FIG. 23 is a flow diagram of one embodiment of the invention of instructions for execution by a processor to provide a vent (ventmeter) test for a lubrication system having a closed loop, injector system with an internal PT. From 1506 of FIG. 22, as 1540 indicates, at the start of a lube event the pressure sensed by the end-of-line PT(s) is above the vent pressure setting input by the user. At 1542, the processor starts the ventmeter test (described earlier in this specification) by reversing the pump stepper motor 394 and returning the pump piston 384 to its vent position at 1544. Then, the lube event restarts and the pump stepper motor 394 is operated to build the internal pressure to a preset level (e.g., 1800 psi). The processor reverses the motor to return the piston to the vent position, waits a preset time (e.g., 30 seconds), and then reads the internal (pump) PT at 1566. Using the internal (pump) PT pressure reading, supply line length, and supply line diameter, the yield stress of the lubricant (e.g., grease) is determined at 1568 using the ventmeter test described above. The results of the test are then compared to a preset level of yield stress (e.g., 1000 pascals) at 1570.

If the yield stress determined at 1570 is less than the preset level (e.g., 1000 pascals), the processor indicates the positive (passing) ventmeter test results on the display 456 at 1572. At 1574 the processor discontinues any more timed lube events and activates an alarm. The display 456 shows both a failure to vent at the end of the lube supply line and the positive results of the ventmeter test. From this it can be assumed that the end-of-line PT pressure reading is above the vent pressure setting due to some problem other than excessive lubricant stiffness.

On the other hand, if the yield stress determined at 1570 by the ventmeter test is greater than the preset level (e.g., 1000 pascals), the processor indicates the negative (failing) ventmeter test results on the display 456 at 1576. At 1578 the processor discontinues any more timed lube events and activates the alarm. The display 456 shows both a failure to vent at the end of the lube supply line and that the lubricant (e.g., grease) failed the ventmeter test. This result indicates that the end-of-line PT pressure reading is above the vent pressure setting at 1506 because of excessive lubricant stiffness.

FIG. 24 is a flow diagram of one embodiment of the invention of instructions for execution by a processor to provide a maximum pressure test for a lubrication system having either a closed loop, injector system with an internal (pump) PT or an open loop, non-injector system with an internal (pump) PT. From 1516 of FIGS. 22 and 29, as 1580 indicates, the maximum pressure setting at the pump cylinder outlet has been exceeded. At 1582, the stepper motor is immediately stopped by the processor and reversed to return the pump piston to the vent position. At 1584, a lube event is initiated once the pressure has vented. At 1586, if the maximum pressure setting at the pump cylinder outlet is exceeded a second time, the processor shuts off the stepper motor at 1588 and no more lube events will occur. The pressure alarm is activated and the display 456 will indicate a blocked supply line. If the maximum pressure setting is not exceeded, the processor at 1586 returns to 1502 to start a normal lube event and the off timer begins to time out.

Figure 25:
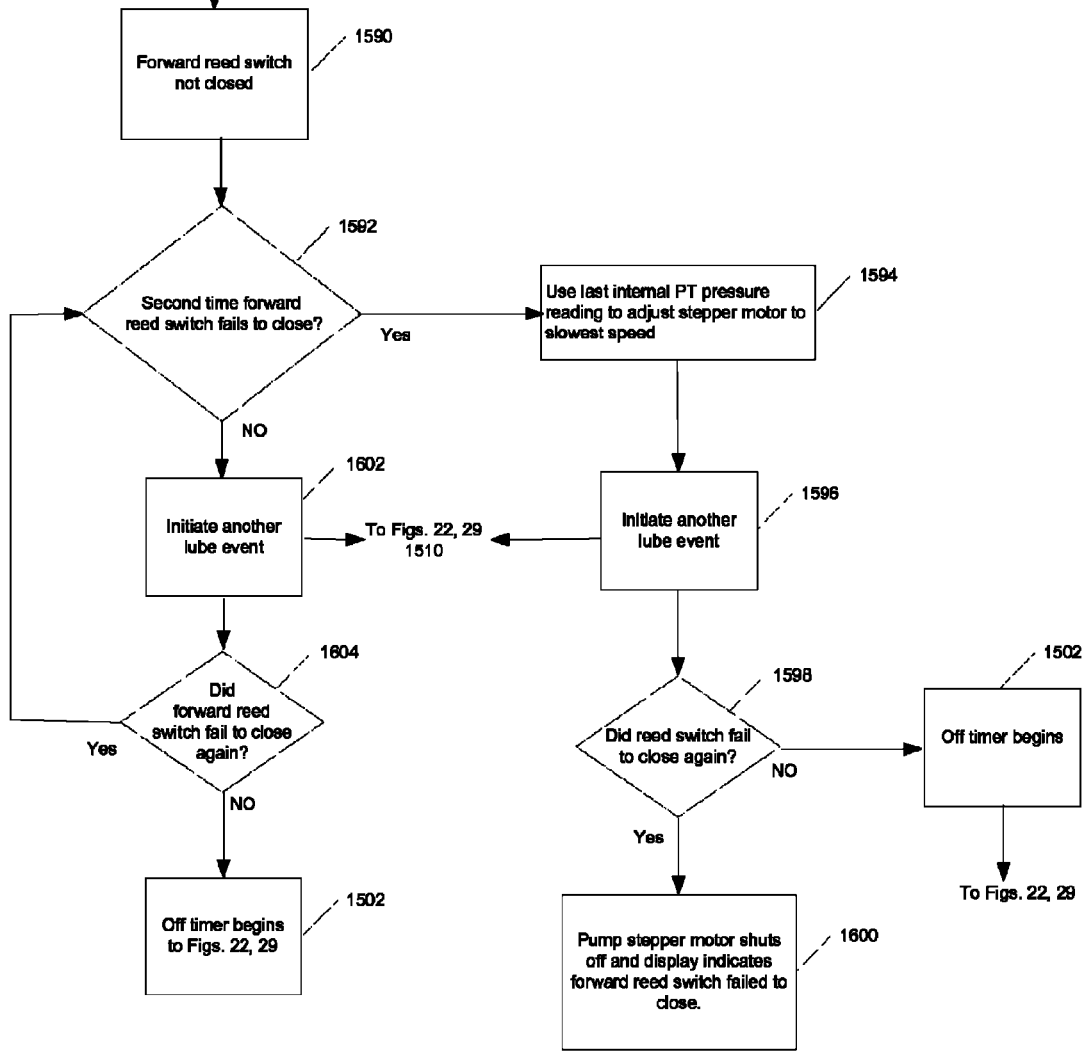
FIG. 25 is a flow diagram of one embodiment of the invention of instructions for execution by a processor to provide full stroke test of a piston for a lubrication system having a closed loop, injector system with an internal pressure transducer or an open loop, non-injector system with an internal pressure transducer.

FIG. 25 is a flow diagram of one embodiment of the invention of instructions for execution by a processor to conduct a full-stroke test of a piston for a lubrication system having either a closed loop, injector system with an internal (pump) PT or an open loop, non-injector system with an internal (pump) PT. From 1518 of FIGS. 22 and 29 as 1590 indicates, during pump stepper motor operation, the forward magnetic sensor 442 (e.g., a reed switch) did not close when the stepper 394 motor reversed for its return stroke (indicating that the stepper motor 394 did not move the piston to its forward position as sensed by the forward sensor 442). At 1592, the processor determines if this is the second time that the forward reed switch failed to close during a lube event or a set period. If yes, at 1594 the processor uses the last internal (pump) PT pressure reading to adjust the stepper motor operation. For example, if the stepper motor is being operated according to a profile as illustrated and described with regard to FIGS. 56-58 (below), then the processor uses the last internal (pump) PT pressure reading to adjust the stepper motor operation to a slower speed according to a lookup table. At 1596, the processor moves the piston to its vent position, and the processor then returns to 1510 (FIG. 22 for injector systems and FIG. 29 for divider valve systems) to initiate another lube event. If the forward reed switch fails to close again at 1598, the pump stepper motor is shut off at 1600, and the processor discontinues anymore timed lube events. Also, a pressure alarm is activated by the processor and the display 456 indicates that forward reed switch failed to close. If the forward reed switch does not fail at 1598, the processor returns to 1502 (FIG. 22 for injector systems and FIG. 29 for divider valve systems) to begin the off timer for the next event since a normal lube event has occurred. If the forward reed switch has not failed to close a second time at 1592, at 1602, the processor returns the piston to its vent position and implements the activity at 1510 (FIG. 22 for injector systems and FIG. 29 for divider valve systems) to initiate another lube event. If the forward reed switch fails to close again at 1604, the processor returns to 1592. If not, the processor returns to 1502 (FIG. 22 for injector systems and FIG. 29 for divider valve systems) to begin the off timer for the next event since a normal lube event has occurred. In one embodiment, the reed switch is a piston sensor providing a piston signal indicative of the position or movement of the piston.

Figure 26:
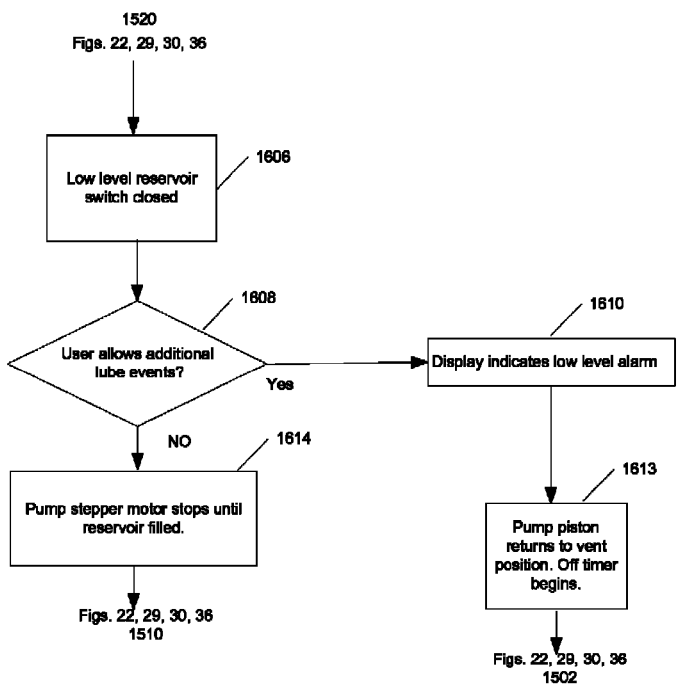
FIG. 26 is a flow diagram of one embodiment of the invention of instructions for execution by a processor to provide reservoir level test for a lubrication system having a closed loop, injector system or an open loop, non-injector system, each with or without an internal pressure transducer.
Figure 30:
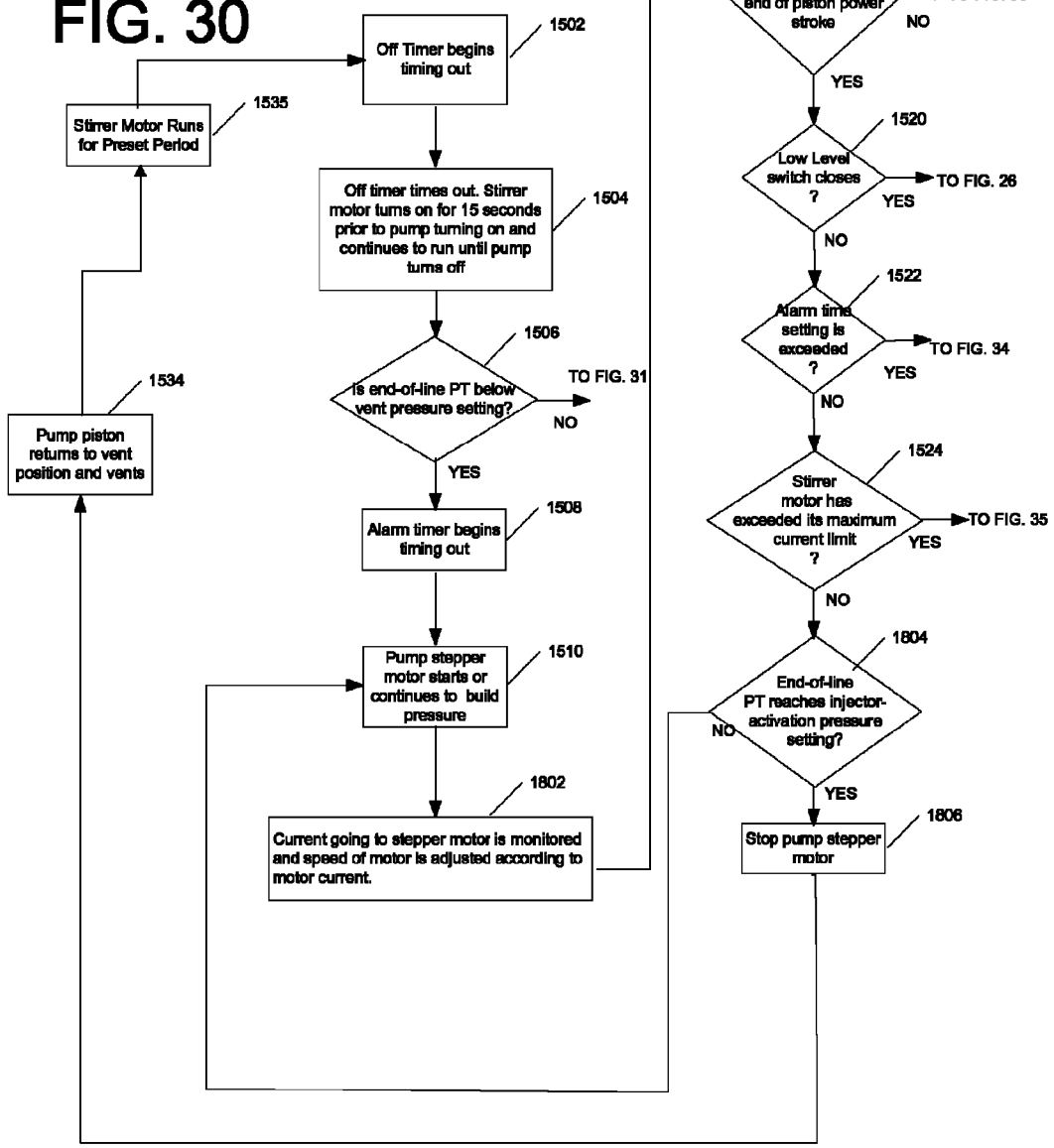
FIG. 30 is a flow diagram of one embodiment of the invention of instructions for execution by a processor to provide self-diagnostics for a lubrication system having a closed loop, injector system without an internal pressure transducer.

FIG. 26 is a flow diagram of one embodiment of the invention of instructions for execution by a processor to provide a reservoir level test for a lubrication system having either a closed loop, injector system or an open loop, non-injector system, each with or without an internal (pump) PT. From 1520 of FIGS. 22, 29, 30 and 36 as 1606 indicates, the low level reservoir switch may close during a pumping operation. If this occurs, the processor waits until the lube event completes and the pump stepper motor 394 shuts off. At 1608, if the user has set the software operating the processor to allow additional lube events when the low level switch is closed, the processor proceeds to 1610 to indicate on display 456 a low level alarm. At 1613, the pump piston returns to the vent position and vents. The processor proceeds to 1502 (FIG. 22 for injector systems with an internal PT; FIG. 29 for divider valve systems with an internal PT; FIG. 30 for injector systems without an internal PT; FIG. 36 for divider valve systems without an internal PT) to start the off timer until the next lube event. At 1608, if the user has not set the software operating the processor to allow additional lube events when the low level switch is closed, the processor proceeds to 1614. The pump stepper motor does not restart again until reservoir has been filled. The processor indicates a low level alarm on the display 456, and a low level alarm relay is energized. When the reservoir is refilled, the processor goes to 1510 (FIG. 22 for injector systems with an internal PT; FIG. 29 for divider valve systems with an internal PT; FIG. 30 for injector systems without an internal PT; FIG. 36 for divider valve systems without an internal PT).

Figure 27:
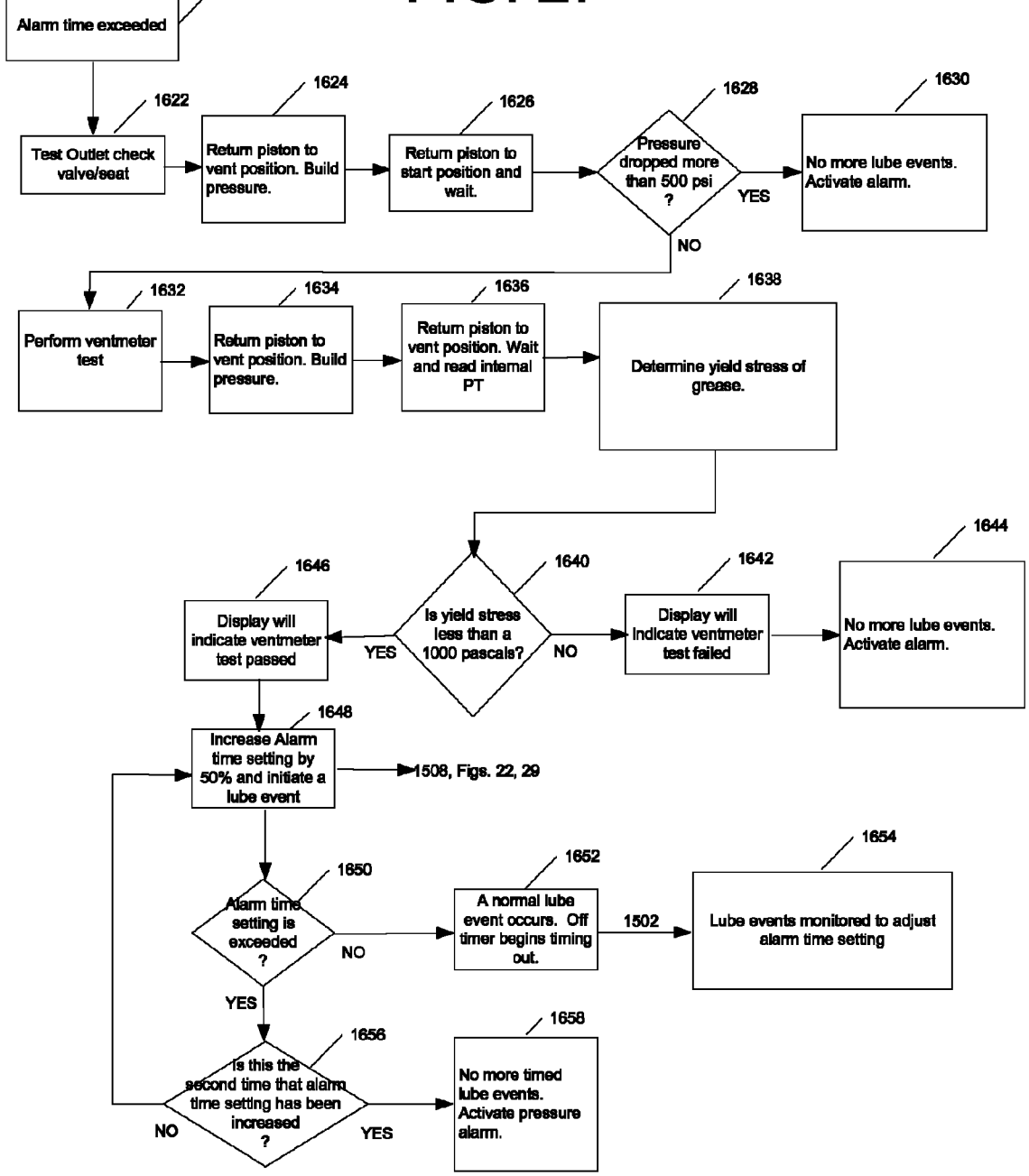
FIG. 27 is a flow diagram of one embodiment of the invention of instructions for execution by a processor to provide a cycle (i.e., injector reset) time out test for a lubrication system having a closed loop, injector system with an internal pressure transducer or an open loop, non-injector system with an internal pressure transducer.

FIG. 27 is a flow diagram of one embodiment of the invention of instructions for execution by a processor to provide a cycle (i.e., injector reset) time-out test for a lubrication system having either a closed loop, injector system with an internal (pump) PT or an open loop, non-injector system with an internal (pump) PT. From FIGS. 22 and 29 as indicated at 1620, the alarm time was exceeded at 1524 or 1530. In response, the processor initiates an outlet check test at 1622 to determine whether the outlet check valve and/or the check valve seat are working properly or are defective. The piston of the pump unit 300 is returned to the vent position at 1624. After venting, the pump stepper motor 394 is started and builds the pressure. The pump stepper motor 394 is stopped by the processor when the pressure sensed by the end-of-line PT 2346 equals or exceeds a preset setting (e.g., 1000 psi), which may be previously input or adjusted by the user. At 1626, the pump piston 384 is returned to the start (vent) position and the processor waits a set time period (e.g., 20 seconds). At 1628, the processor determines if the pressure as sensed by the end-of-line PT 2346 has dropped more than a set amount (e.g., 500 psi). If yes, no more timed lube events will be initiated by the processor at 1630. The processor activates a pressure alarm and controls the display 456 to indicate that the alarm time setting was exceeded due to a defective outlet check valve 344 and/or check valve seat 348.

If the pressure has dropped less than the set amount, the processor proceeds to 1632 and initiates a ventmeter test (described above). At 1634, the pump piston is returned to the vent position and the processor operates the pump stepper motor to build the internal pressure to a set amount (e.g., 1800 psi) and then stops the pump stepper motor. At 1636, the pump piston 384 is returned to the vent position and the processor waits a set time period (e.g., 30 seconds) to read the internal pump pressure. The processor then completes the ventmeter test using the internal (pump) PT pressure reading at 1638, supply line length, and supply line diameter to determine the yield stress of the grease. If the determined yield stress is greater than the set yield stress level (e.g., 1000 pascals) at 1640, the processor will indicate the negative (failing) ventmeter test results on the display 456 at 1642. At 1644, the processor discontinues any more timed lube events, and the alarm is activated by the processor. If the determined yield stress is less than the set yield stress level (e.g., 1000 pascals) at 1640, the processor will indicate the positive (passing) ventmeter test results on the display 456 at 1646. At 1648, the processor will increase the alarm time setting by a set amount (e.g., 50%) and initiate a lube event at 1508 (FIG. 22 for injector systems and FIG. 29 for divider valve systems). If the increased alarm time setting is not exceeded at 1650, a normal lube event has occurred and the processor proceeds to 1502. Optionally, at 1654, the next lube event and those following will be monitored by the processor to determine if the alarm time setting can be adjusted to the original user setting. If the increased alarm time setting is exceeded at 1650, and the processor determines at 1656 that this is not the second time that the alarm time setting has been increased, the processor proceeds back to 1648. If it is the second time, the processor proceeds to 1658. No more timed lube events are initiated by the processor and an alarm is activated. The display 456 indicates that the alarm time has been exceeded.

Figure 28:
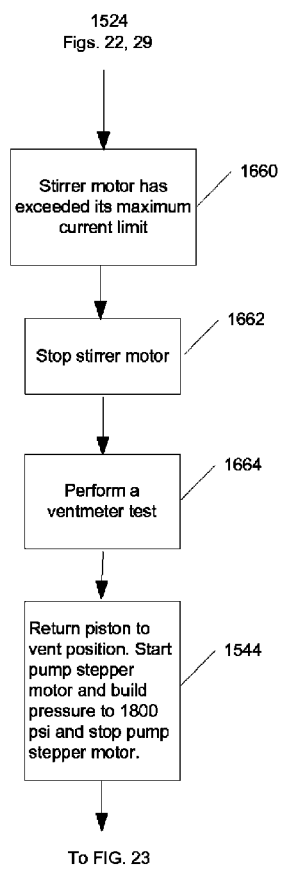
FIG. 28 is a flow diagram of one embodiment of the invention of instructions for execution by a processor to provide a lubricant reservoir stiffness test for a lubrication system having a closed loop, injector system with an internal pressure transducer or an open loop, non-injector system with an internal pressure transducer.

FIG. 28 is a flow diagram of one embodiment of the invention of instructions for execution by a processor to provide a reservoir lubricant stiffness test for a lubrication system having either a closed loop, injector system with an internal (pump) PT or an open loop, non-injector system with an internal (pump) PT. From FIGS. 22 and 29 as indicated at 1660, the stirrer motor 326 has exceeded its maximum current limit at 1626 so the stirrer motor is immediately stopped at 1662 and a ventmeter test is performed at 1664 with the stirrer motor turned off. The processor returns to 1544 of FIG. 23 for a ventmeter test, returning the pump piston to its vent position and starting the pump stepper motor to build the internal pressure at the pump cylinder outlet to the preset setting (e.g., 1800 psi). As an alternative or in addition to performing a ventmeter test at 1664, the processor may energize a heater to heat the lubricant. For example, a heater in the pump housing of the pump unit, or in the reservoir of the pump unit, or a heating element associated with a lube line, may be activated to reduce the lubricant stiffness. As noted below, stiff lubricant may be dispensed by overdriving the stepper motor for a period of time. In one embodiment, a heater may be activated and the stepper motor overdriven in order to dispense stiff lubricant. If lubricant in the reservoir is heated, the stirrer motor which was stopped at 1662 may be energized again because the lubricant in the reservoir has been heated and its viscosity reduced.

FIG. 29 is a flow diagram of one embodiment of the invention of instructions for execution by a processor to provide self-diagnostics for a lubrication system having either an open loop, non-injector (e.g., divider valve) system with an internal (pump) PT. FIG. 29 is the same as FIG. 22 except that 1506 is bypassed and 1526-1532 are replaced by 1702-1704. In divider valve systems such as represented by FIG. 29, at least one divider valve (e.g., a master divider valve) includes a proximity switch, such as an inductive switch, which is set when the divider valve moves to fill with lubricant and which is reset (i.e., the switch is activated) when the divider valve moves to empty and dispense the lubricant. At 1702, the processor confirms that the proximity switch of the divider valve has not been activated, indicating that the valve has not dispensed lubricant, and continues operation of the pump stepper motor 394 at 1510. If the proximity switch has been activated, the pump stepper motor stops at 1704 and the piston 384 is returned to its start position at 1533 (i.e., a non-venting start position; see FIG. 8). The stirrer motor 326 runs for a preset period (e.g., 15 seconds) at 1535 and then the off timer begins again at 1502.

In FIG. 29, for a system with a stirrer, a lube event is the time between the end of one lube event at 1535 with the end of the preset period of the operation of the stirrer motor and the start of the next lube event at 1504 with the start of the stirrer motor. It is also contemplated that a system may not have a stirrer and operate in a manner similar to FIG. 29. In FIG. 29, for a system without a stirrer, a lube event is the time between the end of one lube event at 1533 with the pump piston returning to its start position and the start of the next lube event at 1510 with the start of the stepper motor.

FIG. 30 is a flow diagram of one embodiment of the invention of instructions for execution by a processor to provide self-diagnostics for a lubrication system having a closed loop, injector system without an internal (pump) PT. FIG. 30 is the same as FIG. 22 except that 1506 connects to FIG. 31 instead of FIG. 23; 1512-1514 have been replaced by 1802; 1516 is replaced by 1803; 1518, 1522, 1524 connect of FIGS. 33, 35, 36 instead of FIGS. 25, 27, 28; and 1526-1532 are replaced by 1804-1806. After the pump stepper motor 394 starts or continues to build pressure at 1510, the processor at 1802 monitors the current applied to the stepper motor and the speed of the motor is adjusted according to motor current. The applied current is indicative of the internal (pump) pressure at the cylinder outlet of the pump unit. A lookup table based on predetermined values is used by the processor to control the motor such as by adjusting the stepper motor voltage, adjusting available stepper motor current, adjusting applied power and to adjust the duty cycle (pulse frequency) width modulated (PWM) pulses applied to the motor to control and regulate the internal (pump) pressure. At higher motor currents, the stepper motor rotates at slower speeds. At 1804, if the end-of-line PT indicates that the end-of-line pressure has reached the injector-activation pressure setting necessary to activate the injectors, the pump stepper motor is stopped at 1806 and the processor proceeds to 1534. Otherwise, the pump stepper motor continues to operate and the processor proceeds to 1510.

In FIG. 30, for a system with a stirrer, a lube event is the time between the end of one lube event at 1535 with the end of the preset period of the operation of the stirrer motor and the start of the next lube event at 1504 with the start of the stirrer motor. It is also contemplated that a system may not have a stirrer and operate in a manner similar to FIG. 30. In FIG. 30, for a system without a stirrer, a lube event is the time between the end of one lube event at 1534 with the pump piston returning to its vent position and the start of the next lube event at 1510 with the start of the stepper motor.

Figure 31:
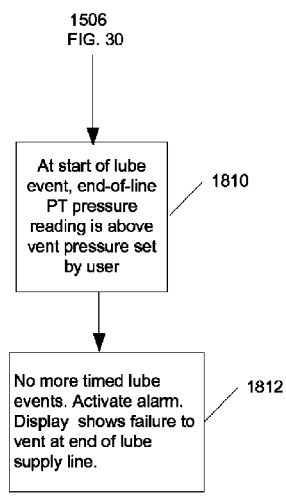
FIG. 31 is a flow diagram of one embodiment of the invention of instructions for execution by a processor to provide a ventmeter test for a lubrication system having a closed loop, injector system without an internal pressure transducer.

FIG. 31 is a flow diagram of one embodiment of the invention of instructions for execution by a processor to conduct a ventmeter test for a lubrication system having a closed loop, injector system without an internal (pump) PT. At 1506 of FIG. 30, the processor determines that the pressure reading from the end-of-line PT is below the vent pressure setting so the processor proceeds to FIG. 31. At 1810 in FIG. 31, at the start of the lube event, the pressure reading from the end-of-line PT is above the vent pressure setting set by the user. As a result, no more timed lube events are executed by the processor at 1812. The processor activates the alarm and controls the display 456 to show a failure to vent at the end of the lube supply line.

Figure 32:
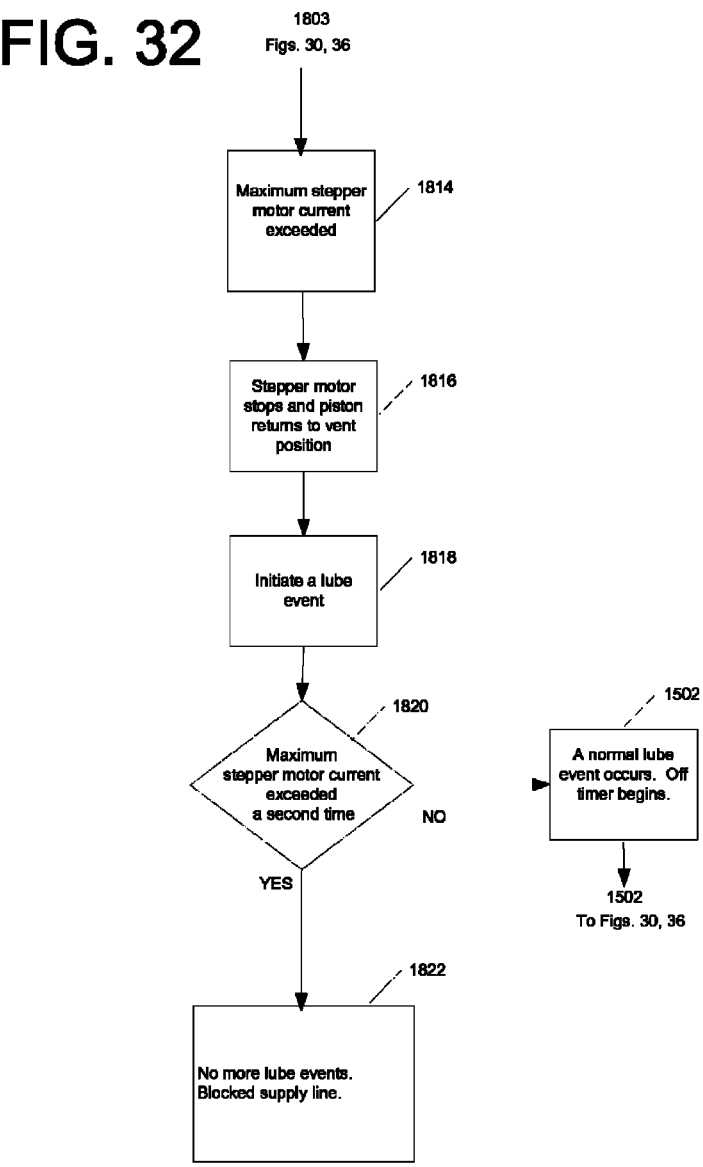
FIG. 32 is a flow diagram of one embodiment of the invention of instructions for execution by a processor to provide a maximum pressure test for a lubrication system having a closed loop, injector system without an internal pressure transducer or an open loop, non-injector system without an internal pressure transducer.

FIG. 32 is a flow diagram of one embodiment of the invention of instructions for execution by a processor to provide a maximum pressure test for a lubrication system having either a closed loop, injector system without an internal (pump) PT or an open loop, non-injector system without an internal (pump) PT. From 1803 of FIGS. 30 and 36, as 1814 indicates, the maximum stepper motor current driving the pump stepper motor has been exceeded. At 1816, the stepper motor is immediately stopped by the processor and reversed to return the pump piston to its vent position. At 1818, a lube event is initiated once the pressure has vented. At 1820, if the maximum motor current has been exceeded a second time, the processor shuts off the stepper motor at 1822 and no more lube events will occur. The pressure alarm relay is activated and the display 456 will indicate a blocked supply line. If the maximum motor current is not exceeded at 1820, the processor at 1820 returns to 1502 (FIG. 30 for injector systems and FIG. 36 for divider valve systems) to start a normal lube event and the off timer begins to time out.

Figure 33:
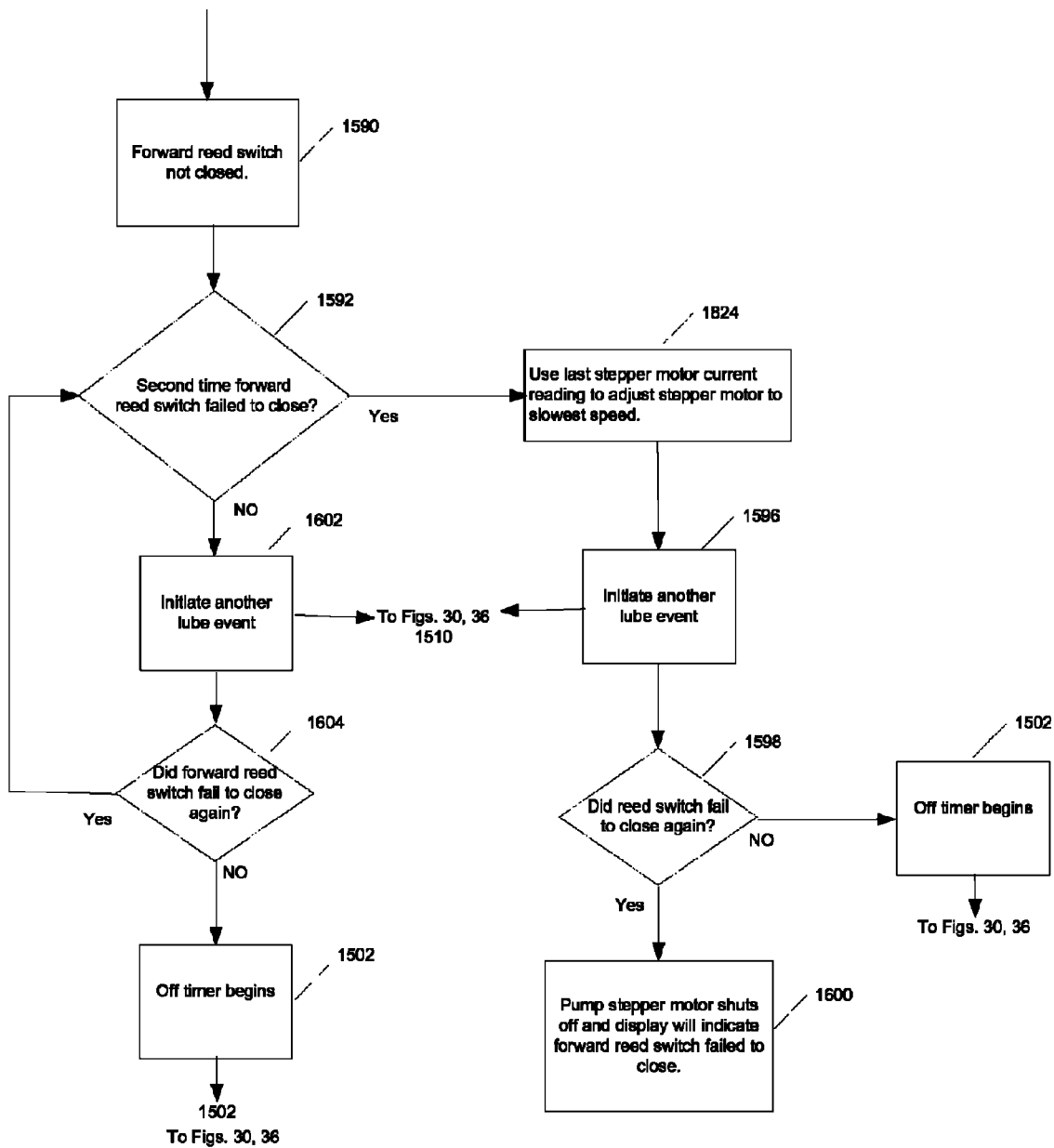
FIG. 33 is a flow diagram of one embodiment of the invention of instructions for execution by a processor to provide full stroke test of a piston for a lubrication system having a closed loop, injector system without an internal pressure transducer, or an open loop, non-injector system without an internal pressure transducer.

FIG. 33 is a flow diagram of one embodiment of the invention of instructions for execution by a processor to provide full stroke test for a piston of a lubrication system having either a closed loop, injector system without an internal (pump) PT or an open loop, non-injector system without an internal (pump) PT. FIG. 33 is the same as FIG. 25 except that 1594 has been replaced by 1824, which uses the last stepper motor current reading to adjust the motor to the slowest speed, as indicated by a lookup table. FIG. 33 proceeds from FIGS. 30 and 36 at 1518. If the reed switch does not fail to close again at 1598 or 1604, the processor returns to 1502 (FIG. 30 for injector systems and FIG. 36 for divider valve systems).

Figure 34:
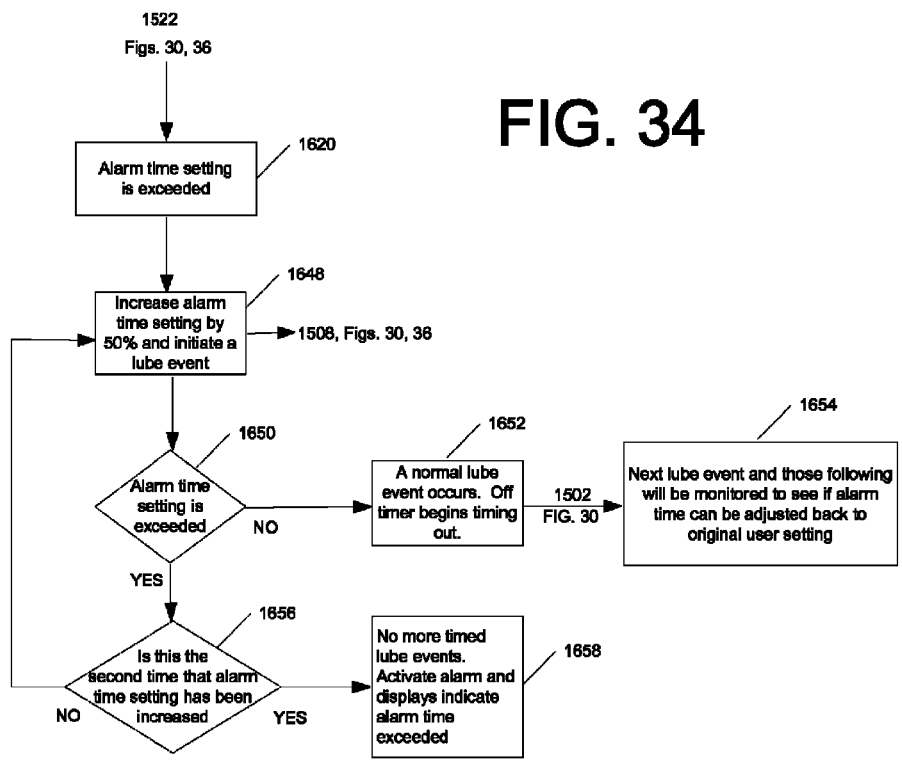
FIG. 34 is a flow diagram of one embodiment of the invention of instructions for execution by a processor to provide a cycle (i.e., injector reset) time out test for a lubrication system having a closed loop, injector system without an internal pressure transducer, or an open loop, non-injector system without an internal pressure transducer.

FIG. 34 is a flow diagram of one embodiment of the invention of instructions for execution by a processor to provide a cycle (i.e., injector reset) time out test for a lubrication system having either a closed loop, injector system without an internal (pump) PT or an open loop, non-injector system without an internal (pump) PT. FIG. 34 is the same as FIG. 27 except that 1622-1646 have been bypassed. FIG. 34 proceeds from FIGS. 30 and 36 at 1522. After increasing the alarm time at 1648, the processor returns to 1508 (FIG. 30 for injector systems and FIG. 36 for divider valve systems), or the processor returns to 1502 (FIG. 30 for injector systems and FIG. 36 for divider valve systems), or the alarm is activated at 1658.

Figure 35:
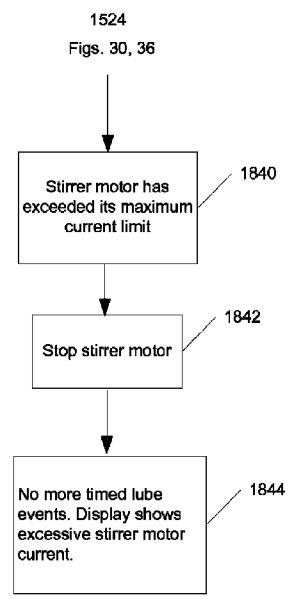
FIG. 35 is a flow diagram of one embodiment of the invention of instructions for execution by a processor to provide a lubricant reservoir stiffness test for a lubrication system having a closed loop, injector system without an internal pressure transducer, or an open loop, non-injector system without an internal pressure transducer.

FIG. 35 is a flow diagram of one embodiment of the invention of instructions for execution by a processor to provide a stiffness test for lubricant in the reservoir for a lubrication system having either a closed loop, injector system without an internal (pump) PT or an open loop, non-injector system without an internal (pump) PT. From 1524 of FIGS. 30 and 36, as 1840 indicates, the stirrer motor 326 has exceeded its maximum current limit. At 1842, the stirrer motor is stopped and at 1844, the processor discontinues timed lube events. An alarm is activated and the display 456 indicates excessive stirrer motor current.

FIG. 36 is a flow diagram of one embodiment of the invention of instructions for execution by a processor to provide self-diagnostics for a lubrication system having an open loop, non-injector (divider valve) system without an internal (pump) PT. FIG. 36 is the same as FIG. 30 except that 1872 replaces 1804. At 1802, in an open loop system the current applied to the stepper motor is monitored and the speed of the motor is adjusted by the processor according to motor current to control and adjust the internal or pump pressure. A lookup table based on predetermined values will adjust the stepper motor voltage, available motor current and the software commands to the motor. At higher motor currents, the stepper motor operates at slower speeds. At 1872, the processor confirms that the proximity switch monitoring a divider valve of the system has not been activated, indicating that the divider valve has not reset, and continues operation of the pump at 1510. If the proximity switch has been activated, the pump stepper motor is shut off at 1806 and the piston is returned to its start (non-venting) position at 1533.

In FIG. 36, for a system with a stirrer, a lube event is the time between the end of one lube event at 1535 with the end of the preset period of the operation of the stirrer motor and the start of the next lube event at 1504 with the start of the stirrer motor. It is also contemplated that a system may not have a stirrer and operate in a manner similar to FIG. 36. In FIG. 36, for a system without a stirrer, a lube event is the time between the end of one lube event at 1533 with the pump piston returning to its start position and the start of the next lube event at 1510 with the start of the stepper motor.

FIG. 36A is a flow diagram of one embodiment of the invention of instructions for execution by a processor to provide self-diagnostics for a CAN bus lubrication system having actuator valves without an internal pressure transducer such as illustrated in FIG. 19. FIG. 36A is the same as FIG. 36 except that 1508 and 1522 relating to the alarm timer and 1872 relating to the proximity switch are eliminated because this system does not have divider valves as does the system of FIG. 36. Thus, there is no alarm time setting corresponding to a maximum time from the start to the completion of a lube event. In this system, a lube event involves opening an actuator valve for a preset period of time (or for a preset number of pump stokes or a preset number of stepper motor rotations) in order to dispense a preset amount of lubricant through the open valve to its respective lubrication point.

As an example of the operation of a system according to FIG. 36A, reference will be made to FIG. 19. This example assumes that bearings 1148A and 1148B are scheduled for a volume of lubricant delivery requiring 30 seconds of stepper motor operation and that bearing 1148D is scheduled for a volume of lubricant delivery requiring 45 seconds of stepper motor operation. Bearing 1148C is not scheduled for lubrication in this example. At 1830, the right valve 1118, which is the zone solenoid for zone Z2, is energized (opened) via the CAN module 1121. At 1831, the first valve 1150A associated with bearing 1148A scheduled for lubrication is energized (opened) and the pump stepper motor starts at 1510. At 1832, the processor determines if the volume of lubricant output by the pump matches the user programmed value for bearing 1148A (e.g., 30 seconds). If not, the pump stepper motor continues to operate. When valve 1150A has been open for 30 seconds (or for a preset number of pump stokes or a preset number of stepper motor rotations, the processor proceeds from 1832 to 1833. Since valve 1150A is not the last valve in zone Z2 scheduled for lubrication, the processor proceeds to 1831 to sequentially close valve 1150A and open valve 1150B. When valve 1150B has been open for 30 seconds (or for a preset number of pump stokes or a preset number of stepper motor rotations), the processor proceeds from 1832 to 1833. Since valve 1150B is not the last valve in zone Z2 scheduled for lubrication, the processor proceeds to 1831 to sequentially close valve 1150B and open valve 1150D. When valve 1150D has been open for 45 seconds (or for a preset number of pump stokes or a preset number of stepper motor rotations), the processor proceeds from 1832 to 1833. Since valve 1150D is the last valve in zone Z2 scheduled for lubrication, the processor proceeds to 1834 to stop the pump stepper motor and then to 1835 to close valves 1150D and the right valve 1118, which is the zone solenoid for zone Z2.

In FIG. 36A, for a system with a stirrer, a lube event is the time between the end of one lube event at 1535 with the end of the preset period of the operation of the stirrer motor and the start of the next lube event at 1504 with the start of the stirrer motor. It is also contemplated that a system may not have a stirrer and operates in a manner similar to FIG. 36A. In FIG. 36A, for a system without a stirrer, a lube event is the time between the end of one lube event at 1533 with the pump piston returning to its start position and the start of the next lube event at 1510 with the start of the stepper motor.

Thus, as shown in FIGS. 22-37A, embodiments of the system of the invention includes the controller 2308 such as a processor and further comprises a tangible, computer readable non-transitory storage medium including processor executable instructions. The processor executes the instructions, and the instructions include at least one or more of:

(i) instructions for determining whether a lubricant injector connected to the system is venting and for energizing the alarm when the ventmeter test indicates that the injector is not venting (FIGS. 23 and 31);

(ii) instructions for determining a lubricant pressure at the pump and for energizing the alarm when the determined pressure is greater than a maximum pressure (FIGS. 24 and 32);

(iii) instructions for determining a piston movement and for energizing the alarm when the determined piston movement is less than a minimum movement (FIGS. 25 and 33);

(iv) instructions for determining a lubricant level of the reservoir and for energizing the alarm when the determined lubricant level is less than a minimum level (FIG. 26);

(v) instructions for determining a lubricant pressure and for energizing the alarm when the determined pressure is less than a maximum pressure after a given period of time of motor pump operation has elapsed (FIGS. 27 and 35);

(vi) instructions for monitoring a current applied to the stirrer motor and for discontinuing operation of the stirrer motor when the stirrer motor current exceeds a maximum (FIG. 28); and (vii) instructions for monitoring a current applied to the stirrer motor 326 and for energizing the alarm when the stirrer motor current exceeds a maximum (FIG. 35).

FIG. 37 is a block diagram of one embodiment of a CAN bus lubrication system 2300 of the invention for supplying lubricant to zones of actuator controlled valves. The lubrication system 2300 includes a pump unit 300 having the components described above. The reservoir 304 of the pump unit holds lubricant (e.g., grease) and has reservoir outlet 316 for supplying the lubricant to the lubricant delivery system via a lube supply line 2302 in communication with the cylinder outlet 354 of the pump unit. The pump unit 300 includes the cylinder 334 defining the cylinder bore 338, the cylinder inlet 334a in communication with the reservoir outlet 316 for flow of lubricant from the reservoir 304 into the cylinder bore 338, the cylinder outlet 354, and the piston 384 movable in the cylinder bore 338 (see FIGS. 3-9). The supply line 2302 includes a plurality of valves 2304, each for controlling delivery of lubricant to locations such as bearings 2306 when the valves are opened and the lubricant is under pressure generated by the pump unit 300. The drive mechanism of the pump unit (e.g., 326, 390, 1200) including the motor, such as stepper motor 394, reciprocates the piston 384 in the cylinder bore 338 to pressurize the lubricant. A controller 2308, such as a microprocessor and/or a programmable logic array, controls the operation of the motor 394 by selectively energizing the motor to reciprocate the piston 384.

A controller area network (CAN) bus 2310, illustrated by dashed lines in FIG. 37, is connected to the controller 2308 and carries CAN command signals. It is contemplated that the CAN bus may be implemented as a wired or wireless network. As used herein, "connect" means a wired or wireless connection. A power bus 2312 is connected to a power supply 2314 to supply power to energize the components of the system 2300, as noted herein. A plurality of actuators, such as solenoids 2316, is associated with the valves 2304 for opening and closing respective valves. A plurality of CAN modules 2320, each having relays 2318, control operation of the solenoids 2316. For example, each CAN module may be model no. EZ221-CO slave interface in combination with model no. EZ500/700 relay unit, both sold by Eaton Corp. The slave interface connects to the CAN Bus 2310 to receive CAN command signals from the controller. The relays 2318 are connected to the power bus 2312 for selectively energizing respective actuators 2316 to open and close the valves 2304 associated with the actuators in order to deliver lubricant. The CAN modules 2320 are connected between the CAN bus 2310 and respective relays 2318 for controlling respective relays in response to CAN command instructions provided by the controller 2310 via the CAN bus 2310.

In one embodiment, a sensor such as a flow meter, a bearing sensor, an acoustic vibration sensor, a heat sensor, and/or a pressure sensor may be used for sensing a condition related to the system 2300. In general, the sensor may be any sensor which senses lubricant, lubricant flow, a lubricant parameter, a lubricant condition, or a need for lubricant. For example, an acoustic, thermal, vibration or pressure sensor 2322 may be in communication with bearing 2306A; a pressure sensor 2324 may be in communication with lube supply line 2302; and/or a flow sensor 2326 may be in communication with the lube supply line to bearing 2306B. In each embodiment, the sensor provides a condition signal (e.g., a pressure signal, a flow signal, a heat signal, a vibration signal) indicative of the condition it senses to one of the CAN modules 2320 which provides a corresponding condition signal to the controller 2308 via the CAN bus 2310. As a result, the controller is responsive to the corresponding condition signal to control the motor 394. In one embodiment, the controller 2308 is responsive to one or more condition signals to send CAN signals via the CAN bus 2310 to at least one or more of the CAN modules 2310 to control the CAN relays 2318 associated with the CAN modules 2310 to selectively energize the solenoids 2316 of the CAN relays 2318 associated with the CAN modules to implement a lube event. This results in a lubrication-on-demand type of system. For example, the sensors may be sensing a condition of the system which corresponds to a need for a lubrication event. In particular, the sensors may be sensing a temperature of a bearing, an acoustic output of a bearing, and/or a vibration of a bearing. In response, the controller controls operation of the stepper motor 394 by selectively energizing the motor to reciprocate the piston 384. As a result, the controller 2308 is responsive to the condition signal to modify system operation such as by selectively energizing the drive mechanism and pump lubricant when the condition signal is indicative of the need for a lubrication event, such that the system provides lubrication on demand.

In one embodiment, one or more alarms 2330 may be part of the system 2300. In this embodiment, the controller 2308 includes a memory for storing alarm conditions and is responsive to the condition signals to modify system operation such as by selectively energizing the alarm(s) 2330 when the condition signal corresponds to one of the alarm conditions. The alarm may be a visual indication, an audible indication, a notice on a screen, an email, a text message, a voice mail message, or any other notification to alert an operator.

In FIG. 37, one or more of the zones may include metering valves (not shown) which are configured to dispense a preset volume of lubricant during each lubrication event. The divider valves noted herein (see FIG. 37A) are an example of metering valves. Depending on the type of metering valve, separate actuators (e.g., solenoids 2316) may not or may not be needed for the valves. For embodiments including a zone having metering valves, the controller 2308 is programmed to operate the stepper motor 394 to pump lubricant to load the metering valves in the zone, following which the metering valves dispense metered volumes of lubricant to the bearings 2306. Alternatively, or in addition, one or more of the zones may include non-metering valves 2304 which are opened and closed by their respective solenoids 2316. Thus, the controller controls the non-metering valves in the zone and determines the amount of lubricant dispensed during a lubricant event. For embodiments including a zone of non-metering valves, the controller is programmed to operate the stepper motor to pump lubricant to dispense a preset volume of lubricant in the zone. Thus, the pump stepper motor 394 as energized by the controller determines the amount of lubricant dispensed during a lubricant event.

The controller 2308 can be programmed to pump a preset volume of lubricant in a period of time or for a number of pumping strokes. Thus, the controller can control the pump stepper motor to pump a preset volume based on a period of time of pump stepper motor 394 operation (e.g., preset volume equals minutes of pump stepper motor 394 operation times in$^3$/min or preset volume equals minutes of pump stepper motor 394 operation times cc/min) in order to dispense the preset volume of lubricant. Alternatively, the controller can control the pump stepper motor 394 to pump a preset volume based on a number of pumping strokes (e.g., volume equals number of piston strokes times the volume of the cylinder bore displaced by the piston movement during each pumping stroke or volume equals number of strokes times diameter of cylinder bore times the length of each piston stroke) in order to dispense the preset volume of lubricant. This type of preset volume control is particularly applicable in lube-on-demand type systems and in divider valve distribution systems. In one embodiment, a user can enter via the input device 454 a preset volume of lubricant to be pumped either in a manual mode which is initiated by the user or in an automatic mode which is executed periodically by the processor for each lube event. In response, the controller energizes the pump motor 394 for a period of time corresponding to the preset volume. Although this type of preset volume control does not require sensors such as pressure or volume sensors, it is contemplated that sensors may be used optionally in certain embodiments to confirm that the preset volume of lubricant has been pumped.

For example, in FIG. 19, the controller 450 can send a message to CAN module 1121 to open zone Z1 by opening the left valve 1118, and then the controller 450 can operate the stepper motor 394 of the pump unit 300 for a preset period of time or for a preset number of strokes to pump a corresponding preset volume of lubricant to the lubrication points 1134. Alternatively, the controller 450 can send a message to CAN module 1121 to open zone Z2 by opening the right valve 1118 and then the controller 450 can operate the pump stepper motor for a preset period of time or for a preset number of strokes to pump a corresponding preset volume of lubricant to the lubrication points 1148A-1148D. Other zones can be similarly opened for pumping a preset volume of lubricant.

Similarly, in FIG. 16, the controller 450 can send a message to a CAN module (not shown) to open zone Z1 by opening the left valve 818, and then the controller 450 can operate the pump for a preset period of time or for a preset number of strokes to pump a corresponding preset volume of lubricant to the lubrication points 834. Alternatively, the controller 450 can send a message to the CAN module to open zone Z2 by opening the right valve 818 and then the controller 450 can operate the pump stepper motor for a preset period of time or for a preset number of strokes to pump a corresponding preset volume of lubricant to the lubrication points 850. Other zones can be similarly opened for pumping a preset volume of lubricant.

Similarly, in FIG. 17, the controller 450 can send a message to a CAN module (not shown) to open zone Z1 by opening the left valve 918, and then the controller 450 can operate the pump for a preset period of time or for a preset number of strokes to pump a corresponding preset volume of lubricant to the lubrication points 934. Alternatively, the controller 450 can send a message to the CAN module to open zone Z2 by opening the right valve 918 and then the controller 450 can operate the pump stepper motor for a preset period of time or for a preset number of strokes to pump a corresponding preset volume of lubricant to the lubrication points 948. Other zones can be similarly opened for pumping a preset volume of lubricant.

Similarly, in FIG. 18, the controller 450 can send a message to a CAN module (not shown) to open zone Z1 by opening the left valve 1018 and then the controller 450 can operate the pump for a preset period of time or for a preset number of strokes to pump a corresponding preset volume of lubricant to the lubrication points 1034. Alternatively, the controller 450 can send a message to the CAN module to open zone Z2 by opening the right valve 1018 and then the controller 450 can operate the pump stepper motor for a preset period of time or for a preset number of strokes to pump a corresponding preset volume of lubricant to the lubrication points 1048. Other zones can be similarly opened for pumping a preset volume of lubricant.

Similarly, in FIG. 19A, the controller 450 can send a message to a CAN module (not shown) to open zone Z2 by opening the left valve 1418, and then the controller 450 can operate the pump for a preset period of time or for a preset number of strokes to pump a corresponding preset volume of lubricant to the lubrication points 1482. Alternatively, the controller 450 can send a message to the CAN module to open zone Z2 by opening the right valve 1418 and then the controller 450 can operate the pump stepper motor for a preset period of time or for a preset number of strokes to pump a corresponding preset volume of lubricant to the lubrication points 1434. Other zones can be similarly opened for pumping a preset volume of lubricant.

Similarly, in FIG. 19B, the controller 450 can send a message to a CAN module (not shown) to open zone Z1 by opening the right valve 1418 and then the controller 450 can operate the pump for a preset period of time or for a preset number of strokes to pump a corresponding preset volume of lubricant to the lubrication points 1934. Alternatively, the controller 450 can send a message to the CAN module to open zone Z2 by opening the right valve 1418 and then the controller 450 can operate the pump stepper motor for a preset period of time or for a preset number of strokes to pump a corresponding preset volume of lubricant to the lubrication points 1482. Other zones can be similarly opened for pumping a preset volume of lubricant.

Figure 37A:
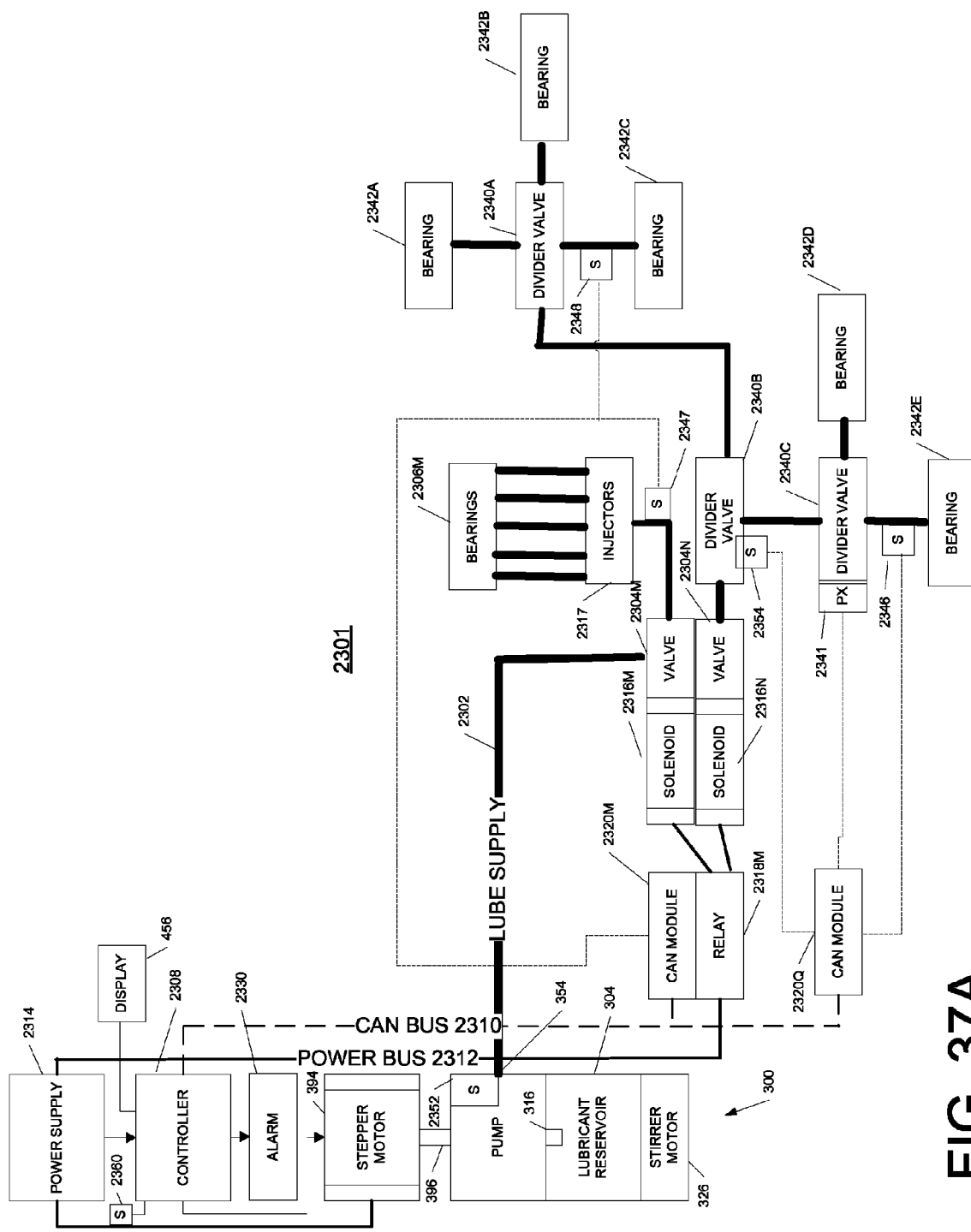
FIG. 37A is a block diagram of another embodiment of a CAN bus lubrication system 2300 of the invention for supplying lubricant including a zone of divider valves and a zone of injectors.

The zone of FIGS. 37 and 37A can be similarly opened for pumping a preset volume of lubricant. In addition, since the volume of lubricant being dispensed by pump unit is know to the processor, this information can be used as diagnostic information. For example, consider a system with 100 lubrication points needing a total required volume of 150 cc of lubricant during a lube event. After a lube event is executed, the processor can compare the actual dispensed volume of lubricant dispensed during the lube event to the total required volume. If the actual dispensed volume is less than the total required volume, this would indicate a blocked line or other problem preventing lubricant delivery. If the actual dispensed volume is greater than the total required volume, this would indicate a broken line or other problem such as a leak causing lubricant to escape from the system. Thus, the volume of lubricant dispensed can be monitored and an alarm actuated when the actual volume dispensed differs from the total required volume.

Also, the period of time during which a valve is open, as determined by the controller, can impact the amount of lubricant delivered. In certain installations, metered valves (e.g., injectors and/or divider valves) may be more expensive to implement than non-metered valves so that it may be less expensive to implement zones of non-metered valves. The flexibility of the system 2300 permits various types of zones in order to meet the various requirements of a particular installation.

FIG. 37A is a block diagram of one embodiment of a CAN bus lubrication system 2301 of the invention for supplying lubricant to zones of divider valves and zones of injectors (see also FIG. 17 for a similar zone illustration). It is contemplated that the systems 2300 and 2301 may be combined as one system including one or more zones of injectors, divider valves and/or actuator controlled valves. System 2301 includes a pump unit 300. The system also includes a valve 2304M opened and closed by solenoid 2316M for supplying lubricant to a zone of injectors 2317 lubricating bearings 2306M. One of the relays 2318M of the CAN module 2320M is selectively closed to energize solenoid 2316M to open valve 2304M to supply lubricant via lube supply line 2302 to injectors 2317. Pressure sensor 2347 senses the pressure of the lubricant in the line between the valve 2304M and the injectors 2317 and provides a pressure signal to CAN module 2320M which sends a corresponding signal to controller 2308 via CAN bus 2310.

System 2301 also includes a valve 2304N opened and closed by solenoid 2316N for supplying lubricant to a zone of divider valves 2340 for lubricating bearings 2342. One of the relays 2318M of the CAN module 2320M is selectively closed to energize solenoid 2316N to open valve 2304N to supply lubricant via lube supply line 2302 to divider valve 2340B, which supplies lubricant to divider valves 2340A, 2340C lubricating bearings 2342. Pressure sensor 2346 senses the pressure of the lubricant in the line between the divider valve 2340C and the bearing 2342E and provides a pressure signal to CAN module 2320Q which sends a corresponding signal to controller 2308 via CAN bus 2310. Pressure sensor 2348 senses the pressure of the lubricant in the line between the valve 2340A and the bearing 2342C and provides a pressure signal to CAN module 2320M which sends a corresponding signal to controller 2308 via CAN bus 2310. A proximity switch (PX) 2341 associated with divider valve 2340C senses activation of valve 2340C and provides an activation signal to CAN module 2320Q which sends a corresponding signal to controller 2308 via CAN bus 2310, confirming activation of valve 2340C.

As will be appreciated by those skilled in the art, a system of the invention including a CAN bus and CAN modules can be configured in several different forms with several different types of zones. As one example, the system may have sensors and operate as a lube-on-demand type system in response to the sensors. Such a system may or may not have metering valves in a particular zone. As another example, the system may be programmed to execute lubrication events according to a schedule, such as every 15 minutes. Such a system may or may not have metering valves in a particular zone and may or may not have sensors to which the controller responds.

Each zone may have a zone valve which is controlled by a zone actuator responsive to a CAN zone module. The zone valve selectively supplies lubricant to the zone. For example, as shown in FIG. 19, valves 1118 are zone valves controlling lubricant flow to zones Z1, Z2, and the CAN modules 1121, 1123 are CAN zone modules for controlling zone actuators associated with respective zone valves 1118 for opening and closing the valves 1118.

The zones may include one or more sensors, such as line pressure sensors 2346, 2347, 2348 for sensing the pressure of lubricant in one or more supply lines and/or one or more proximity switches 2354 for sensing a set/reset condition of one or more divider valves 2340B.

The following are examples of various sensors which may be part of the system 2300. The sensors send condition signals to the controller for an appropriate response by the controller.

A pressure sensor may be used to monitor a lubricant pressure of the lubricant delivery system. In this example, the condition signal is a pressure signal and the controller is responsive to the pressure signal to energize an alarm when the pressure signal indicates that the lubricant pressure is less than a minimum pressure setting (e.g., see 1574 and 1578 of the ventmeter test, FIG. 23, which activate an alarm.)

A pressure sensor may be used to monitor a lubricant pressure at the cylinder outlet of the pump unit 300. In this example, the condition signal is a pressure signal and the controller is responsive to the pressure signal to energize an alarm when the pressure signal indicates that the lubricant pressure at the pump is greater than a maximum pressure setting (e.g., see maximum pump pressure; FIG. 24).

A motion sensor may be used to monitor a movement of the piston of the pump unit 300. In this example, the condition signal is a motion signal and the controller is responsive to the motion signal to energize an alarm when the motion signal indicates that the piston movement is less than a minimum movement (e.g., see full-stroke test; FIG. 25) (No alarm in FIG. 25).

A level sensor may be used to monitor a lubricant level of the reservoir of the pump unit 300. In this example, the condition signal is a level signal and the controller is responsive to the level signal to energize an alarm when the level signal indicates that the lubricant level is less than a minimum level (e.g., see reservoir level test; FIG. 26).

A pressure sensor may be used to monitor a lubricant pressure in a lube line and/or at a lube point in the lubricant delivery system. As noted herein, the pressure sensor may bean internal (pump) PT and an end-of-line PT. In this example, the condition signal is a pressure signal and the controller is responsive to the pressure signal to energize an alarm when the pressure signal indicates that the lubricant pressure is less than a minimum pressure setting after a given period of time of pump motor operation has elapsed (e.g., see cycle (i.e., injector reset) time out test; FIG. 27).

In one embodiment (FIG. 37A), the controller 2308 selectively energizes the stepper motor 394 and a current sensor 2360 monitors a current applied to the stepper motor 394. In this example, the condition signal is a current signal and the controller is responsive to the current signal to energize an alarm when the current signal indicates that the current applied to the stepper motor is greater than a maximum current setting. Alternatively or in addition, as noted herein, the stepper motor current is monitored in order to selectively overdrive the stepper motor. Alternatively or in addition, as noted herein, the stepper motor current is monitored as an indication of the internal (pump) pressure.

In some embodiments, a stirrer 320 in the reservoir is driven by a stirrer motor 326 to mix the lubricant and keep it fluid by reducing its viscosity. In this embodiment, the controller 2308 selectively energizes the stirrer motor and a current sensor 2358 monitors a current applied to the stirrer motor 326. In this example, the condition signal is a current signal and the controller is responsive to the current signal to energize an alarm when the current signal indicates that the current applied to the stirrer motor 326 is greater than a maximum current setting (e.g., see lubricant reservoir stiffness test; FIG. 28).

As noted herein, the controller may a processor in which case it would include a tangible, computer readable non-transitory storage medium including processor executable instructions for controlling the operation of the processor. In this embodiment, the processor programmed by an operator to execute one or more of the following sets of instructions:
  (i) instructions for determining whether a lubricant injector connected to the system is venting and for energizing an alarm when the ventmeter test indicates that the injector is not venting;
  (ii) instructions for determining a lubricant pressure at the cylinder outlet of the pump unit and for energizing an alarm when the determined pressure is greater than a maximum pressure;
  (iii) instructions for determining a piston movement and for energizing an alarm when the determined piston movement is less than a minimum movement;

(iv) instructions for determining a lubricant level of the reservoir and for energizing an alarm when the determined lubricant level is less than a minimum level; and/or (v) instructions for determining a lubricant pressure and for energizing an alarm when the determined pressure is less than a maximum pressure after a given period of time of motor pump operation has elapsed.

The controller area network (CAN) bus 2310 system and features described above have been described in the context of lubrication systems which include the pump unit 300 described earlier. However, it will be understood that these same self-diagnostic features can be used in lubrication systems having other pump units, such as the pump units 2500, 2900 described below and other lubricant pump units that include a stepper motor or an alternative linear position drive mechanism (e.g., the mechanism of FIG. 20 or FIG. 21).

Similarly, the self-diagnostic features described above have been described in the context of lubrication systems which include the pump unit 300 described earlier. However, it will be understood that these same self-diagnostic features can be used in lubrication systems having other pump units, such as the pump units 2500, 2900 described below and other lubricant pump units that include a stepper motor or an alternative linear position drive mechanism (e.g., the mechanism of FIG. 20 or FIG. 21).

FIGS. 38-54 illustrate another embodiment of a pump unit of this invention, generally designated 2500. The pump unit is similar to the pump unit 300 described above. It comprises a reservoir 2504 for holding a supply of lubricant (e.g., grease) and a pump housing 2506 below the reservoir for housing various pump components of the unit, including a pump cylinder 2508 and a piston 2512 movable back and forth in the cylinder (see FIGS. 41 and 42).

Figure 38:
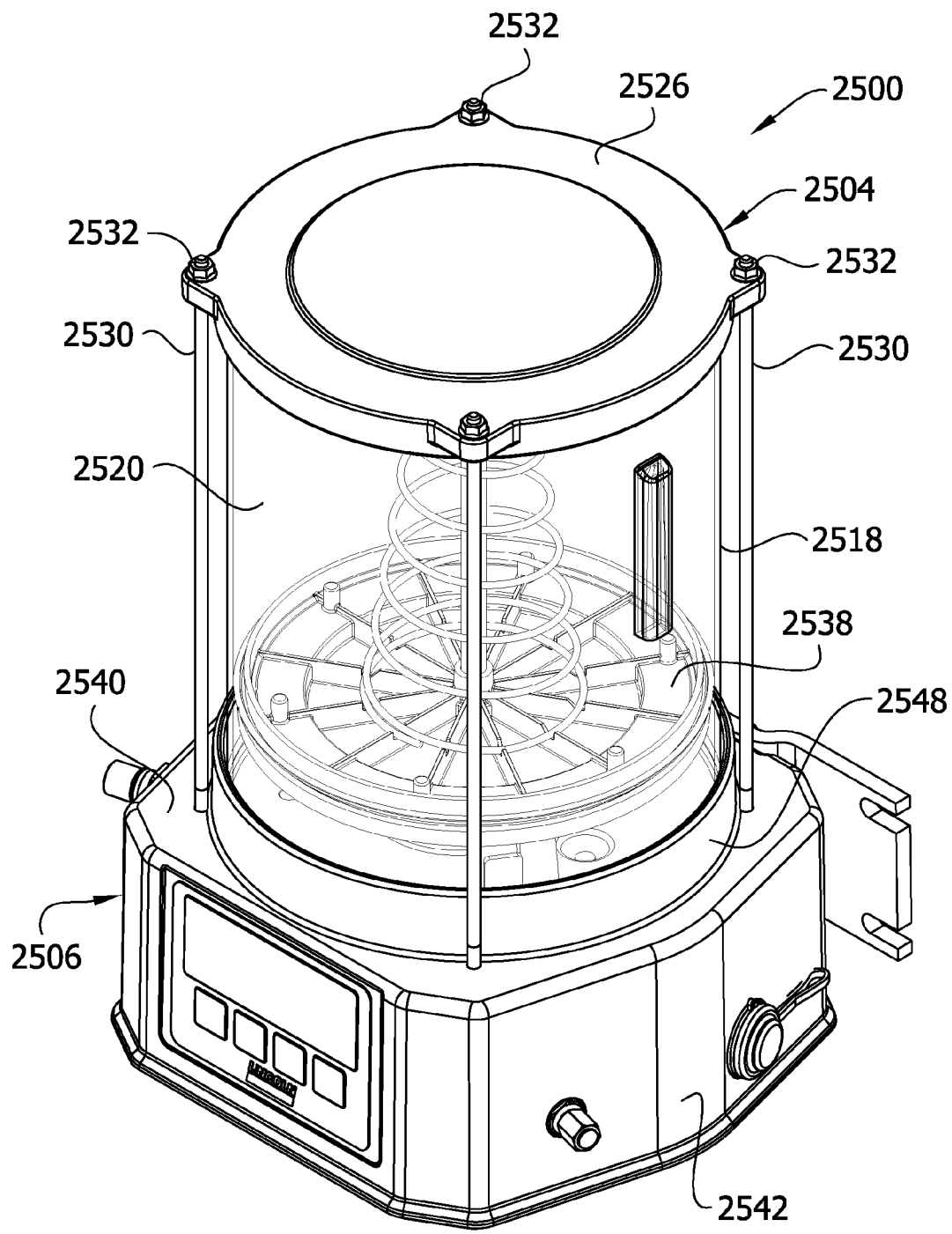
FIG. 38 is a perspective of another embodiment of a pump unit of this invention.
Figure 39:
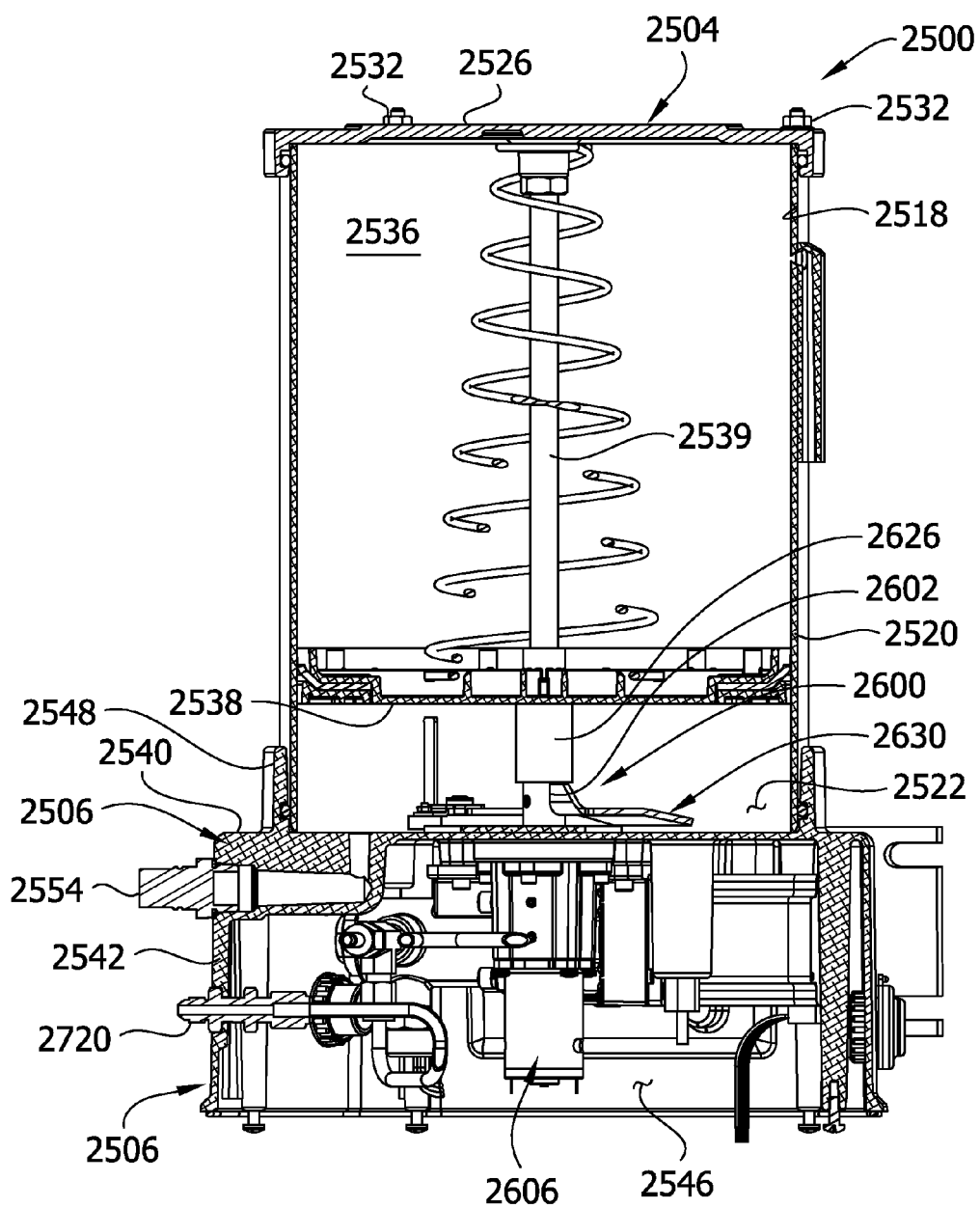
FIG. 39 is a vertical section taken through the pump unit of FIG. 38 illustrating a refill port for refilling a reservoir of the unit.
Figure 40:
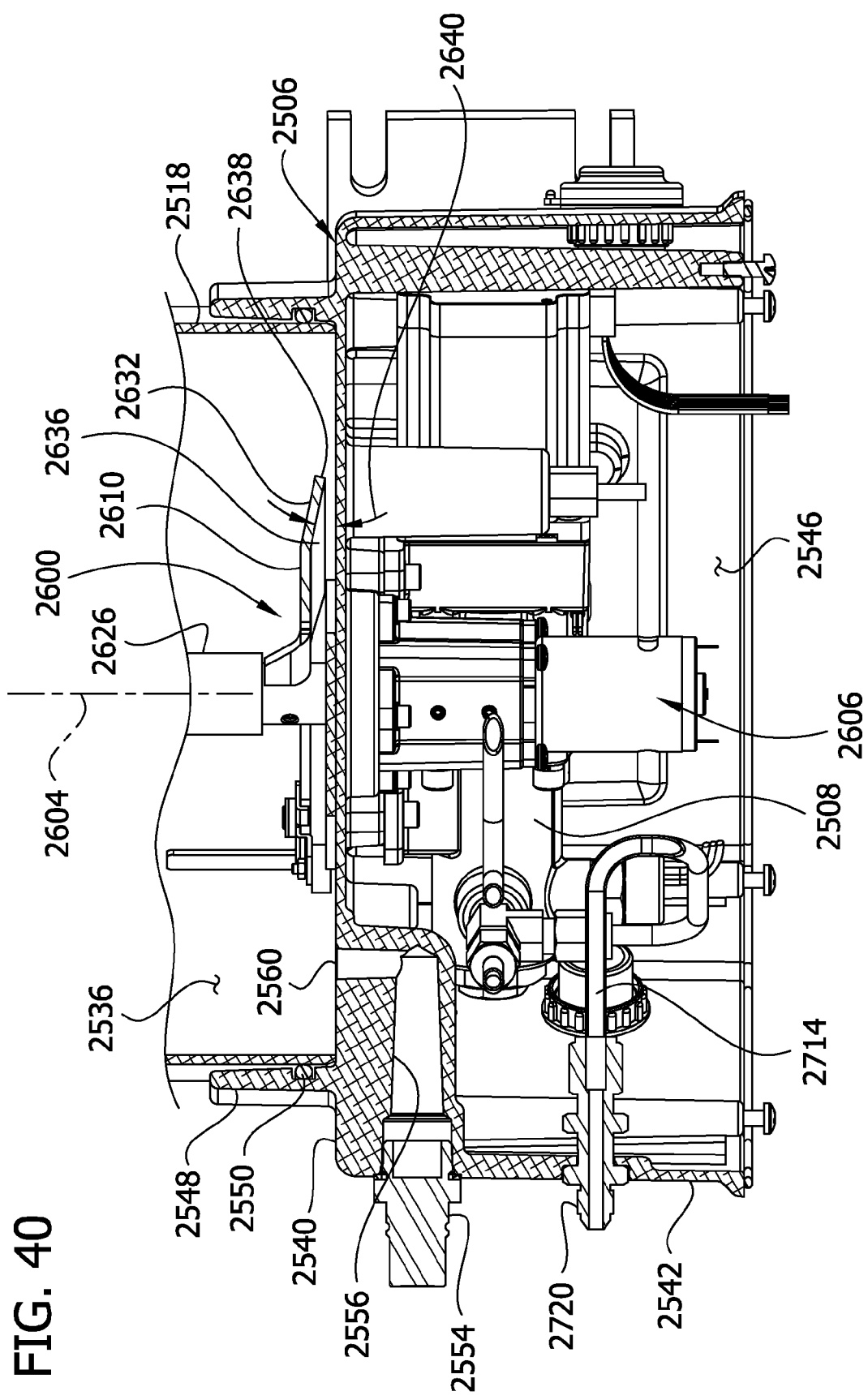
FIG. 40 is an enlarged portion of FIG. 39.

Referring to FIGS. 38 and 39, the reservoir 2504 comprises a tank 2518 having a side wall 2520, a removable top 2526, and no bottom wall. The lower end of the side wall 2520 rests on the pump housing 2506. A number of tie rods 2530 connect the cover 2526 to the pump housing 2506 and hold the tank in place on the housing. The cover 2526 can be removed by unthreading nuts 2532 on the tie rods 2530. The tank 2518 has an interior 2536 for holding a supply of lubricant (e.g., grease). A spring-loaded follower 2538 mounted on a central vertical shaft 1939 in the tank 2518 bears against the grease and wipes against the inside surface of the tank as the level of grease falls during operation of the pump unit 2500.

Referring to FIGS. 39 and 401, the pump housing 2506 comprises a top wall 2540, a side wall 2542 forming a skirt depending from the top wall, and bottom wall 2546. A collar 2548 extends up from the top wall 2540 and is sized for receiving the lower end of the reservoir tank 2518. A seal 2550 on the collar 2548 seals against the side wall 2520 of the tank to prevent leakage. A refill port 2554 is provided on the housing 2506 for refilling the tank 2518 with lubricant. A refill conduit 2556 connects the refill port 2554 to an outlet 2560 opening in the top wall 2540 of the housing. The outlet opening 2560 communicates with the interior 2536 of the tank 2518 for flow of lubricant into the tank to refill it. In a dual line system, the refill port 2554 is connected to the return line to provide access to the tank 2518 and to supply to the tank the lubricant provided by the return line.

Figure 41:
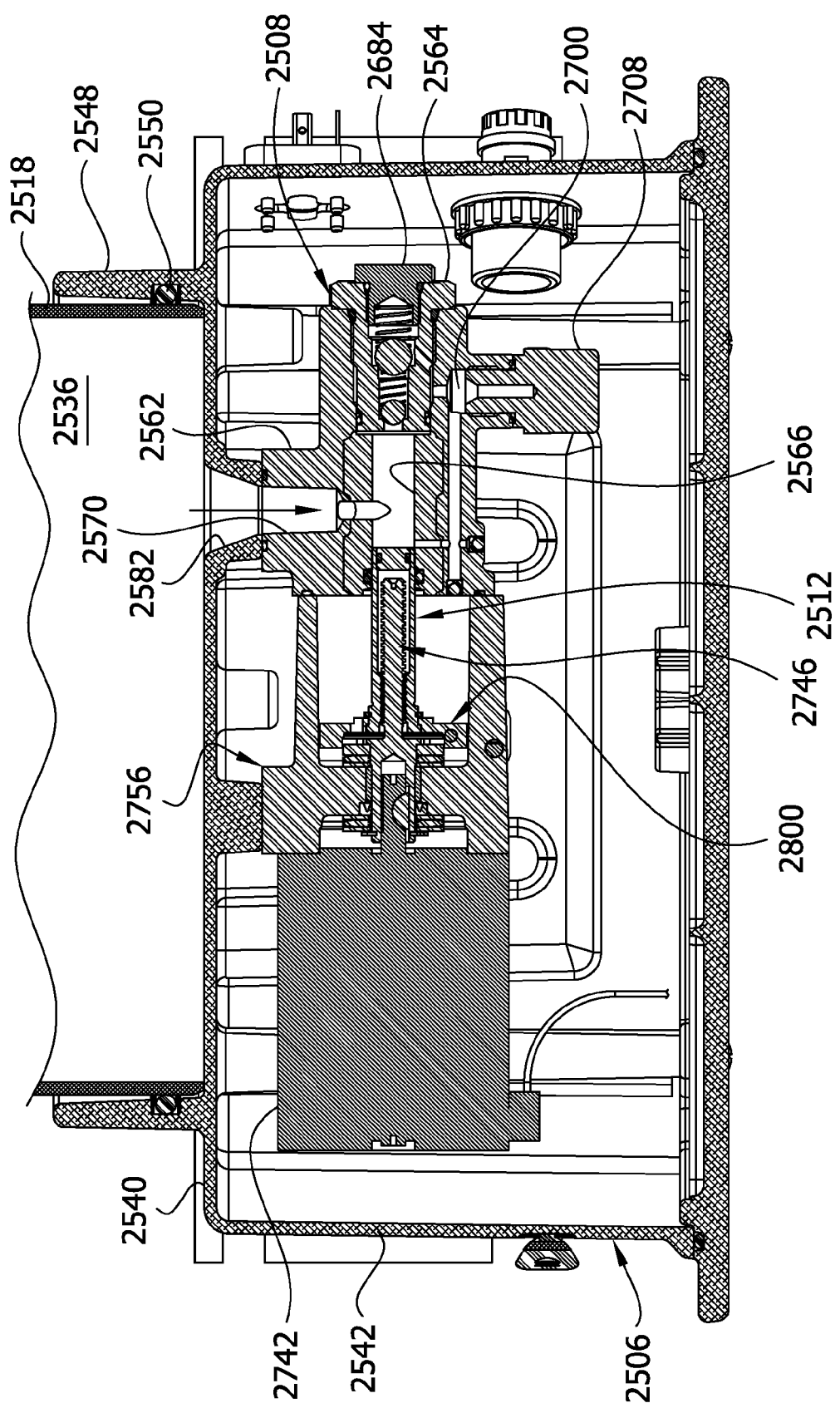
FIG. 41 is a vertical section taken through the pump unit of FIG. 38 illustrating a linear drive mechanism of the pump unit.
Figure 42:
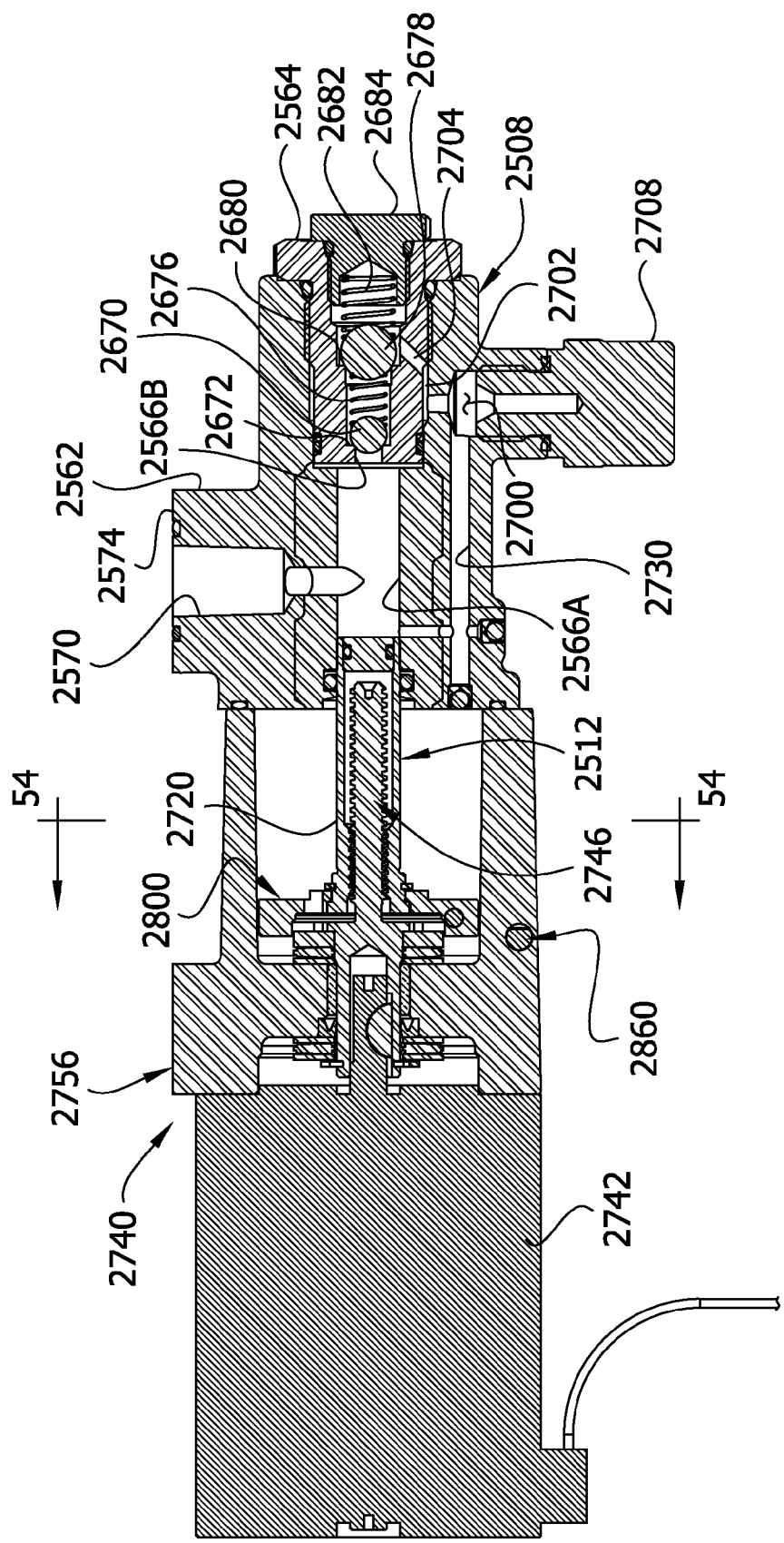
FIG. 42 is an enlarged portion of FIG. 39 illustrating the linear drive mechanism.

The pump cylinder 2508 is mounted in the pump housing 2506 immediately below the top wall 2540 of the housing. As shown in FIGS. 41 and 42, the pump cylinder comprises a cylinder body 2562 and a valve housing 2564 in threaded engagement with the cylinder body. The cylinder body 2562 is illustrated as being of two-piece construction, but it may comprise any number of parts. The cylinder body 2562 and valve housing 2564 have co-axial longitudinal bores indicated at 2566A and 2566B, respectively, forming a longitudinal cylinder bore 2566. The piston reciprocates in the bore 2566A which, in this embodiment, has a diameter D1. The bore 2566B in the valve housing 2564 has multiple diameters to accommodate various check valve components, as will be described later.

The cylinder body 2562 has an inlet comprising an inlet passage 2570 extending from a face 2572 of the body to the cylinder bore 2566. The face 2574 is in sealing engagement (via seal 2576 in FIG. 43) with an opposing face 2578 of the top wall 2548 of the pump housing 2506. The top wall 2548 of the pump housing has an opening 2582 aligned with the inlet passage 2570 to form a defined tunnel-like flow path 2586 from the interior 2536 of the tank 2518 to the cylinder bore 2566. The flow path 2586 is closed along its entire length from the interior of the tank 2536 to the cylinder bore 2566. Desirably, the flow path 2586 is a generally straight-line path which extends generally vertically from an upper end of the flow path to a lower end of the flow path. Also desirably, the total length of the defined flow path 2586 is relatively short (e.g., less than four inches; preferably less than three inches, and even more preferably less than two inches).

Figure 43:
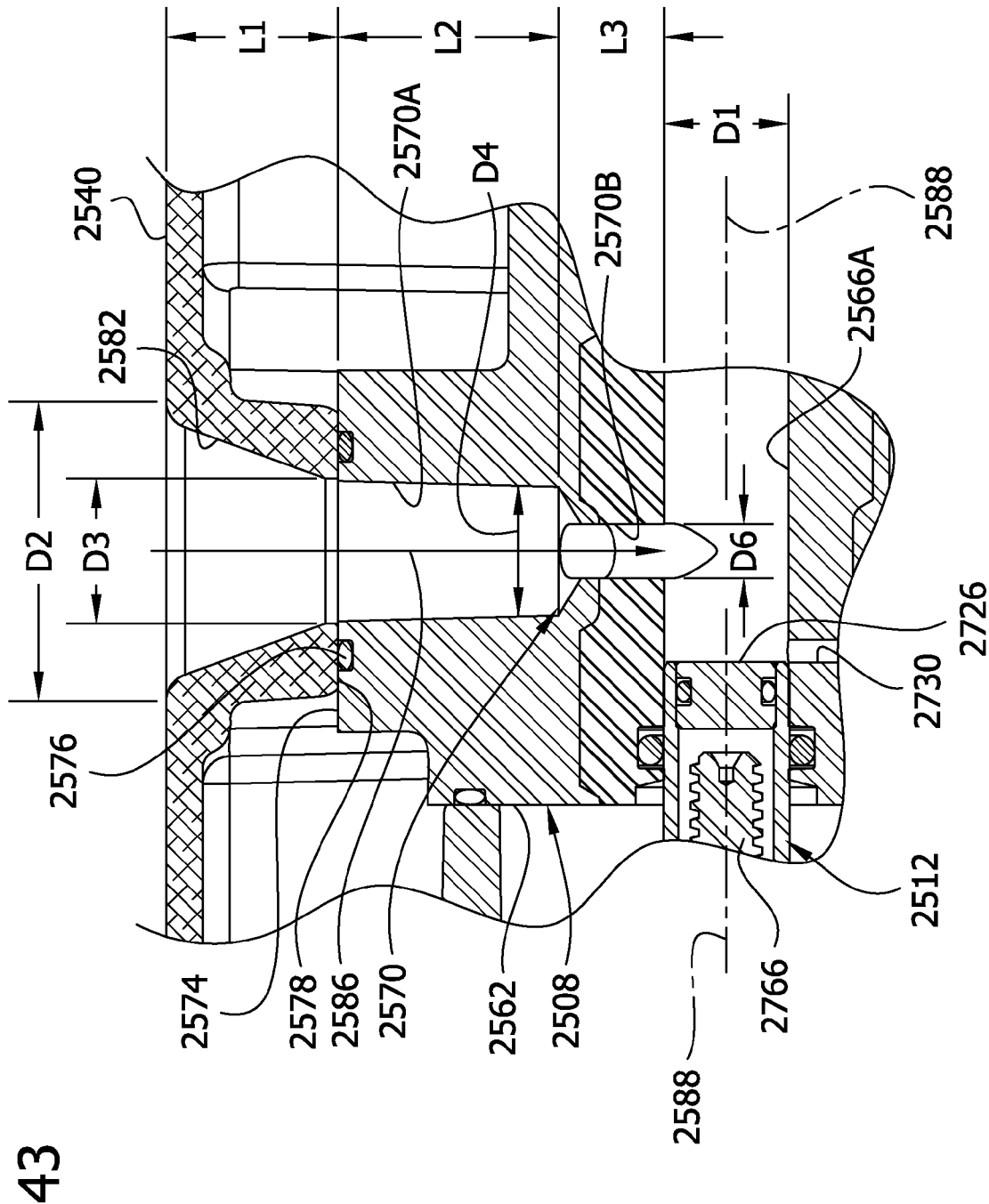
FIG. 43 is an enlarged portion of FIG. 41 showing a cylinder inlet of the drive mechanism.

Referring to FIG. 43, the opening 2582 in the top wall 2548 of the pump housing 2506 is generally conical and defines an outlet of a tank 2518. The opening 2582 has a large-diameter upper end to facilitate flow of lubricant from the tank 2518 into the opening and a smaller-diameter lower end. The tapered opening 2582 funnels lubricant into the inlet passage 2570 of the cylinder 2508. The opening 2582 has an upper end diameter D2, a lower end diameter D3, and an axial length L1.

The cylinder inlet passage 2570 has an upper portion 2570A that is substantially cylindrical (with a small taper to facilitate manufacture) and co-axial with the opening 2582 in the top wall 2548 of the housing 2506. The upper portion 2570A has a diameter D4 and an axial length L2. The inlet passage 2570 also has a lower portion 2570B that is oblong (e.g., racetrack) as viewed in horizontal cross-section (see FIGS. 44 and 45). The oblong portion 2570B has a major dimension D5 taken generally transverse to the longitudinal centerline 2588 of the cylinder bore that is about equal to the full diameter D1 of the cylinder bore 2566 at the juncture of the inlet passage 2570 and the cylinder bore, a shorter minor dimension D6 generally parallel to the longitudinal centerline of the cylinder bore that is less than the full diameter of the cylinder bore 2566A, and a length L3. The oblong configuration maximizes the area of flow into the cylinder bore 2566 and reduces the effective length of the piston power stroke, i.e., the segment of the power stroke after the piston 2512 has moved past the cylinder inlet passage 2570 and blocked communication between the cylinder bore 2566 and the inlet passage. As a result, the pump unit 2500 has a more compact design while still pumping a relatively large volume of lubricant (e.g., at least 1.5 cubic centimeters) per pumping stroke of the piston.

Exemplary dimensions are given below. They are exemplary only.

D1—0.435 in.
D2—1.033 in.
D3—0.500 in.
D4—0.440 in.
D5—0.435 in.
D6—0.187 in.
L1—0.590 in.
L2—0.840 in.
L3—1.125 in.
L4—0.425 in. (slot interior).

The defined flow path 2586 may have other configurations in which the path is formed by a tunnel-like passage having an open upper end for entry of lubricant from the interior 2536 of the tank 2518 directly into the passage, and an open lower end for exit of lubricant from the passage directly into the cylinder bore 2566. The defined flow path can be formed by any number of separate passage-forming members (e.g., the top wall 2548 of the pump housing 2506 and the cylinder body 2562) having aligned openings that combine to form a closed tunnel-like passage that is closed except at one end for entry of lubricant from the interior of the tank directly into the passage and at an opposite end for exit of lubricant from the passage directly into the cylinder bore 2566.

Figure 45:
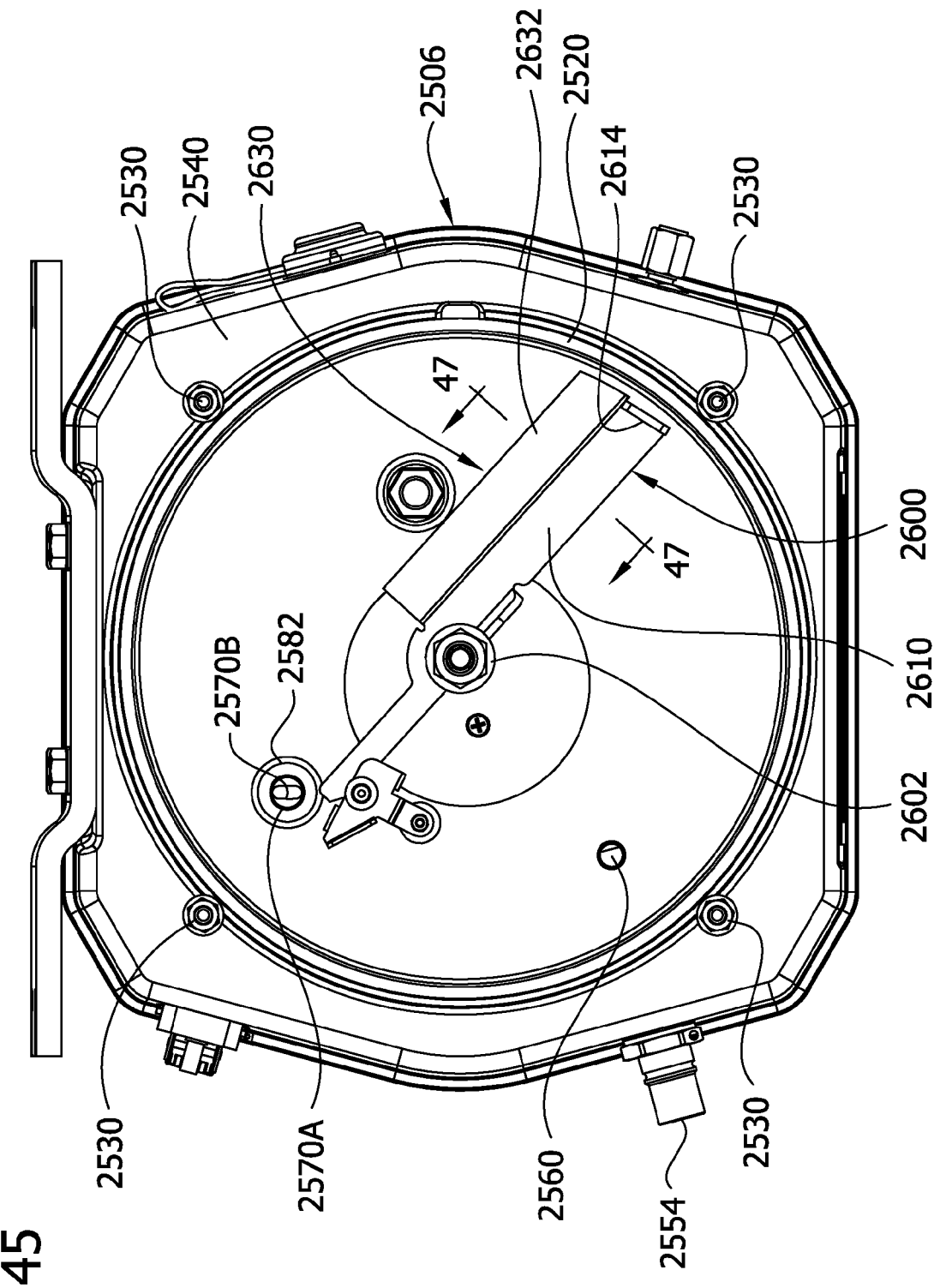
FIG. 45 is a plan of a stirring mechanism of the pump unit.
Figure 46:
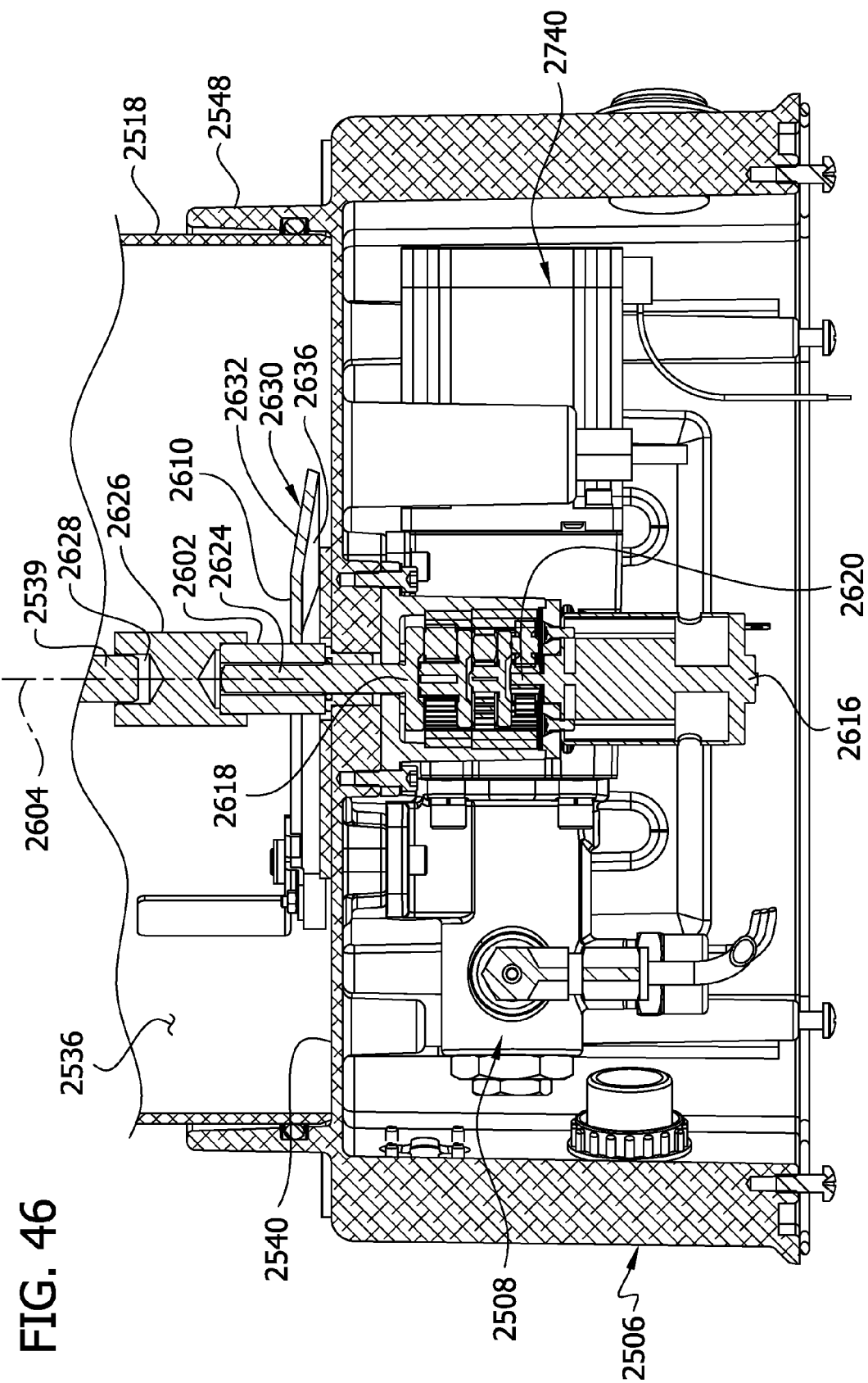
FIG. 46 is a vertical section taken through the drive motor and related components of the stirrer.
Figure 47:
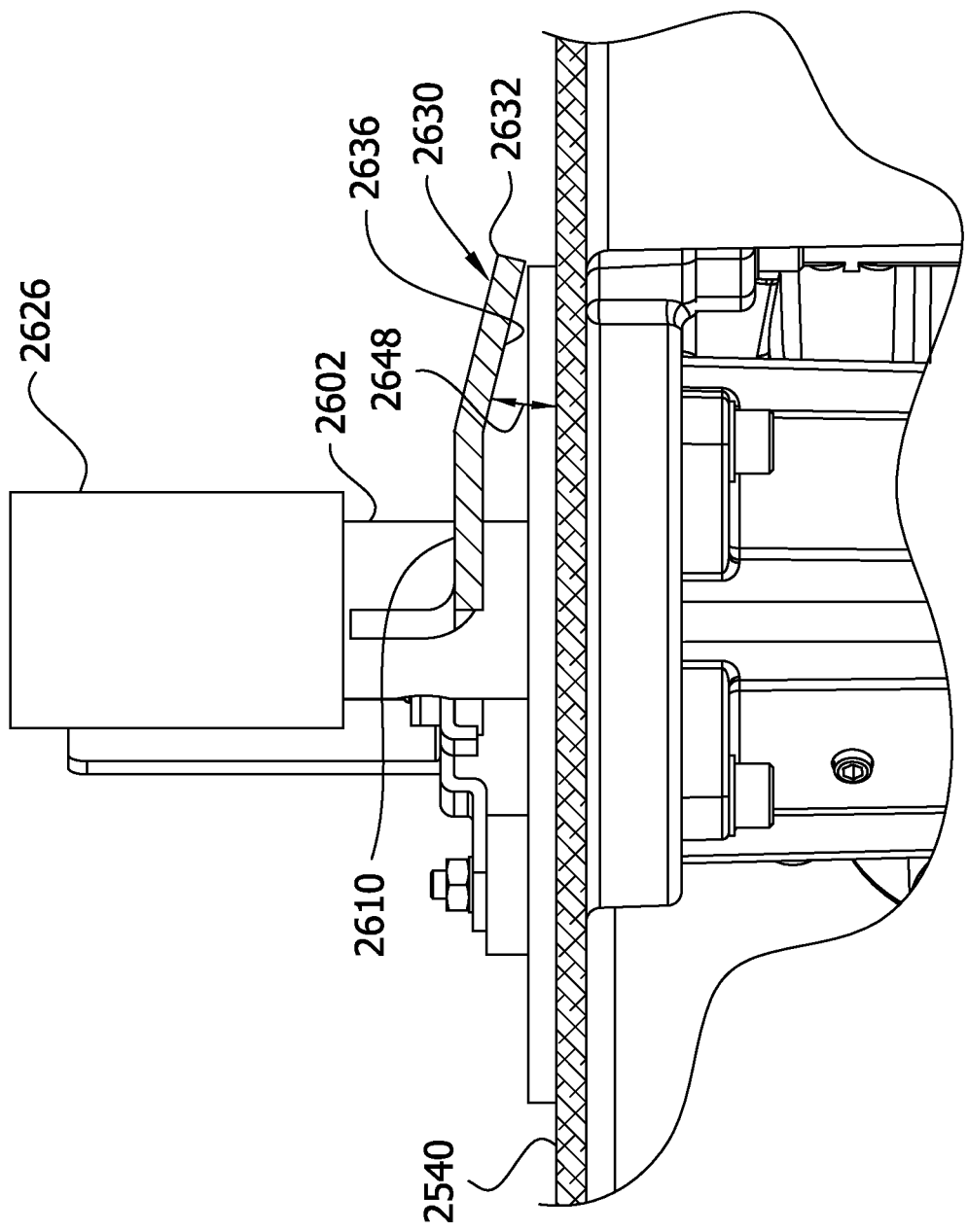
FIG. 47 is an enlarged vertical section taken in the plane of 47-47 of FIG. 45, illustrating a force-feed mechanism on the stirrer.
Figure 48:
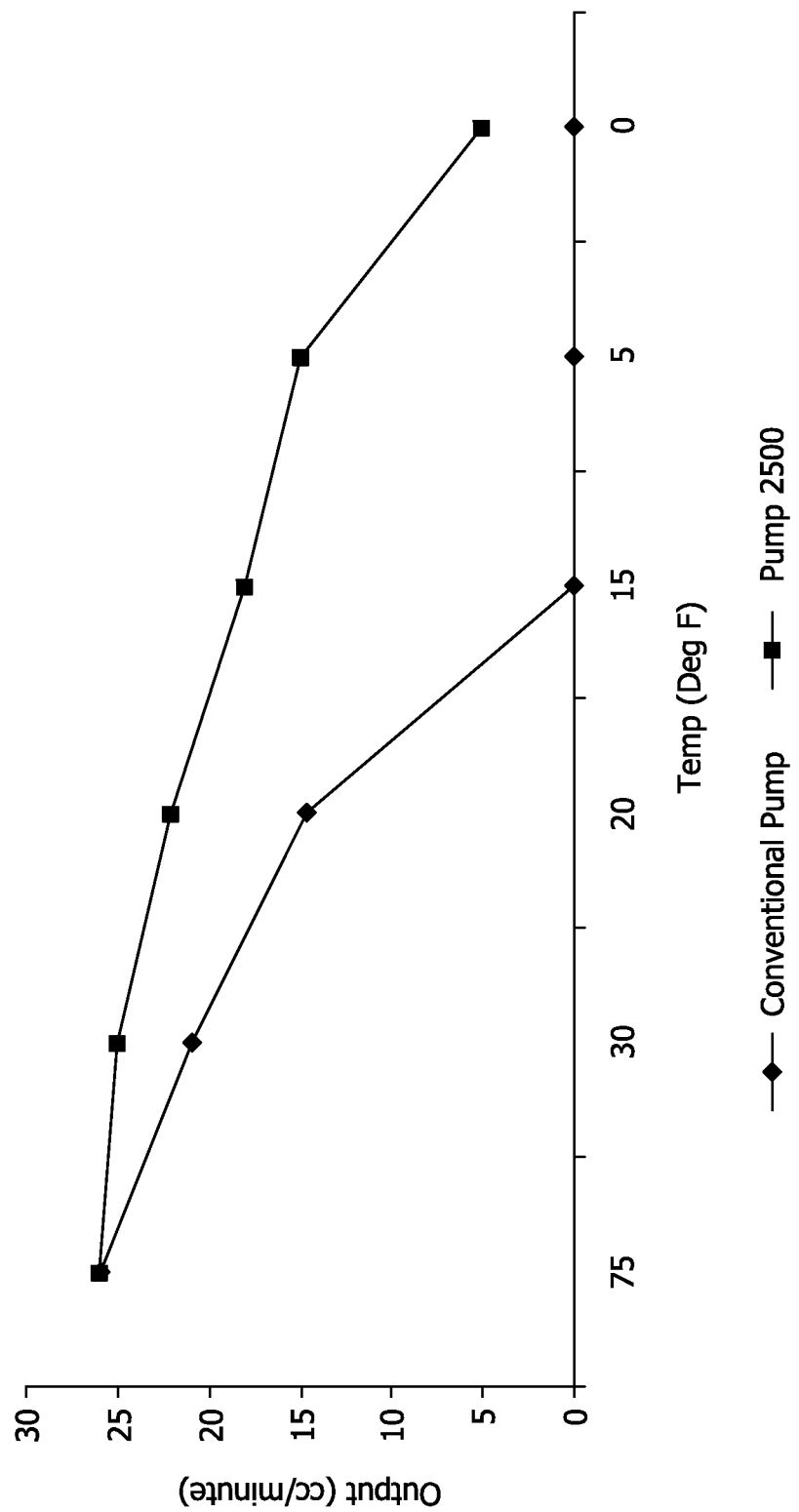
FIG. 48 is a graph comparing the results of tests conducted using a state-of-the art pump and a pump unit of this invention.

Referring to FIGS. 45-47, a stirrer, generally designated 2600, is provided for stirring lubricant in the tank 2518. The stirrer 2600 comprises a rotary hub 2602 rotatable about a vertical axis 2604 by a first drive mechanism 2606 in the pump housing 2506. An arm 2610 extends generally horizontally outward in a radial direction from the hub 2602 adjacent the bottom of the tank 2518. An upstanding stirring member 2614 at the outer end of the arm 2610 extends up alongside the cylindrical side wall 2520 of the tank 2518. Rotation of the stirrer 2600 fluidizes lubricant in the tank and breaks up any air bubbles that may be in the lubricant to minimize the risk that the pump unit 2500 will lose its prime.

Referring to FIG. 46, the stirrer drive mechanism 2606 comprises an electric motor 2616 and a transmission 2618 connecting the output shaft 2620 of the motor to the hub 2602 of the stirrer 2600. Rotation of the output shaft 2620 acts through the transmission 2618 to rotate the stirrer 2600 about the vertical axis 2604 at a suitable speed (e.g., 40-60 rpm.) The stirrer hub 2602 is affixed to an output 2624 shaft of the transmission by suitable means (e.g., a setscrew) so that the hub rotates in unison with the output shaft. A spacer 2626 at the upper end of the stirrer hub 2602 supports the lower end of the follower shaft 2539. The spacer 2626 is affixed to the stirrer hub by suitable means (e.g., a setscrew) so that it rotates in unison with the stirrer hub. The lower end of the follower shaft 2539 is received in an opening 2628 in the upper end of the spacer 2626 and remains stationary as the spacer rotates with the hub 2602.

The stirrer 2600 includes a force-feed mechanism 2630 operable on rotation of the stirrer to force lubricant under pressure from the tank through the tank outlet, i.e., through opening 2582. As illustrated in FIGS. 46 and 47, the force-feed mechanism 2630 comprises a force-feed member 2632 on the arm 2610 of the stirrer. The force-feed member 2632 extends along the arm and has a downwardly inclined lower surface 2636 that lies in a plane oriented an angle 2648 relative to the top wall 2540 of the forming, in essence, the bottom of the reservoir. The force-feed member 2632 terminates at a lower end 2638 spaced a relatively small distance (e.g., 0.16 in.) above the wall 2540. Rotation of the stirrer 2600 causes the angled force-feed member 2632 to move through the lubricant and to generate a pushing force tending to push lubricant down through the opening 2582 in the top wall 2540 of the pump housing 2506 and along the defined flow path 2570 to the cylinder bore 2566.

The downward pushing force exerted on the lubricant by the force-feed mechanism 2630 is complemented by a pulling force exerted on the lubricant by the piston 2512 of the pump as it moves through a return stroke. It will be understood in this regard that movement of the piston 2512 through a return stroke generates a reduced pressure in the cylinder bore 2566 that tends to pull lubricant down along the flow path 2570 toward the cylinder bore. Desirably, the controller of the pump unit 2500 is programmed to operate the stirrer 2600 and the piston 2512 simultaneously so that the pushing and pulling forces act simultaneously (in concert) to move lubricant along the defined flow path 2570 into the cylinder bore 2566. When combined, these forces are able to move lubricant more forcefully from the reservoir to the cylinder bore. Further, these forces are maximized because the flow path 2570 from the interior of the tank 2536 to the cylinder bore 2566 is closed to atmosphere along its entire length. As a result, the pump unit 2500 is able to pump more viscous lubricants at lower temperatures than conventional pump units.

The benefit of the push-pull arrangement described above is illustrated in the graph of FIG. 48 comparing the results of tests conducted using a state-of-the art pump sold by Lincoln Industrial (model 653) and a pump unit having the configuration of pump unit 2500 described above. The lubricant used in the test was a Lithium Moly NLGI 2 Grade grease having a yield stress of 800 psi as measured using the ventmeter test described above and in U.S. Pat. No. 7,980,118 incorporated by reference herein. (The National Lubrication Grease Institute (NLGI) defines standard designations for grease stiffness.) As shown by the graph, the "push/pull" forces exerted by the pump unit of our new design is capable of pumping grease at substantially lower temperatures (at least 15 degrees lower) than the state-of-the art design.

Referring to FIG. 42, a first ball check valve 2670 is mounted in the valve housing 2564 for movement in bore 2566B between a closed position in which it engages a first valve seat 2672 on the housing to block flow through the cylinder bore 2566 during a return stroke of the piston 2512 and an open position in which it allows flow through the bore during a pumping stroke of the piston. A first coil compression spring 2676 reacting at one end against the ball valve 2670 urges the ball valve toward its closed position. The opposite end of the spring 2676 reacts against a second ball check valve 2678 downstream from the first ball valve 2670. The second ball valve 2678 is mounted in the valve housing 2564 for movement in bore 2566B between a closed position in which it engages a second valve seat 2680 on the housing to block flow through the cylinder bore 2566 during a return stroke of the piston 2512 and an open position in which it allows flow through the bore during a pumping stroke of the piston. A second coil compression spring 2682 reacting at one end against the second ball valve 2678 urges the ball valve toward its closed position. The opposite end of the spring 2682 reacts against a plug 2684 threaded into the downstream end of the bore 2566B. The use of two check valves 2670, 2678 instead of only one check valve (as in the first embodiment described above) reduces the risk of back flow of lubricant into the inlet part 2508A of the cylinder during a return stroke of the piston.

Figure 49:
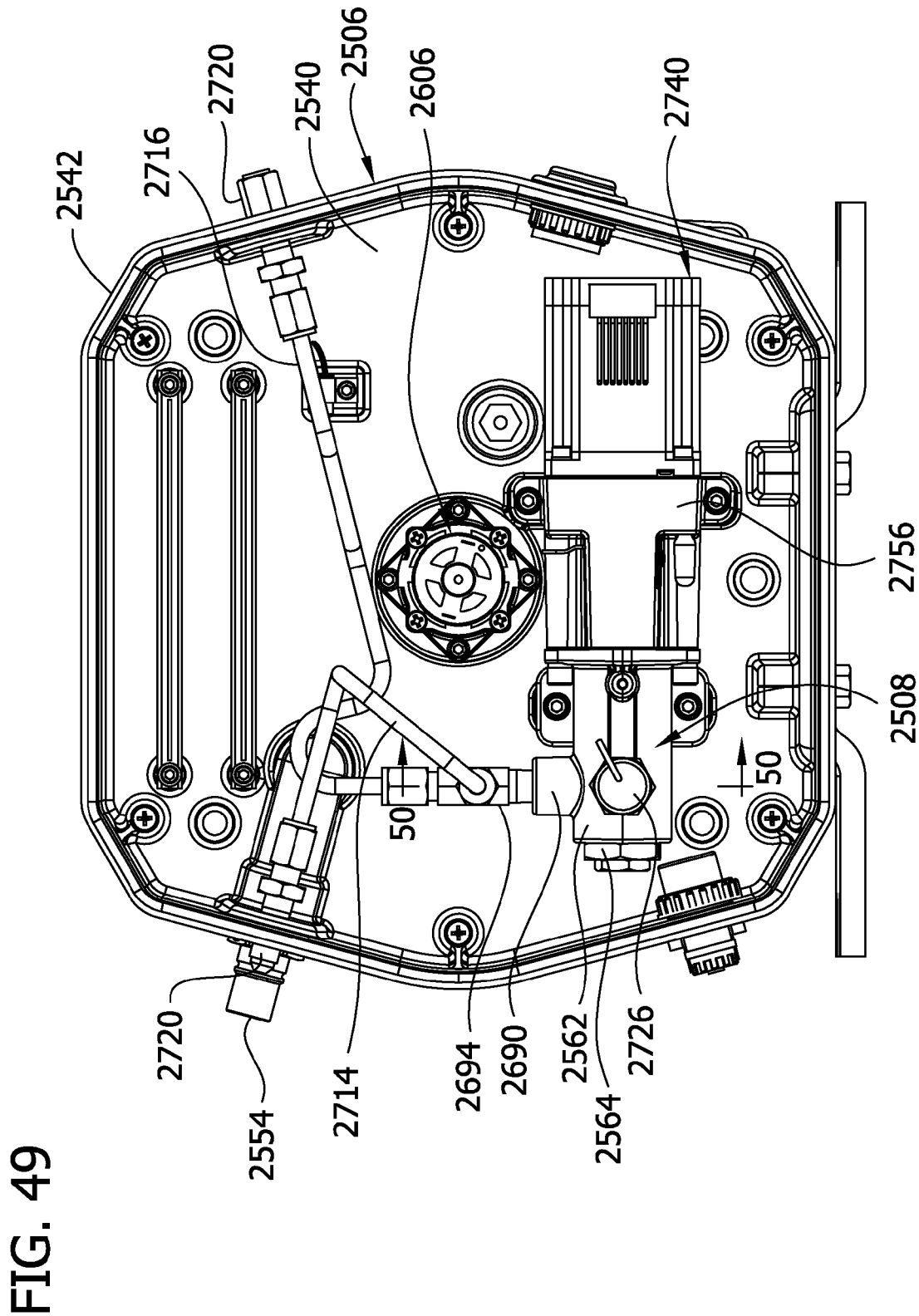
FIG. 49 is a bottom plan of the pump unit of FIG. 38.
Figure 50:
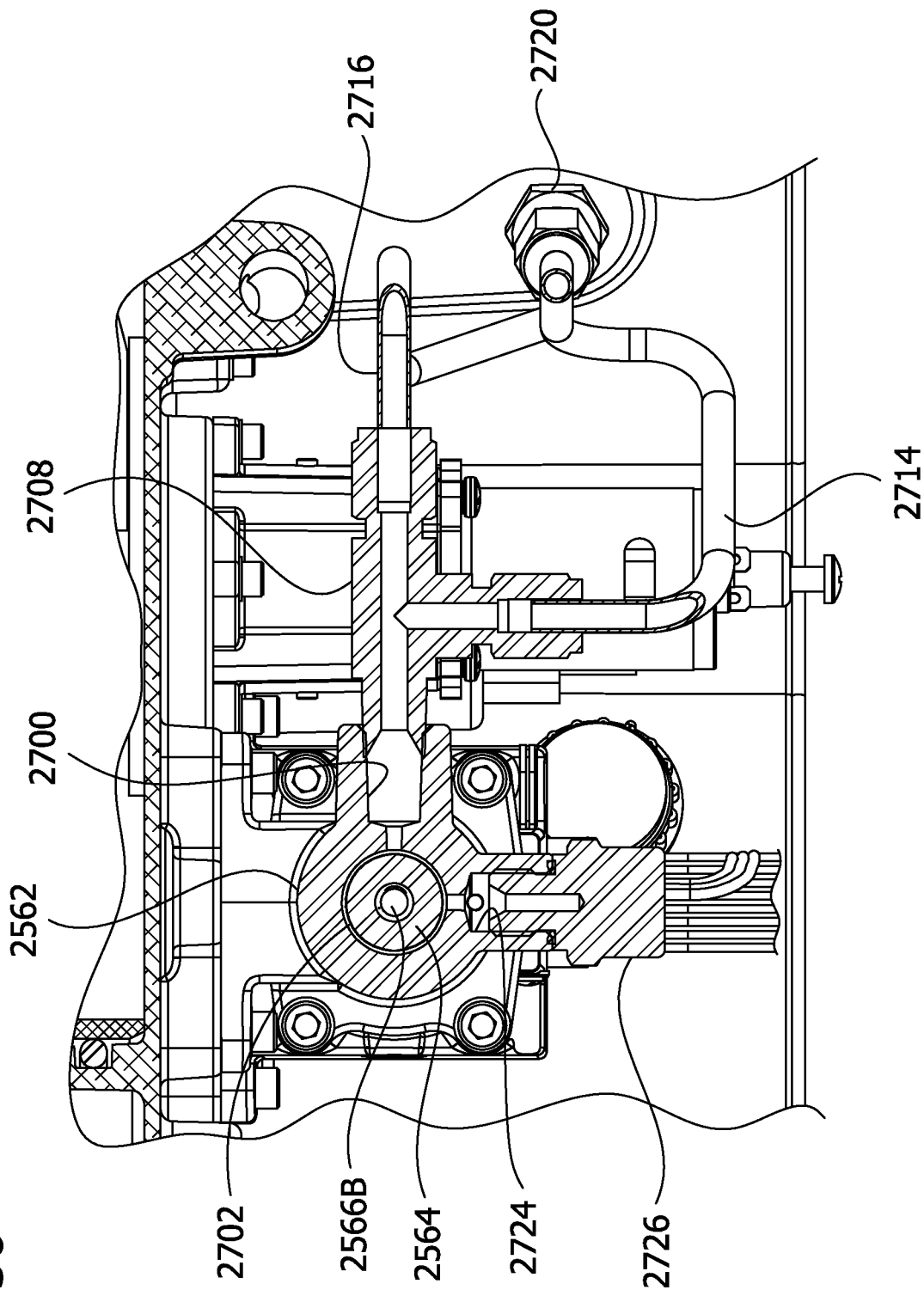
FIG. 50 is an enlarged vertical section taken in the plane of 50-50 of FIG. 49.

Referring to FIGS. 49 and 50, the pump cylinder 2508 has an outlet comprising an outlet port 2700 in the cylinder body 2562. The outlet port 2700 communicates with the cylinder bore 2566 via an annular gap 2702 located between the valve housing 2564 and the cylinder body 2562 and via a connecting passage 2704 extending between the annular gap and the bore 2566B in the valve housing at a location downstream from the second ball check valve seat 2680. A lubricant outlet fitting 2708 is threaded into the outlet port 2702. In the illustrated embodiment, the outlet fitting 2708 a T-fitting for flow of lubricant to a first feed line 2714 attached to the pump housing 2506 at one location and to a second feed line 2716 attached to the pump housing at a second location spaced around the housing from the first location. The outlet end of each feed line 2714, 2716 is equipped with a self-sealing quick connect/disconnect connector 2720 to facilitate connection of the feed line to a lube supply line supplying lubricant to a distribution system of one kind of another. In general, only one of the two feed lines is used for any given distribution system, the feed line selected for use being the most suitable configuration for conditions in the field. However, both feed lines may be used in some installations.

Again referring to FIGS. 49 and 50, the cylinder body 2562A also has a sensor port 2724 that communicates with the bore 2566B by means of the annular gap 2702 and the connecting passage 2704. A pressure sensor 2726 threaded in the sensor port senses the pressure at the outlet end of the cylinder bore 2566.

As shown in FIG. 42, a vent passage 2730 in the cylinder body 2562 provides fluid communication between a first location in the longitudinal cylinder bore 2566A upstream from the first check valve seat 2672 and a second location in the longitudinal cylinder bore 2566B downstream from the second check valve seat 2680. The downstream end of the vent passage 2730 communicates with the second location via the outlet port 2700, the annular gap 2702, and the connecting passage 2704. The purpose of the vent passage 2730 is identical to the vent passage 376 described in the first embodiment. Other vent passage configurations are possible.

Referring to FIGS. 51-54, the piston 2512 of the pump unit 2500 comprises a hollow cylindrical piston body 2720 having a front (right) end and a back (left) end. The body 2720 has internal threads 2722 extending from generally adjacent the back of the body toward the front end of the body but desirably terminating well short of the front end. The front end of the piston body 1222 is closed by a piston head 2726 with a circumferential seal 2728 that seals against the inside surface of the body.

The piston 2512 is movable in a reciprocating manner in the cylinder bore 2566 by a second drive mechanism, generally designated 2740. In the embodiment of FIGS. 51-54, the drive mechanism 2740 is a linear position drive mechanism comprising a stepper motor 2742 having an output shaft 2744 connected to a co-axial lead screw 2746 rotatable in a sleeve bearing 2750 in an end wall 2752 of a follower housing 2756. The lead screw 2746 comprises a lead screw body 2760 having a blind bore 2762 that receives the output shaft 2744 of the stepper motor 2742, and a threaded shaft 2766 extending forward from the body. The shaft 2766 has external threads 2768 configured to mate with the internal threads 2722 of the piston body 2720. The stepper motor output shaft 2744 is keyed at 2770 to the body 2760 of the lead screw so that the shaft and lead screw turn in unison. Desirably, the mating threads on the piston and lead screw are constructed for the efficient transmission of power. By way of example, the threads 2722, 2768 may be full ACME threads capable of carrying a substantial load for pumping lubricant at high pressures.

Thrust loads exerted on the piston 2512 and lead screw 2746 are carried by first and second thrust bearings 2774, 2776 on opposite sides of the end wall 2752 of the follower housing 2756. The first thrust bearing 2774 supports axial loads in the rearward direction (i.e., toward the left as viewed in FIG. 51) during a pumping stroke of the piston 2512 as it moves forward in the cylinder bore 2566A. The thrust bearing 2774 comprises a needle bearing 2780 and two bearing races 2782 held captive between the follower housing end wall 2752 and a peripheral radial flange 2784 on the lead screw body 2760. The second thrust bearing 2776 supports axial loads in the forward direction (i.e., toward the right as viewed in FIG. 51) during a return stroke of the 2512 piston as it moves rearward in the cylinder bore 2566A. The thrust bearing 2776 comprises a needle bearing 2786 and two bearing races 2788 held captive between the follower housing end wall 2752 and a retaining ring 2790 on the lead screw. A seal 2792 in a counterbore in the follower end wall 2752 immediately forward of the second thrust bearing 2776 seals against the lead screw body 2760 to prevent leakage.

A follower 2800 is secured to the piston 2512 for back and forth linear (non-rotational) movement of the follower and piston in a cavity 2802 in the follower housing 2756. The cavity 2802 extends forward from the end wall 2752 of the housing 2756, located generally adjacent the back end of the housing, to the front end of the follower housing. In this embodiment, the longitudinal centerline of the cavity 2802 is generally co-axial with the longitudinal centerlines of the piston 2512 and lead screw 2746. The front end of the follower housing 2750 seals against the back end of the cylinder body 2562 such that the longitudinal centerline of the cavity 2802 is generally co-axial with the longitudinal centerline of the cylinder bore 2566 and such that the piston 2512 extends from the follower cavity into the cylinder bore for reciprocation in the cylinder bore 2566A.

Figure 53:
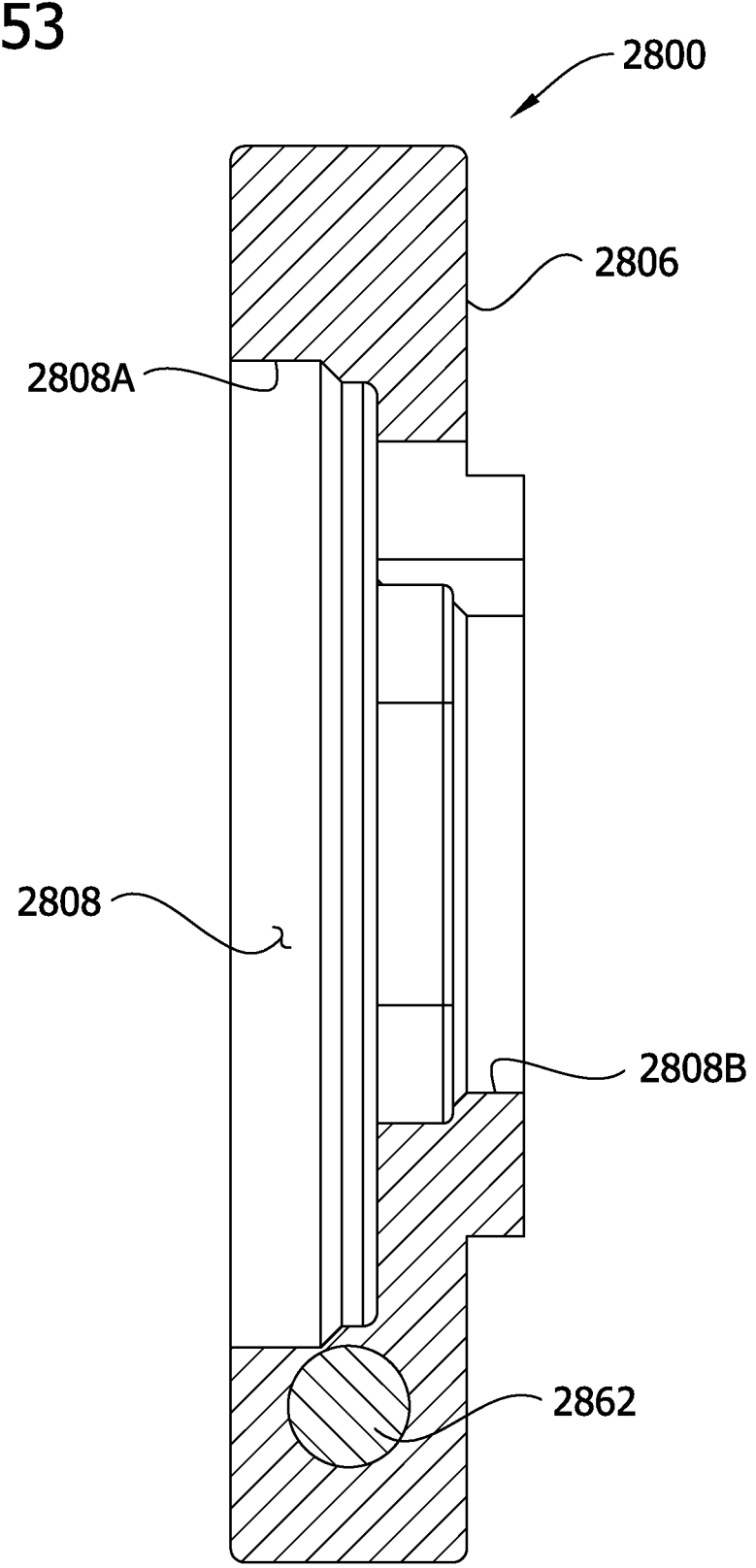
FIG. 53 is a sectional view of the follower.

As illustrated in FIG. 53, the follower 2800 comprises a circular follower body 2806 having a central bore 2808 with a larger-diameter rear portion 2808A that receives the peripheral flange 2784 on the lead screw body 2760 and part of the first thrust bearing 2774, and a smaller-diameter forward portion 2808B that receives a back end portion of the piston body 2720. The smaller-diameter portion 2808B of the follower bore 2808 and the back end portion of the piston body 2720 are non-circular in shape (e.g., rectangular) to prevent relative rotational movement between the piston and the follower. Relative axial movement between the two parts is prevented by an inward-projecting peripheral flange 2812 on the follower body 2806 held captive between an outward-projecting peripheral flange 2814 on the piston body and a retaining clip 2820 on the piston body. Other constructions are possible to prevent relative rotation and linear movement between the piston 2512 and follower 2800.

Figure 54:
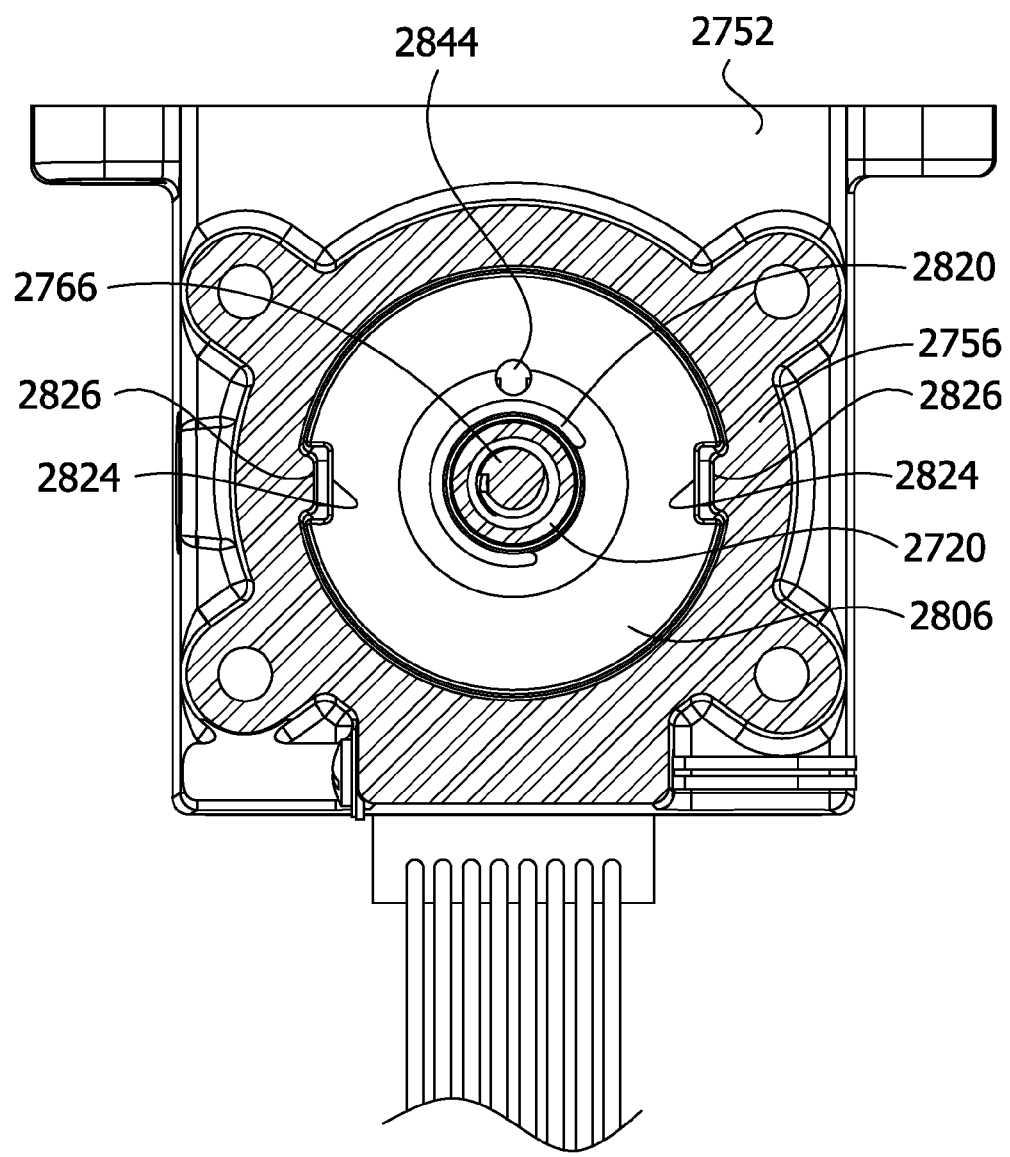
FIG. 54 is a vertical section taken in the plane of 54-54 of FIG. 42.

As illustrated in FIG. 54, the follower body 2806 has notches 2824 for receiving stationary linear guides defined by rails 2826 on the inside of the follower housing 2756. The rails 2826 extend in a direction generally parallel to the longitudinal cylinder bore 2566 and hold the follower 2800 (and piston 2512) against rotation as the lead screw 2746 is rotated by the stepper motor 2742. As a result, rotation of the motor output shaft 2744 and lead screw 2746 in one direction causes the piston 2512 to move linearly in the cylinder bore 2566A through a pumping stroke, and rotation of the output shaft 2744 and lead screw 2746 in the opposite direction causes the piston to move linearly in the cylinder bore through a return stroke. The lengths of the pumping and return strokes are controlled by operation of the stepper motor 2742 under control of the controller.

Desirably, the cavity 2802 functions as a reservoir for holding a lubricant (e.g., oil) suitable for lubricating the threads 2722, 2768 on the lead screw 2746 and the piston 2512. Further, an oil-delivery mechanism is provided for delivering oil from the reservoir to the threads. In the illustrated embodiment, the oil-delivery mechanism comprises a portion of the lead screw 2746 comprising the flange 2784 on the lead screw body 2760. The flange 2784 is sized for immersion in the oil in the reservoir 2802. As the screw 2746 rotates, the flange 2784 carries oil up from the reservoir to a location above the lead screw, where the oil flows down a front face of the flange 2784 through a gap 2830 between the flange and the back end of the piston body 2720 for delivery to the threads on the threaded shaft of the lead screw. Notches 2834 are provided in the peripheral edge of the flange 2784 to increase the amount of fluid carried by the flange. In this embodiment, two diametrically opposed, generally U-shaped notches 2834 are provided, but the number and shape of the notches may vary. Other oil-delivery mechanisms can be used.

An oil-return mechanism is provided for allowing excess oil delivered to the mating threads 2722, 2766 on the piston body 2720 and lead screw shaft 2766 to return to the reservoir 2802. In the illustrated embodiment, the oil-return mechanism comprises an axial groove 2840 extending along the exterior of the threaded shaft 2766 of the lead screw. Any excess oil on the shaft 2766 moves along the groove 2840 for delivery back to the reservoir 2802 through the gap 2830 between the front face of the lead screw flange 2784 (at the front of the lead screw body 2760) and the back end of the piston body 2720. A passage 2844 extending longitudinally through the follower body 2806 allows lubricant in the reservoir 2802 to flow past the follower 2800 as the follower and piston move back and forth in the cavity.

Figure 44:
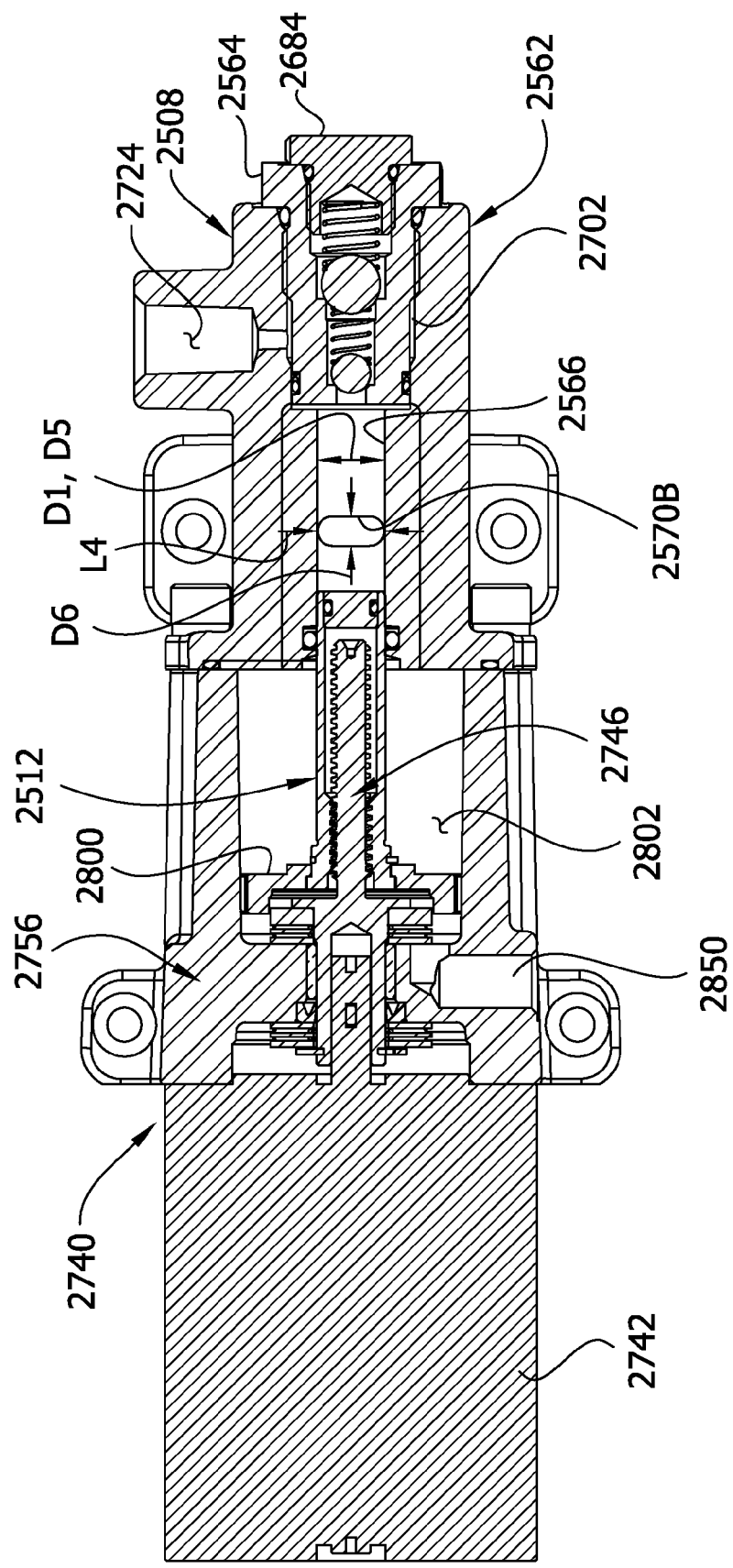
FIG. 44 is a view similar to FIG. 42 but rotated 90 degrees to illustrate an oblong portion of the cylinder inlet.

Referring to FIG. 44, the follower housing 2756 has an inlet passage 2850 for flow of oil from a suitable supply into the cavity. The inlet passage can also be used to drain oil from the cavity.

Figure 51:
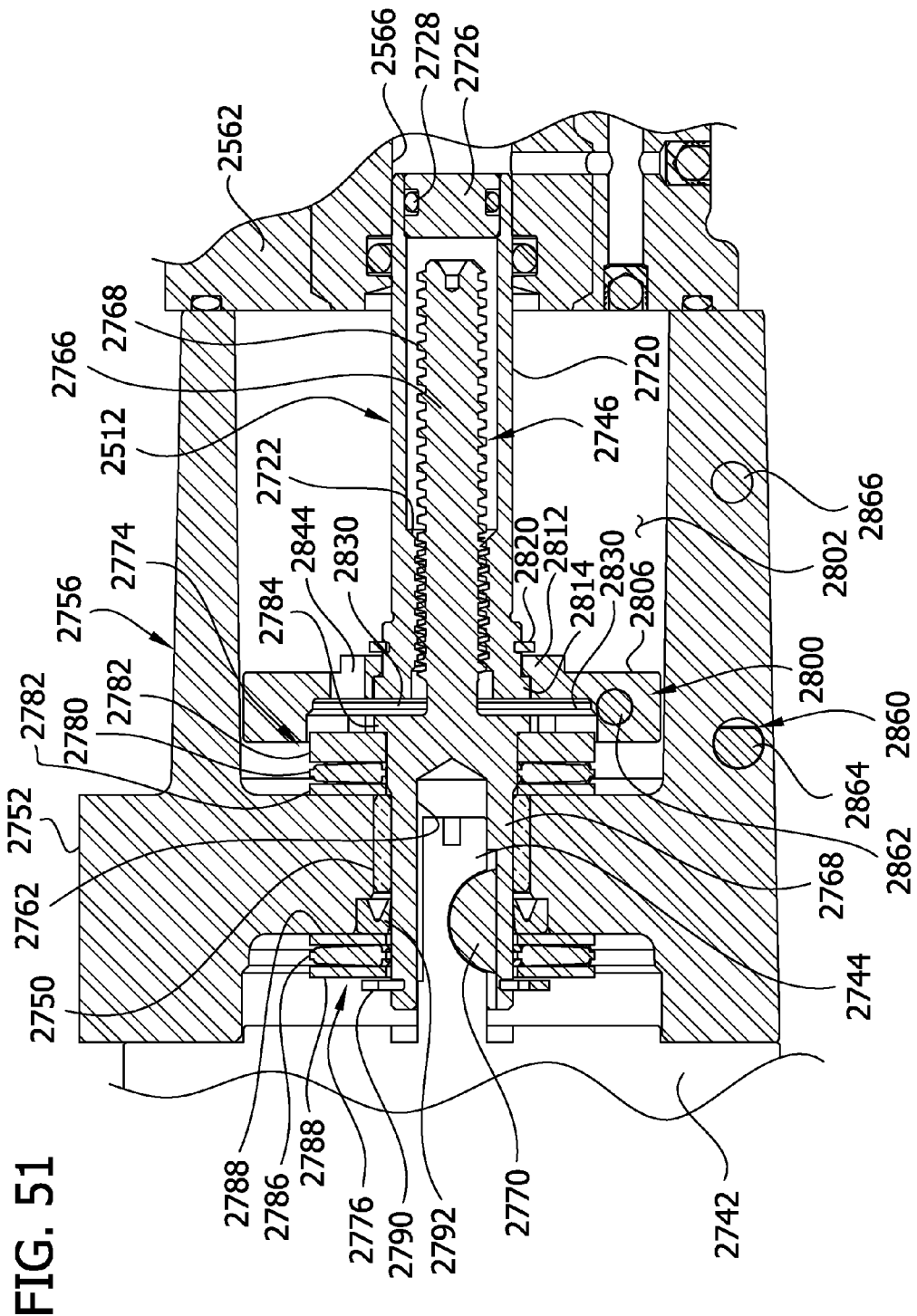
FIG. 51 is an enlarged vertical section showing components of the linear drive mechanism, including a drive screw, piston, follower housing, and follower.
Figure 52:
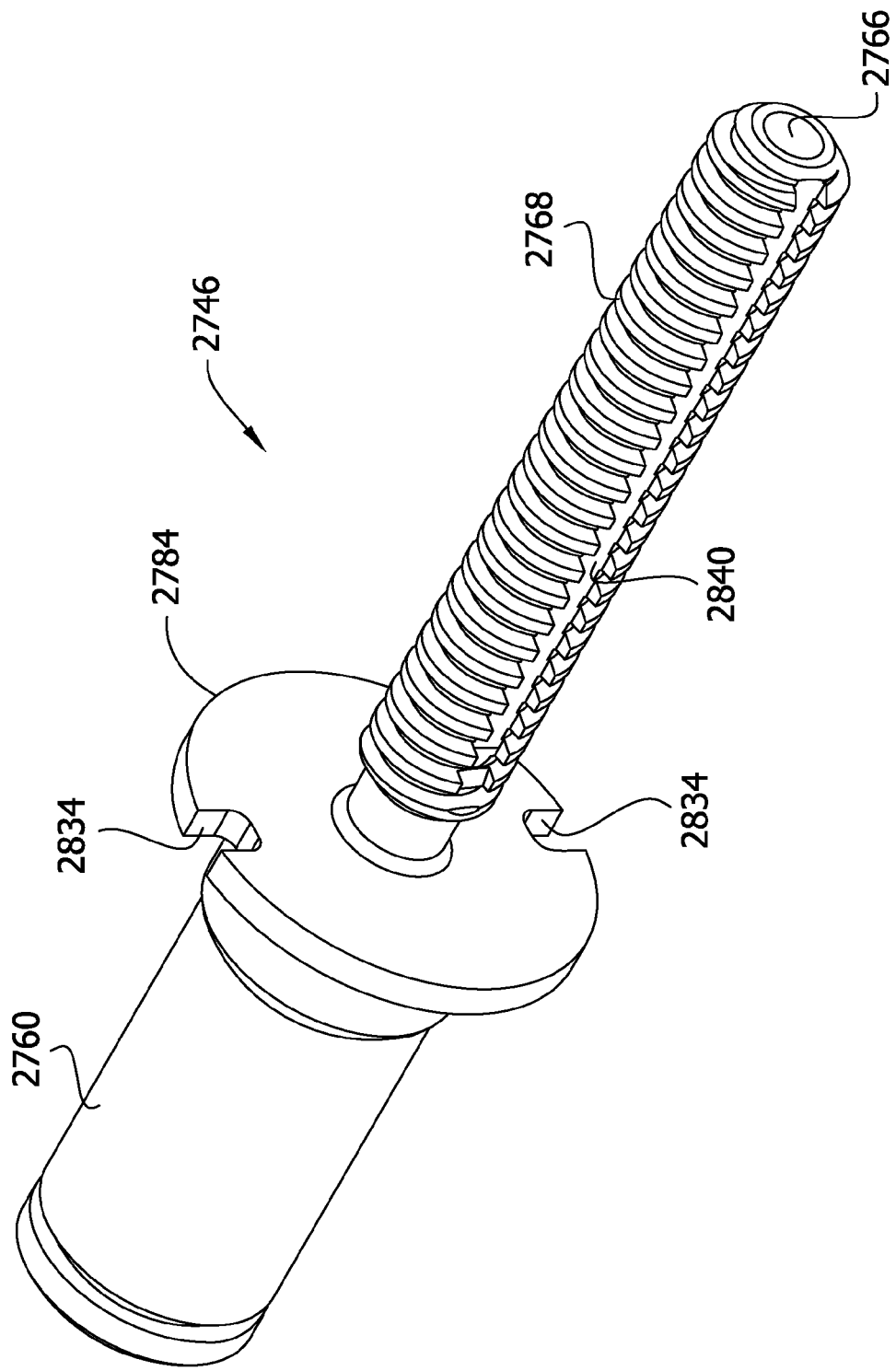
FIG. 52 is a perspective of the drive screw.

A calibration mechanism generally designated 2860 in FIG. 51 is provided for calibrating operation of the stepper motor 2742 relative to the position of the piston 2512 in the cylinder bore 2566. In the illustrated embodiment, this mechanism 2860 comprises a magnet 2862 on the follower 2800 movable with the piston 2512, and at least one and desirably two magnetic field sensors 2864, 2866 mounted on the follower housing 2756 at spaced-apart locations with respect to the direction of piston movement. The controller of the pump unit 2500 receives signals from the calibration mechanism 2860 and calibrates operation of the linear position drive mechanism 2740 relative to the position of the piston 2512 in the cylinder 2508.

Other linear position drive mechanisms can be used to reciprocate the piston 2512 in the cylinder bore 2566. Examples of alternative drive mechanisms are illustrated in FIGS. 20 and 21 and described above.

The operation of the pump unit 2500 is essentially the same as the pump unit 300 described above. The controller of the pump unit 2500 includes a programmable microprocessor that processes information. The controller calibrates and controls the operation of the linear position drive mechanism 2740 and is responsive to signals received from the pressure sensor 2726 and the calibration mechanism 2860 (e.g., magnetic field sensors 2864, 2866). The controller also controls operation of the stirrer motor 2606 and the stepper motor 2742. Desirably, the controller initiates operation of the stirrer motor 2606 before the stepper motor 2742 is operated to reciprocate the piston 2512. This sequence allows the stirrer 2600 to fluidize the lubricant and prime the pump cylinder 2508 with lubricant before the actual pumping of lubricant begins, which can be especially advantageous if the lubricant is in a viscous condition, as in cold-temperature environments. After a suitable delay of predetermined length (e.g., eight-twelve seconds), the stepper motor 2742 is energized to move the piston 2512 through a succession of one or more pumping and return strokes to pump the desired amount of lubricant through the feed line 2714, 2716 connected to the distribution lube supply line.

When the pump unit 2500 is operated in a non-venting mode, the piston 2512 moves forward in the cylinder bore 2566 through a pumping stroke to pump lubricant from the cylinder bore 2566 and rearward through a non-venting return stroke during which the piston stops short of the location at which the vent passage 2730 communicates with the cylinder bore 2566A. That is, the limit of the return stroke is downstream from the location at which the vent passage 2730 communicates with the cylinder bore 2566A. As a result, the vent passage 2730 does not communicate with the interior 2536 of the tank 2518, and there is no venting of the distribution system during a return stroke of the piston. As explained earlier, such venting is unnecessary in a progressive (divider) valve distribution application.

If the pump unit 2500 is used with an injector distribution system requiring venting, the controller of the pump unit is programmed to operate the unit to pump the desired amount of lubricant through a lube supply line to a plurality of injectors at desired intervals of time. The injectors operate to deliver metered amounts of lubricant to respective points of lubrication (e.g., bearings). In this mode, the pump unit 2500 operates as described above except that the piston 2512 moves forward in the cylinder bore 2566 through a pumping stroke to pump lubricant from the cylinder bore 2566 and rearward through a venting return stroke during which the piston moves past the location at which the vent passage 2730 communicates with the cylinder bore 2566A. That is, the limit of the return stroke is upstream from the location at which the vent passage 2730 communicates with the cylinder bore 2566A. As a result, the vent passage 2730 communicates with the interior of the tank (via the cylinder bore 2566A and the defined flow path 2586), and lubricant is vented to the tank to allow the injectors to reset for the next lube event.

Thus, the piston 2512 of the pump unit 2500 is movable through both venting and non-venting return strokes, depending on whether the distribution system being supplied with lubricant by the pump unit requires venting between lubrication events. In the embodiment described above, a venting return stroke of the piston 2512 is somewhat longer than a non-venting return stoke of the piston.

The pump unit 2500 is capable of pumping viscous lubricants at relatively low temperatures. This is due, at least in part, by the strong push/pull forces exerted on the lubricant to force lubricant from the reservoir directly into the cylinder bore 2566. As explained above, rotation of stirrer 2600 causes the force-feed mechanism 2630 to exert a strong downward force on lubricant in the interior 2536 of the tank 2518 tending to push it along the defined flow path 2586 to the cylinder bore 2566A. Further, a return stroke of the piston generates a force tending to pull this same lubricant along the same defined flow path 2586. The combination of these pushing and pulling forces is effective for moving viscous lubricant into the cylinder bore at lower temperatures.

The use of a stirrer and force feed mechanism of the type described above is not limited to the pump unit 300 and the pump unit 2500. The stirrer and force feed mechanism can be used in any type of pump unit in which lubricant is fed along a defined flow path from a reservoir to an inlet of a cylinder in which a piston reciprocates to deliver lubricant to a lubrication distribution system. The piston can be reciprocated by any type of linear or non-linear drive mechanism.

Further, the feature of moving a piston in a cylinder through forward pumping strokes and through rearward venting and non-venting return strokes of different lengths can be employed in lubricant pump units other than pump units 300 and 2500. The piston can be reciprocated through such strokes by any type of linear or non-linear drive mechanism to pump lubricant to vented (e.g., injector) lubricant distribution systems and to non-vented (e.g., divider valve) lubricant distribution systems.

In other embodiments, the tank 2518 of the reservoir 2504 may have a bottom wall that overlies the top wall 2540 of the pump housing 2506. In such embodiments, the tank bottom wall has an outlet opening for exit of lubricant from the tank. Desirably, this outlet opening forms part of a defined flow path from the interior of the tank to the cylinder bore. One such embodiment is described below.

FIGS. 55A, 55B, 55C, and 55D illustrate apparatus for supplying lubricant, generally designated by 2900, that is very similar to the pump unit 2500 described above in FIGS. 38-54. The apparatus 2900 comprises a pump assembly including a pump housing 2902 and a lubricant pump, generally designated 2906, in the housing for pumping lubricant to one or more lubrication sites. The pump 2906 comprises components similar to those in the pump unit 2500 described above, including a piston 2908 movable in a cylinder bore 2910 by a linear drive mechanism 2912 (e.g., a stepper motor 2914 and follower 2916 of the type described above in FIGS. 38-54), an inlet 2920 communicating with the cylinder bore for receiving lubricant, and an outlet 2924 communicating with the cylinder bore for discharging lubricant at a pressure higher than that of the lubricant at the inlet. In general, the pump 2906 operates in the same manner described above regarding pump unit 2500.

The apparatus also includes a reservoir 2930 comprising a tank 2932 sized for holding a volume of lubricant. The tank has a side wall 2936 and a removable top 2938. The side wall 2936 of the tank sits on the pump housing 2902. The reservoir also includes a stirrer, generally designated 2940, for stirring lubricant in the tank 2932, and a spring-biased follower 2942 in the tank that bears against the lubricant (e.g., grease) and wipes against the inside surface of the side wall 2936 of the tank as the level of grease falls during operation of the pump unit 2900. The stirrer 2940 and follower 2942 may be similar in construction and operation to the stirrer 2600 and follower 2538 described above in pump unit 2500.

The pump housing 2902 has a top wall 2950 and a side wall 2952. The top wall 2950 has an opening 2954 forming an outlet of the tank. The opening 2954 is positioned above the inlet 2920 of the pump 2906 for delivery of lubricant from the interior of the tank 2932 to the cylinder bore 2910 along a defined flow path of the type describe above in regard to the embodiment of FIGS. 38-54.

A temperature sensor 2956 is mounted on a boss formed on a lower face 2958 of the top wall 2950. A heater 2960 (e.g., a 100 watt cartridge resistance heater) is also mounted inside the pump housing. In the illustrated embodiment, the heater 2960 is mounted on the lower face 2958 of the top wall 2950. By way of example but not limitation, the heater 2960 comprises a 100-watt cartridge resistance heater for raising the temperature of the lubricant in the tank 2932 about 10° F.-15° F. Although the heater 2960 may be mounted to the lower face 2958 of the top wall 2950 by other means, in one embodiment, the heater is fastened to the top wall with a conventional tubing clamp 2962. Similarly, the sensor 2956 may also be fastened to the top wall 2950 with a conventional tubing clamp 2964.

The temperature sensor 2956 includes leads 2970 that are connected to a control or processor such as described previously. The heater 2960 may be energized before start up or upon receiving a signal from the temperature sensor 2956 indicating a temperature less than a predetermined minimum temperature (e.g., 20° F.). Desirably, the pump housing 2902 is made from a thermally conductive material such as aluminum, and the bottom of the reservoir tank (defined in this embodiment by the top wall 2950 of the pump housing 2902) is made of a thermally conductive material such as aluminum so that heat energy provided by the heater 2960 heats lubricant in the reservoir to maintain the lubricant at a suitable stiffness for pumping. As other features of the pump unit 2900 are similar to those previously described, they will not be described in further detail. As controls for energizing heaters are well known in the art, they need not be described in further detail.

Figure 55A:
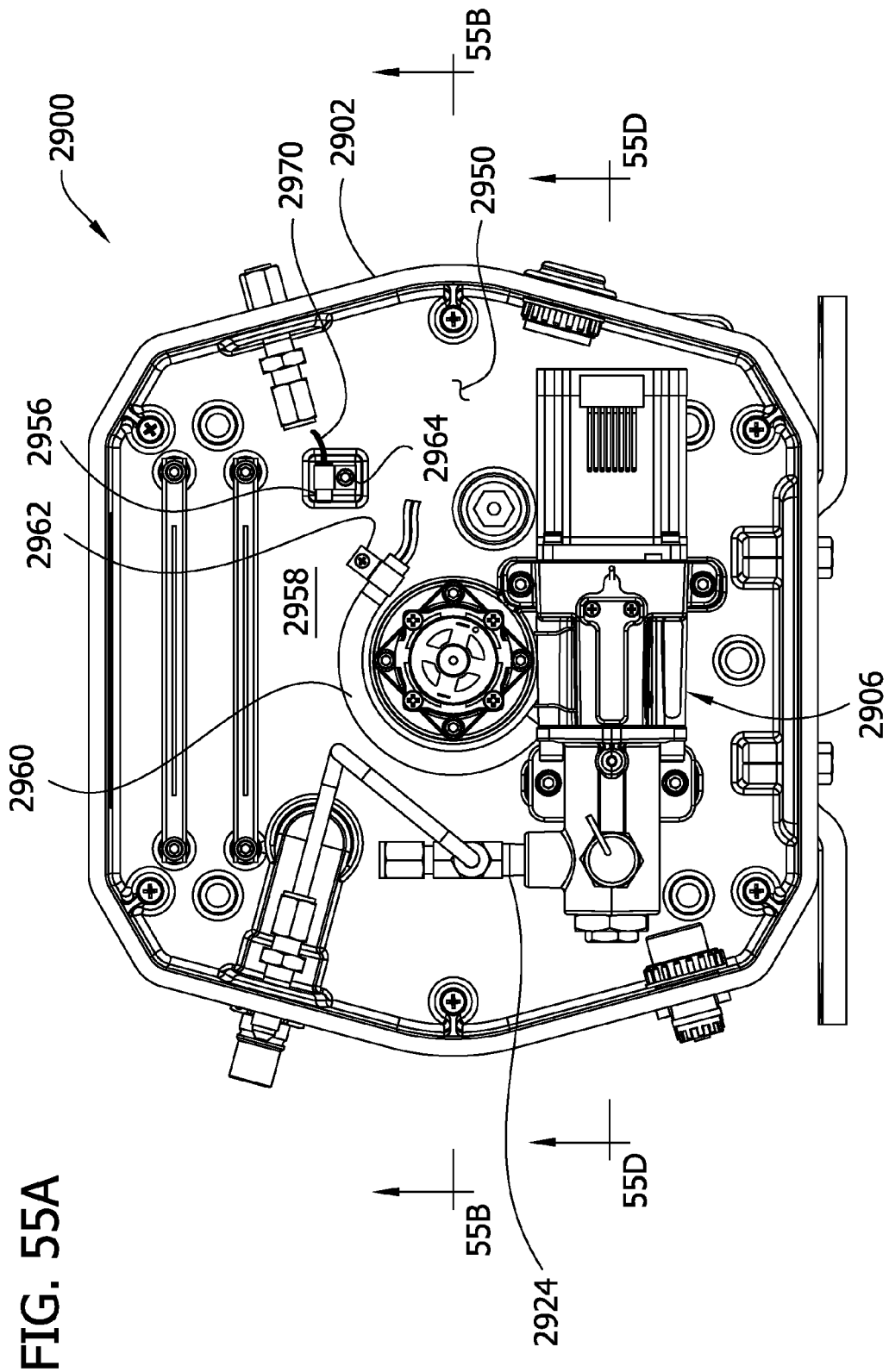
FIG. 55A is a bottom plan of a pump unit having a temperature sensor and heater.
Figure 55B:
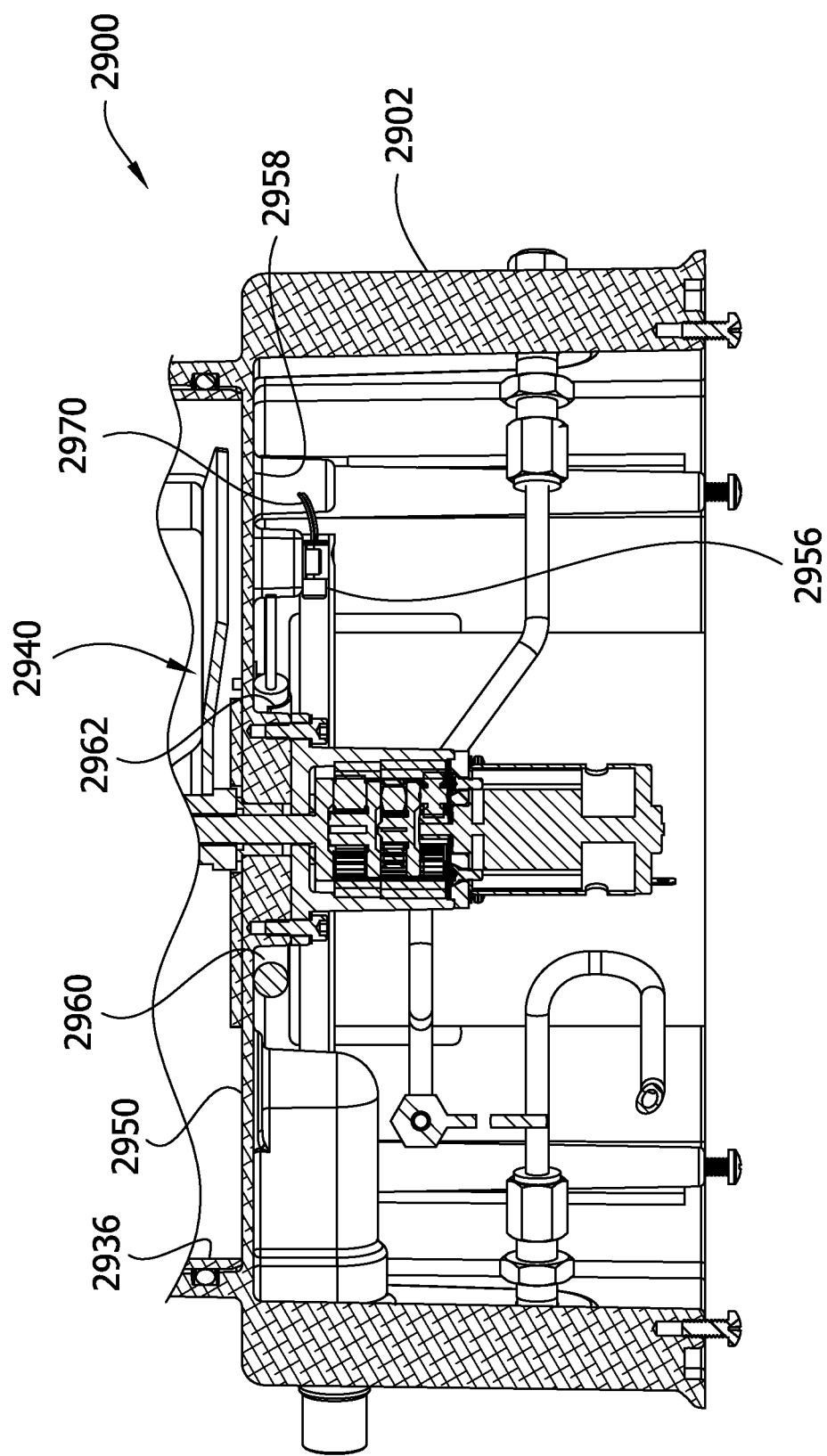
FIG. 55B is a fragmentary cross section of the pump unit taken in the plane of 55B-55B of FIG. 55A.
Figure 55C:
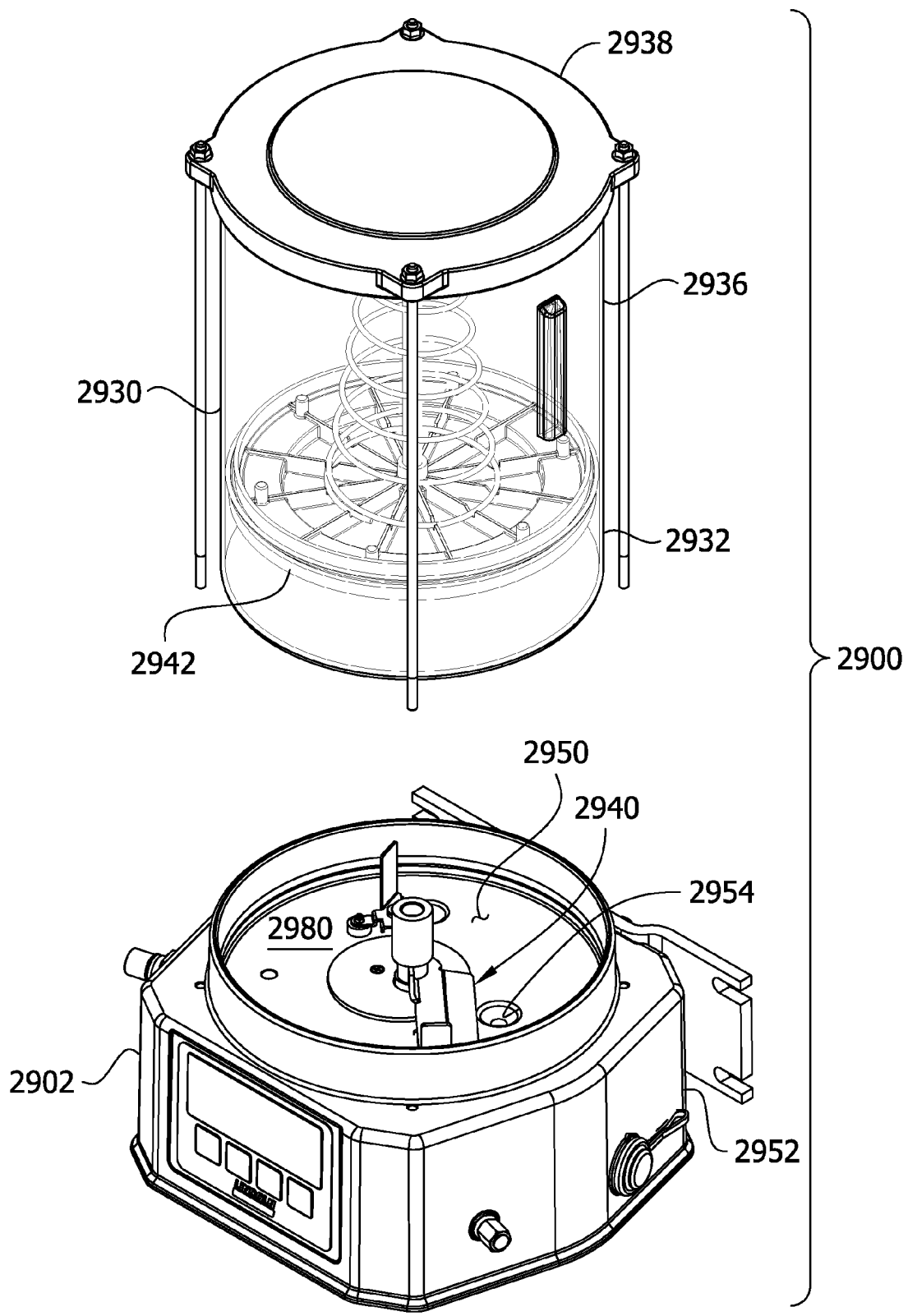
FIG. 55C is perspective of a pump unit having a reservoir separated.
Figure 55D:
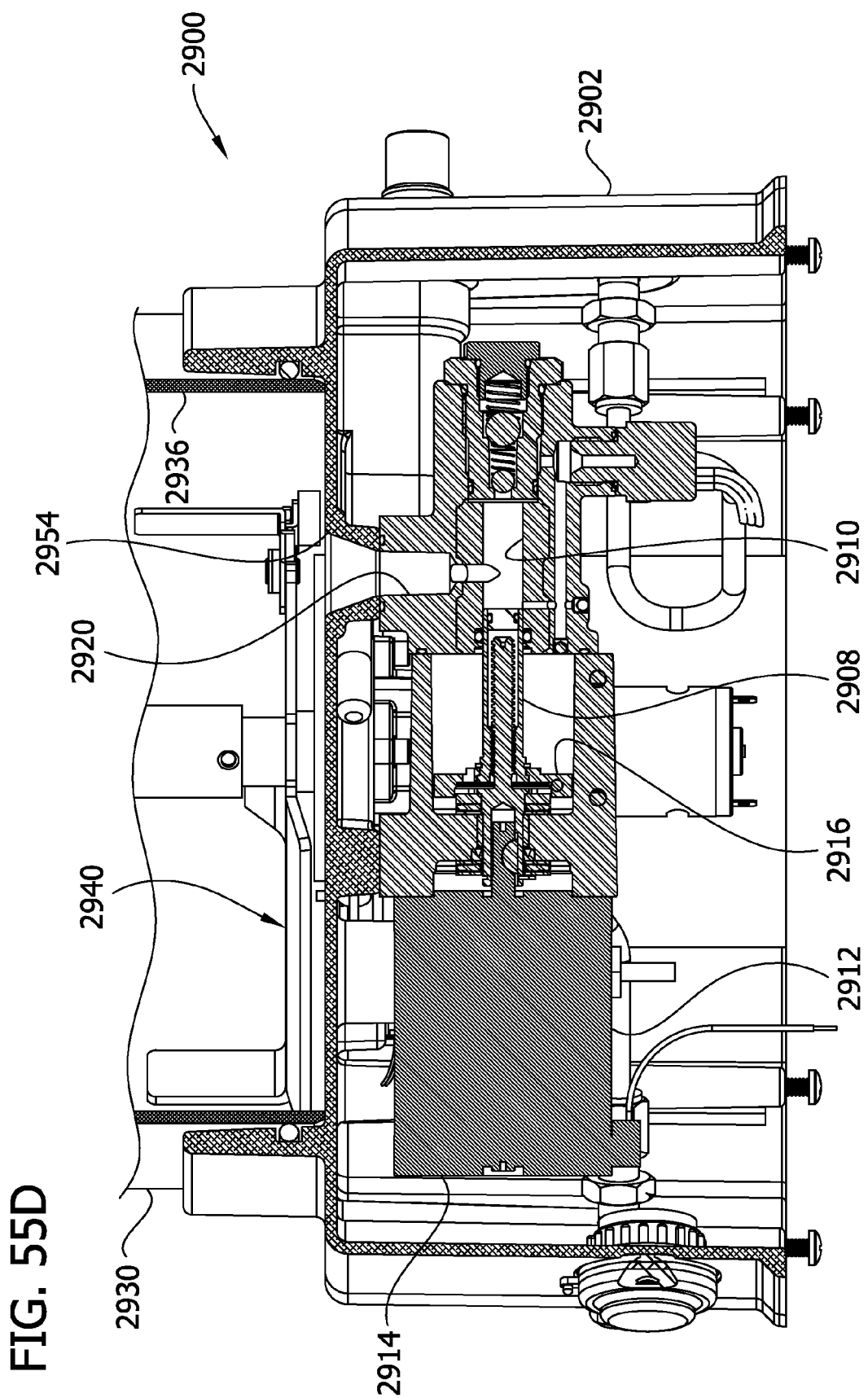
FIG. 55D is a fragmentary cross section of the pump unit taken in the plane of 55D-55D of FIG. 55A.
Figure 55E:
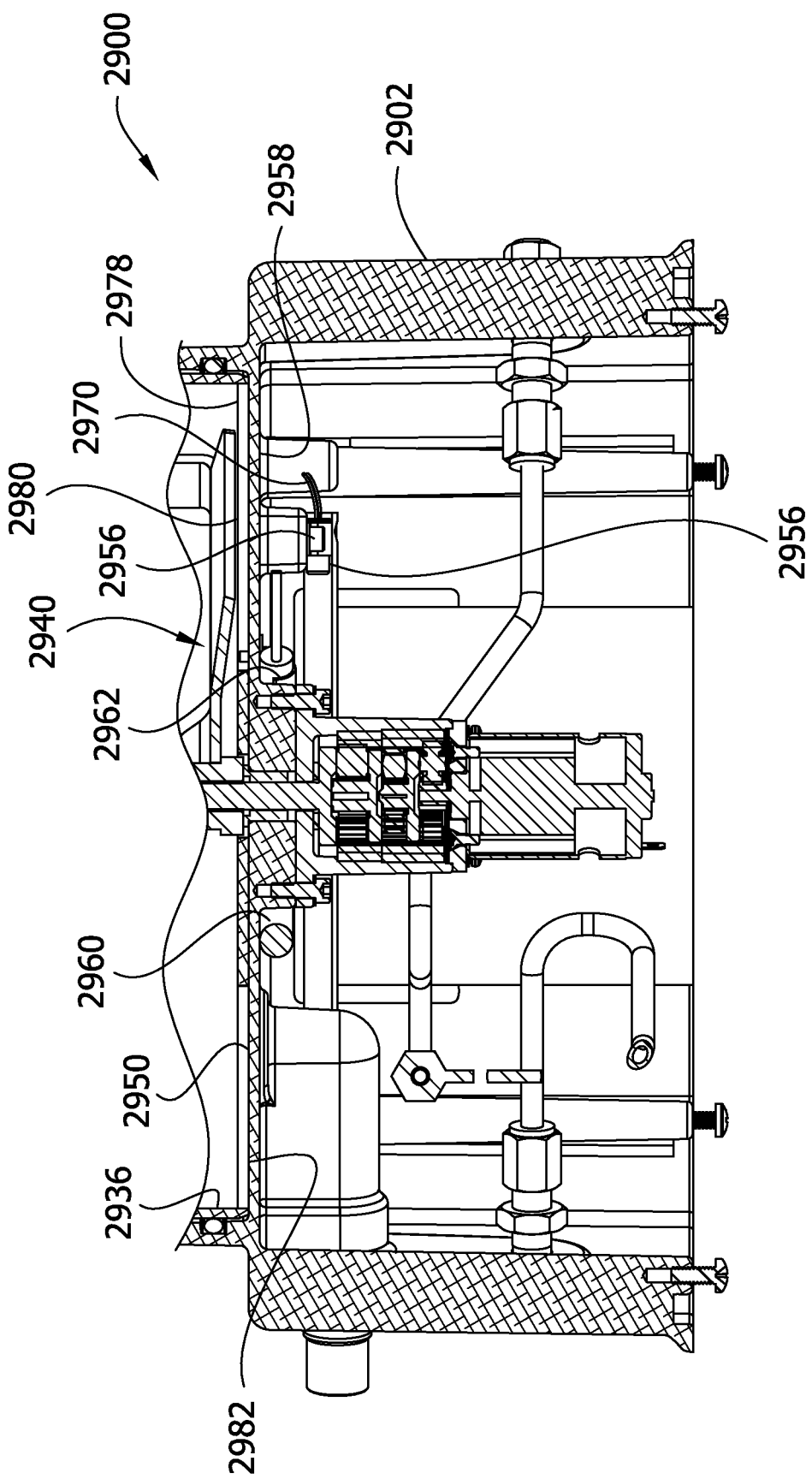
FIG. 55E is a fragmentary cross section of an alternate embodiment of a pump unit taken in the plane of 55B-55B of FIG. 55A.

Optionally, the tank 2932 may have a bottom wall (2978, FIG. 55E) separate from and overlying the top wall 2950 of the pump housing 2902, creating an interface between an upper face 2980 of the top wall 2950 of the housing and a lower face 2982 of the bottom wall 2982 of the tank. To promote thermal conduction across this interface, the opposing faces are preferably contoured, sized, and shaped for face-to-face contact with each other. In one embodiment, the faces opposing are planar to ensure face-to-face contact. By way of example, the area of the lower face 2982 of the bottom wall 2978 of the reservoir tank 2930 in contact with the upper face 2980 of the top wall 2950 of the pump housing 2902 may represent at least 70%, or at least 75%, or at least 80%, of the overall surface area of the lower face of the bottom wall of the tank.

As noted above regarding FIG. 28, the self-diagnostics of the processor may energize heater 2910 in response to the reservoir lubricant being too stiff as determined by the reservoir-lubricant stiffness test of FIG. 28. Alternatively or in addition, the processor may be connected to a temperature sensor providing an indication of the ambient temperature of the lubrication system and the heater may be energized by the processor in response to the sensed ambient temperature. For example, depending on the type of lubricant, the heater may be energized when the sensed ambient temperature is below a user setting (e.g., 40° F.). Alternatively or in addition, the processor may be connected to a temperature sensor providing an indication of the temperature of the lubricant and the heater may be energized by the processor in response to the sensed lubricant temperature. In this embodiment the sensor may be positioned within the lubricant for sensing the temperature of the lubricant itself or the sensor may be positioned adjacent a component of the pump unit (e.g., the pump housing on which the reservoir is seated) for sensing a temperature indicative of the lubricant temperature.

The heater feature described above is described in the context of a specific lubricant pump unit 2900. However, it will be understood that this same feature can be used in other lubricant pump units having a lubricant reservoir of thermally conductive material seated on a pump housing of thermally conductive material, regardless of the type of pump drive mechanism.

There are several ways to program the main controller 450 to control a motor driver circuit 451 for driving the stepper motor 394 to turn the lead screw 410 to cause the piston 384 to reciprocate and pump lubricant. For example, in one embodiment the controller 450 may be programmed to cause the motor drive circuit 451 to rotate the motor shaft 396 clockwise for a preset period of time and then to rotate the motor shaft 396 counterclockwise for a preset period of time. In another embodiment, the controller 450 may be programmed to cause the motor drive circuit 451 to rotate the motor shaft 396 clockwise for a preset number of revolutions and then to rotate the motor shaft 396 counterclockwise for a preset number of revolutions.

In another embodiment, magnetic field sensors 440, 442 such as reed switches or Hall sensors may be positioned at or near the ends of the cylinder bore 338 or at or near the ends of the pumping stroke for sensing the position of the piston or the follower. A magnet 434 may be applied to the piston 384 or the follower 414 to indicate the piston position and for sensing by the sensors. In this embodiment, the main controller 450 would be responsive to the sensors to reciprocate the piston. In particular, the controller 450 may be programmed to cause the motor drive circuit 451 to rotate the motor shaft 396 clockwise until the switches/sensors indicate that the position of piston is at or near one end of the cylinder bore 338 (at one end of the pumping stroke) and then to rotate the motor shaft 396 counterclockwise until the switches/sensors indicate that the position of piston is at or near the other end of the cylinder bore 338 (at the other end of the pumping stroke). The switches/sensors may be used for calibration, or during stepper motor operation to determine the piston position, or as noted herein for monitoring piston position during a diagnostic operation.

In one embodiment (described below) the stepper motor is energized by PWM pulses to drive the piston forward through a power stroke to a position sensed by the forward sensor 442. The stepper motor is then reversed and energized by PWM pulses to drive the piston in a rearward direction through a venting or non-venting return stroke. The length of the return stroke is determined by applying a preset number of PWM pulses to the stepper motor to move the piston rearward from its forward position as sensed by the forward sensor 442.

In another embodiment, the controller 450 includes an integral motor driver circuit and controls the operation of the stepper motor 394 by controlling the driver circuit to selectively apply PWM pulses to the stepper motor 394 to control a speed and a torque of the motor to reciprocate the piston. The controller is also responsive to one or more pressure sensors sensing lubricant pressure, such as the pressure sensor 372 for sensing the pressure at the outlet of the cylinder bore. The pressure sensor provides a pressure signal indicative of the sensed pressure of the lubricant supplied via the cylinder outlet. The controller 450 is responsive to the pressure signal to selectively apply the PWM pulses to the stepper motor 394 to vary the speed and the torque of the stepper motor as a function of the pressure signal by applying PWM pulses having a power within a continuous duty operating range of the stepper motor. In some embodiments, the pressure sensor may be a sensor for sensing the current of the motor 394 since motor current is indicative of pressure, so that the pressure signal may be a signal indicative of motor current.

The speed of the stepper motor 394 may controlled by the duty cycle of PWM pulses applied to the motor to energize the motor. The torque of the stepper motor may controlled by the width (e.g., duration) of PWM pulses applied to the motor to energize the motor. Thus, the PWM pulses have a voltage (pulse height) and a current (pulse width) resulting in a power level being applied to the motor. In general, the stepper motor may be controlled by adjusting motor voltage, motor current, pulse duty cycle, and/or pulse power.

Figure 56:
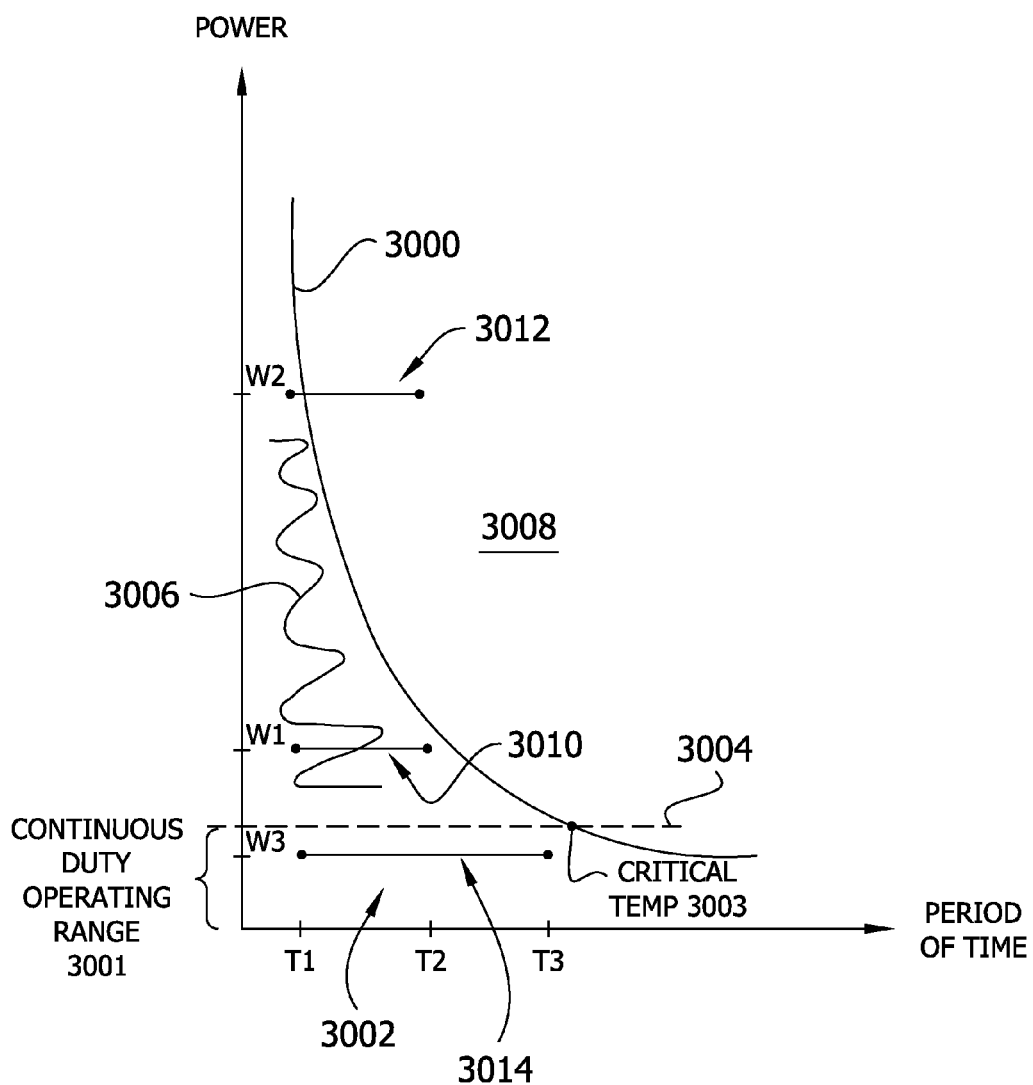
FIG. 56 is a graph illustrating a curve of power over time of a stepper motor and illustrating the continuous duty operating range of the stepper motor.

FIG. 56 is a graph illustrating an exemplary power curve 3000 (or motor temperature curve) over time of the stepper motor and further illustrating an exemplary continuous duty operating range 3001 of the stepper motor. When the motor is operating in this range 3001, internal heat is developed resulting in the motor temperature being at or below a critical temperature 3003. Frequently, the continuous duty operating range 3001 is based on various characteristics of a motor, such as its size and materials. If a motor is operated within the continuous duty operating range 3001, its temperature stabilizes below the critical temperature 3003 so that the motor can be operated for extended periods of time without and significant detrimental effects. However, if a motor is operated above the continuous duty operating range, its temperature stabilizes above the critical temperature 3003 so that the motor can be operated only for a limited period of time without and significant detrimental effects. If a motor is operated above the continuous duty operating range and its temperature stabilizes above the critical temperature 3003, and if the motor is operated beyond the limited period of time, significant detrimental effects may occur.

In FIG. 56, the power curve 3001 defines the approximate difference or boundary between operating the motor for a period of time without significant detrimental effects and operating the motor for a period of time with significant detrimental effects. Operation of the motor at a power level and for a period of time which is within an area 3002 below a dashed line 3004 is within the continuous duty operating range 3001 and no significant detrimental damage occurs. The dashed line 3004 is generally referred to as the continuous duty rating of the motor.

Operating the motor at a power level and for a period of time which is within an area 3006 above the dashed line 3004 and to the left of the curve 3000 (above and beyond the area 3002 of the continuous duty operating range 3001) does not cause significant detrimental damage because the period of time is relatively short and no excessive heat builds up in the motor. On the other hand, operating the motor at a power level and for an extended period of time which is within an area 3008 above the dashed line 3004 and to the right of the power curve 3000 (above and beyond the area 3002 of the continuous duty operating range 3001) does cause significant detrimental damage because excessive heat builds up in the motor causing damage. In general, applying increased power to the stepper motor results in a corresponding increase in the temperature of the motor. In some stepper motors, 80° C. is specified as the maximum motor temperature rating. Thus, in such motors, operating the motor to the left of curve 3000 of FIG. 56 would be operating within the motor rating whereas operating the motor to the right of curve 3000 of FIG. 56 would be operating outside the motor rating.

For example, operating the motor at a power level W1 and for a period of time T1 to T2 within the area 3006 above the dashed line 3004 and to the left of the curve 3001 as illustrated by line 3010 does not cause significant detrimental damage to the stepper motor. This is because the period of time T1 to T2 is relatively short and no excessive heat builds up in the motor. On the other hand, operating the motor at a power level W2 and for the period of time T1 to T2 within the area 3008 above the dashed line 3004 and to the right of the curve 3001, as illustrated by line 3012, can cause significant detrimental damage to the stepper motor. This is because the period of time T1 to T2 is relatively long, crosses curve 3000 and excessive heat builds up in the motor which can cause damage. Operating the motor at a power level W3 and for a period of time T1 to T3 within the area 3002 below the dashed line 3004, as illustrated by line 3014, does not cause significant detrimental damage to the stepper motor. Even though the period of time T1 to T3 is relatively long, no excessive heat builds up within the stepper motor because the motor is operating within area 3002 representing the continuous duty operating range of the motor.

Figure 57:
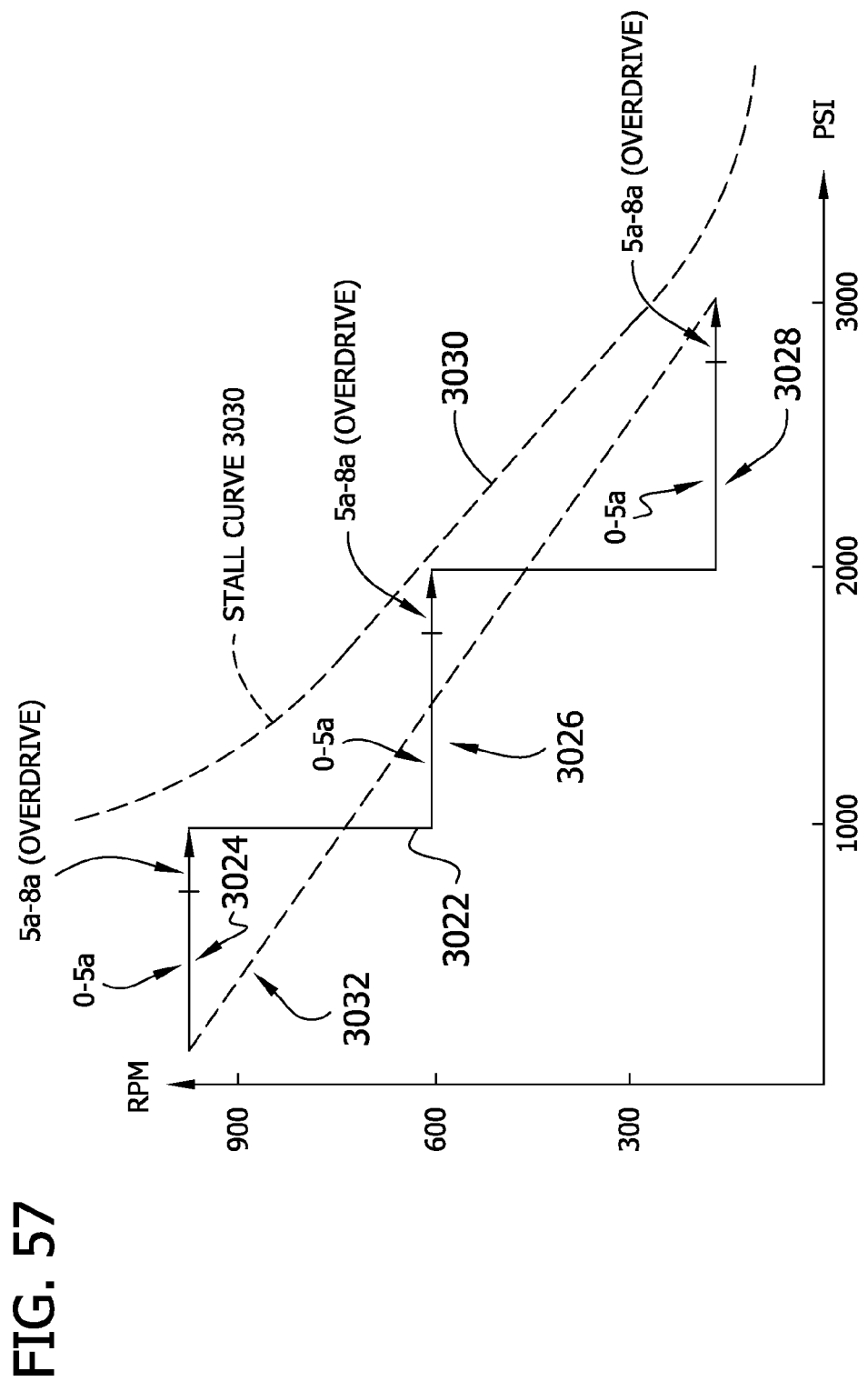
FIG. 57 is a graph illustrating speed in rpm vs. pressure in psi of an operating profile of a stepper motor of the invention and of a stall curve of the stepper motor.

As noted above, the controller 450 is responsive to the pressure signal from the pump PT to selectively apply the pulse width modulated (PWM) pulses to the stepper motor 394 to vary the speed and the torque of the stepper motor as a function of the pressure signal by applying PWM pulses having a power within the continuous duty operating range of the stepper motor. For most if not all of the time of stepper motor operation, the controller responds to the pressure signal to apply PWM pulses to the stepper motor having a power which falls within the area 3002 of the continuous duty operating range of the stepper motor. As pressure builds in the system, or if other factors impede the desired pressure levels, it is contemplated that the controller responds to the pressure signal to apply PWM pulses to the stepper motor having a power which falls within the overdrive area 3006 above dashed line 3004 and the continuous duty operating range of the stepper motor and to the left of curve 3001. Thus, the controller is responsive to the pressure signal to selectively apply the PWM pulses to the stepper motor to vary the speed and torque of the stepper motor as a function of the pressure signal by applying "overdrive" PWM pulses for a period of time. The overdrive PWM pulses have an overdrive power greater than the continuous duty operating range of the stepper motor. FIG. 57 illustrates one such embodiment.

As shown in FIG. 57, the controller 450 includes a memory storing a speed vs. pressure profile 3022 of the stepper motor 394. In this embodiment, the controller is responsive to the pressure signal from the pump PT to selectively apply PWM pulses to the stepper motor to vary the speed and the torque of the stepper motor as a function of the pressure signal and as a function of the profile 3022 by applying PWM pulses having a power that is both inside and outside the continuous duty operating range of the stepper motor, as described below.

The profile 3022 includes three stages, a first stage 3024, a second stage 3026 and a third stage 3028. During the first stage 3024, the PWM pulses drive the motor at about 1000 rpm between about zero and 1000 psi. During the second stage 3026, the PWM pulses drive the stepper motor 394 at about 600 rpm between about 1000 and 2000 psi. During the third stage 3028, the PWM pulses drive the motor at about 200 rpm between about 2000 and 3000 psi. Reference character 3030 illustrates the stall curve of the stepper motor, also shown in FIG. 58. To the left of (below) the stall curve 3030 is a motor operating area 3034 (FIG. 58) in which the motor operates at a speed and pressure without stalling, and to the right of (above) the stall curve 3030 is a motor stall area 3036 in which the motor operates at a speed and pressure at which the motor tends to stall. When the speed of the motor at a particular pressure is to the left of the stall curve 3030, the motor has sufficient speed to push lubricant and maintain or increase the pressure of the lubricant. However, if the pressure at a particular speed increases so that the motor is operating at or to the right of the stall curve 3030, the motor has a tendency to stall. In other words, when the speed of the motor at a particular pressure is to the right of the stall curve 3030, the motor may have insufficient speed to push lubricant and the motor tends to stall.

In one embodiment (FIG. 57), the latter part of each stage may include overdriving the stepper motor 394 for a period of time. For example, consider a stepper motor that is driven with pulse width modulated (PWM) pulses having a constant voltage, e.g., 24 volts, and having a varying duration which falls within the continuous duty operating range, e.g., 0-5 amps. During the first stage 3024, the pulse width modulated (PWM) pulses would have durations between 0-5 amps to drive the motor at about 1000 rpm between about zero and 900 psi. At about 900 psi, the motor would have insufficient power (i.e., current or torque which is determined by the duration of the pulse) to increase the pressure to a desired target pressure of 1000 psi. At this point, the controller would control the driver circuit to overdrive the motor for a period of time. This can be accomplished by increasing the current supplied to the motor, for a limited period of time, so that the PWM pulses would have durations between 5-8 amps to provide sufficient power to drive the motor at about 1000 rpm between about 900 and 1000 psi.

During the second stage 3026, the PWM pulses would have durations between 0-5 amps to drive the stepper motor 394 at about 600 rpm between about 1000 and 1900 psi. At about 1900 psi, the motor would have insufficient power (i.e., current or torque which is determined by the duration of the pulse) to increase the pressure to a desired target pressure of 2000 psi. At this point, the controller would control the driver circuit to overdrive the motor for a period of time. This can be accomplished by increasing the current supplied to the motor, for a limited period of time, so that the PWM pulses would have durations between 5-8 amps to provide sufficient power to drive the motor at about 600 rpm between about 1900 and 2000 psi.

During the third stage 3028, the PWM pulses would have durations between 0-5 amps to drive the motor at about 200 rpm between about 2000 and 2900 psi. At about 2900 psi, the stepper motor 394 would have insufficient power (i.e., current or torque which is determined by the duration of the pulse) to increase the pressure to a desired target pressure of 3001 psi. At this point, the controller would control the driver circuit to overdrive the motor for a period of time. This can be accomplished by increasing the current supplied to the motor, for a limited period of time, so that the PWM pulses would have durations between 5-8 amps to provide sufficient power to drive the motor at about 200 rpm between about 2900 and 3001 psi.

It is also contemplated that the height of the PWM pulse, which is the voltage of the PWM pulse, may be increased instead of increasing the duration (current) of the pulse in order to increase the power of the pulse and overdrive the stepper motor 394. It is also contemplated that the height of the PWM pulse, which is the voltage of the PWM pulse, may be increased in addition to increasing the duration (current) of the pulse in order to increase the power of the pulse and overdrive the motor.

Figure 58:
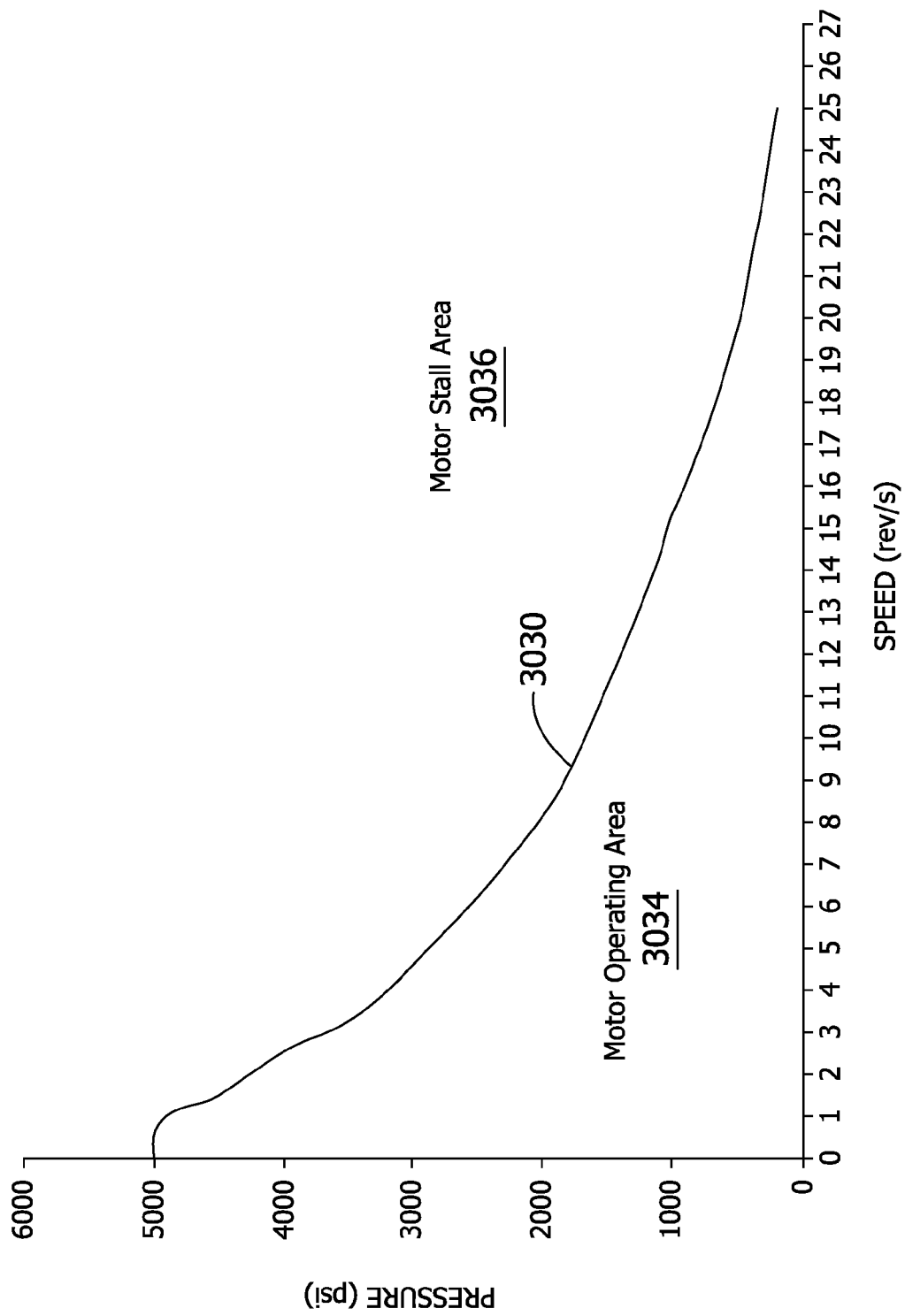
FIG. 58 is a graph illustrating pressure in psi vs. speed in rpm of a stall curve of the stepper motor.

As a result, as illustrated in FIGS. 57 and 58, the controller selectively applies the PWM pulses to the stepper motor to vary the speed and torque of the stepper motor as a function of the pressure signal from the pump PT by applying overdrive pulse width modulated (PWM) pulses for a period of time of overdrive operation. The period of time may be fixed and/or it may vary based on another parameter. For example, as shown in FIG. 57, the stated period of time would be the time required during the first stage 3024 to ramp up the pressure from 900 psi to 1000 psi. Similarly, the stated period of time would be the time required during the second stage 3026 to ramp up the pressure from 1900 psi to 2000 psi. Similarly, the stated period of time would be the time required during the third stage 3028 to ramp up the pressure from 2900 psi to 3001 psi. During each stage, a maximum time for the stated period of time of overdrive operation could be set based on FIG. 56. The maximum time for a given power would be set to avoid operating the motor in area 3008 since the overdrive PWM pulses have an overdrive power greater than the continuous duty operating range of the motor.

In one embodiment described above, the stepper motor is operated in the area 3006 (see W1, time T1 to T2) during an overdrive operation, and operating the stepper motor in the area 3008 (see W2, time T1 to T2) is avoided, at least for any significant period of time. Thus, the period of time of overdrive operation is a function of the overdrive power relative to the continuous duty operating range of the stepper motor. In other words, the controller selectively applies the PWM pulses to the stepper motor to vary the speed and torque of the stepper motor as a function of the pressure signal from the pump PT by applying overdrive PWM pulses for a period of time. The overdrive PWM pulses have an overdrive power greater than the continuous duty operating range of the stepper motor, and the period of time is a function of the overdrive power relative to the continuous duty operating range of the stepper motor. Thus, the controller applies pulse width modulated (PWM) pulses to the stepper motor 394 such that the speed of the stepper motor is a first speed (e.g., 1000 rpm) when the pressure signal from the pump PT is within a first range (1 to 1000 psi) defined by the first stage 3024. Similarly, the controller applies PWM pulses to the stepper motor such that the speed of the stepper motor is a second speed (e.g., 600 rpm) less than the first speed when the pressure signal from the pump PT is within a second range (e.g., 1000 psi to 2000 psi) defined by the second stage 3026, the second range being higher than the first range. Similarly, the controller applies PWM pulses to the stepper motor such that the speed of the stepper motor is a third speed (e.g., 200 rpm) less than the second speed when the pressure signal from the pump PT is within a third range (e.g., 2000 psi to 3001 psi) defined by the third stage 3028, the third range being higher than the second range.

One perspective of the profile is that the controller determines the speed of the stepper motor 394 based on a duty cycle of the pulses applied to the stepper motor. From this perspective, the controller applies overdrive PWM pulses to the stepper motor when the pressure signal from the pump PT is within a preset range (e.g., 900 psi to 1000 psi for the first stage 3024; 1900 psi to 2000 psi for the second stage 3026; and 2900 psi to 3001 psi for the third stage 3028) and when the speed of the motor is within a preset range. As noted above regarding FIG. 56, the overdrive PWM pulses have an overdrive power greater than the continuous duty operating range of the stepper motor.

In one embodiment, a temperature sensor is positioned adjacent the stepper motor 394 to monitor the temperature of the motor to maintain the motor below its maximum motor temperature rating. The controller receives a signal from the temperature sensor indicative of the motor temperature. In this embodiment, the period of time for overdriving the motor is a function of the temperature of the stepper motor. Further, the motor may have a maximum temperature for a given speed, torque, current, power, pressure or rpm. The controller is configured to operate the motor only within the continuous duty operating range of the stepper motor once the motor temperature sensor indicates that the motor temperature has reached its maximum temperature to inhibit motor damage. Alternatively, the controller is configured to discontinue operation of the motor once the motor temperature sensor indicates that the motor temperature has reached a certain temperature to inhibit motor damage.

In other embodiments, a temperature sensor may not be needed. It will be noted in this regard that the amount of power applied to a stepper motor is proportional to the increase of the temperature of the stepper motor. Thus, the temperature of the motor can be calculated by the processor based on the power over time applied to the motor.

In one embodiment, the controller determines the speed of the stepper motor 394 based on a duty cycle of the pulses applied to the stepper motor. Alternatively, or in addition, the speed may be determined by a motor speed sensor, such as a Hall sensor, connected to the controller and associated with a servo motor for driving the pump stepper motor.

In one embodiment, the speed/pressure profile stored in the memory of the controller is defined by at least one or more of an algorithm and a look-up table. For example, an algorithm for defining a speed/pressure curve as illustrated by the dashed line 3032 of FIG. 57 may be stored in the memory and executed by the controller.

The motor overdrive feature described above has been in the context of lubrication systems which include the pump unit 300 described earlier. However, it will be understood that these same overdrive features can be used in lubrication systems having other pump units, such as the pumps units 2500, 2900 described above and other pump units that include a stepper motor or an alternative linear position drive mechanism (e.g., the mechanism of FIG. 20 or FIG. 21).

As will be appreciated by those skilled in the art, features of each of the previously described embodiments may be combined with features of other embodiments. These combinations are envisioned as being within the scope of the present invention.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The Abstract and Summary are provided to help the reader quickly ascertain the nature of the technical disclosure. They are submitted with the understanding that they will not be used to interpret or limit the scope or meaning of the claims.

The above description illustrates the invention by way of example and not by way of limitation. When two items or multiple items are illustrated, it is contemplated that the invention may include two or more items. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The invention claimed is:

1. A lubricant reservoir pumping system, comprising:
   a pump assembly including a housing having a top of heat conductive material including an upper face, a heater attached to and in thermal contact with the top of the housing for heating said upper face, and a lubricant pump in the housing for pumping lubricant to a lubrication site, said pump having an inlet for receiving lubricant and an outlet for discharging lubricant at a pressure higher than that of lubricant at the inlet; and
   a reservoir including a tank for holding lubricant, the tank having a bottom of heat conductive material including a lower face contoured, sized, and shaped for face-to-face contact with the upper face of the top of the housing of the pump assembly over a predetermined area of the lower face to promote thermal conduction across an interface between said upper and lower faces, the reservoir including an outlet positioned to fluidly communicate with the pump inlet.

2. A system as set forth in claim 1, wherein the lower face of the tank bottom and the upper face of the pump assembly housing top are planar.

3. A system as set forth in claim 1, wherein the tank bottom and the pump assembly housing top comprise aluminum.

4. A system as set forth in claim 1, wherein the heater is mounted on a lower face of the top of the pump assembly housing.

5. A system as set forth in claim 1, further comprising a temperature sensor mounted on pump housing in thermal contact with the reservoir tank bottom, wherein the heater is energized to heat the pump assembly housing top and thereby the reservoir tank bottom in response to a temperature sensed by the sensor being below a predetermined temperature.

6. A system as set forth in claim 1, further comprising a sensor mounted on the pump assembly housing for sensing a condition of lubricant held in the tank, wherein the heater is energized to heat the pump assembly housing top and thereby the reservoir tank bottom in response to the condition sensed by the sensor being within a predetermined range.

7. A system as set forth in claim 1, wherein the area of the lower face of the bottom wall of the reservoir tank in contact with the upper face of the top wall of the pump housing is at least 80% of an overall surface area of the lower face of the bottom wall of the tank.

8. The apparatus of claim 1 further comprising a controller for controlling the lubricant pump, wherein the controller is configured to pump a preset volume of lubricant and wherein the controller operates the lubricant pump for a preset period of time or for a preset number of strokes to pump the preset volume of lubricant.

9. A lubricant pump assembly for pumping lubricant from a reservoir, the reservoir including a tank for holding lubricant, the tank having a bottom of heat conductive material including a lower face, the pump assembly comprising:
   a housing having a top of heat conductive material including an upper face contoured, sized, and shaped for face-to-face contact with the lower face of the tank over a predetermined area of the lower face to promote thermal conduction across an interface between the upper and lower faces;
   a lubricant pump in the housing for pumping lubricant to a lubrication site, said pump having an inlet for receiving lubricant and an outlet for discharging lubricant at a pressure higher than that of lubricant at the inlet; and
   a heater mounted on the top of the pump assembly housing and in thermal contact with the top of the housing for heating said upper face and thereby heating the reservoir tank.

10. A pump assembly as set forth in claim 9, further comprising a sensor mounted on the pump assembly housing for sensing a condition of lubricant held in the tank, wherein the heater is energized to heat the pump assembly housing top and thereby the reservoir tank bottom in response to the condition sensed by the sensor being within a predetermined range.

11. A pump assembly as set forth in claim 10, wherein the sensor is a temperature sensor and the heater is energized to heat the pump assembly housing top and thereby the reservoir tank in response to a temperature sensed by the sensor being below a predetermined temperature.

12. A pump assembly as set forth in claim 11, wherein the sensor is mounted on the top of the pump assembly housing.

13. A pump assembly as set forth in claim 12, wherein the sensor is mounted on a lower face of the top of the pump assembly housing.

14. A pump assembly as set forth in claim 9, wherein the heater is mounted on a lower face of the top of the pump assembly housing.

15. A pump assembly as set forth in claim 9, wherein the lower face of the tank bottom and the upper face of the pump assembly housing top are planar.

16. A pump assembly as set forth in claim 9, wherein the tank bottom and the pump assembly housing top comprise aluminum.

17. The apparatus of claim 9 further comprising a controller for controlling the lubricant pump, wherein the controller is configured to pump a preset volume of lubricant and wherein the controller operates the lubricant pump for a preset period of time or for a preset number of strokes to pump the preset volume of lubricant.

* * * * *